US011829145B2

(12) United States Patent
Bergman et al.

(10) Patent No.: US 11,829,145 B2
(45) Date of Patent: Nov. 28, 2023

(54) HOME DIALYSIS SUPPLIES DELIVERY ROBOT, NETWORK, AND METHOD

(71) Applicant: Fresenius Medical Care Holdings, Inc., Waltham, MA (US)

(72) Inventors: Eric Bergman, Newton, MA (US); Jessica Steuber, Berlin, MA (US); David Yuds, Antioch, CA (US); Jonathan Leclerc, Northborough, MA (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 260 days.

(21) Appl. No.: 17/211,141

(22) Filed: Mar. 24, 2021

(65) Prior Publication Data
US 2022/0308586 A1  Sep. 29, 2022

(51) Int. Cl.
*G05D 1/02* (2020.01)
*G05D 1/00* (2006.01)
(Continued)

(52) U.S. Cl.
CPC ........... *G05D 1/0212* (2013.01); *B62D 61/12* (2013.01); *G05D 1/0011* (2013.01);
(Continued)

(58) Field of Classification Search
CPC .. G05D 1/0212; G05D 1/0011; G05D 1/0088; G05D 1/0276; G05D 2201/0206;
(Continued)

(56) References Cited

U.S. PATENT DOCUMENTS 3,653,332 A * 4/1972 Olson, Sr. ............... B60F 1/005
105/72.2
3,679,223 A * 7/1972 Sakal ....................... B62B 7/06
280/37
(Continued)

FOREIGN PATENT DOCUMENTS

CN  204925790 U * 12/2015
CN  206466049 U *  9/2017
(Continued)

OTHER PUBLICATIONS

Olaf Diegel et al., "Improved Mecanum Wheel Design for Omnidirectional Robots," Australasian Conference on Robotics and Automation, Auckland, Nov. 2002, pp. 117-121.
(Continued)

*Primary Examiner* — Marc Burgess
*Assistant Examiner* — Merritt E Levy
(74) *Attorney, Agent, or Firm* — Kilyk & Bowersox, P.L.L.C.

(57) ABSTRACT

A delivery robot is provided for the delivery of home dialysis supplies to a home dwelling of a home dialysis patient. The delivery robot can be an autonomous delivery robot. The delivery robot can have an outdoor set of wheels or other traction devices, and an indoor set of wheels or other traction devices. The delivery robot can be configured to switch between an outdoor configuration for traversing an outdoor surface, and an indoor configuration for traversing an inside surface, inside the home of the home dialysis patient. A network is also provided and can include a robot delivery vehicle, a warehouse, a remote computer within the patient's home, or a combination thereof. Methods of delivering home dialysis supplies are also provided that utilize the delivery robot and network.

13 Claims, 27 Drawing Sheets

(51) Int. Cl.
  *G07C 9/29* (2020.01)
  *B62D 61/12* (2006.01)
  *G07C 9/10* (2020.01)
  *G07C 9/22* (2020.01)
  *B60B 19/00* (2006.01)
  *B60B 19/12* (2006.01)

(52) U.S. Cl.
  CPC ......... *G05D 1/0088* (2013.01); *G05D 1/0276* (2013.01); *G07C 9/10* (2020.01); *G07C 9/22* (2020.01); *G07C 9/29* (2020.01); *B60B 19/003* (2013.01); *B60B 19/12* (2013.01); *G05D 2201/0206* (2013.01)

(58) Field of Classification Search
  CPC ...... B62D 61/12; G07C 9/29; G07C 9/00309; B60B 19/003; B60B 19/12
  USPC .......................................................... 701/25
  See application file for complete search history.

(56) References Cited

U.S. PATENT DOCUMENTS

| | | | |
|---|---|---|---|
| 4,989,888 A * | 2/1991 | Qureshi | B60N 2/286 280/30 |
| 5,507,358 A * | 4/1996 | Abe | A61G 5/068 180/209 |
| 5,690,046 A * | 11/1997 | Grzech, Jr. | B60F 3/0053 440/12.5 |
| 6,311,794 B1 | 11/2001 | Morrell et al. | |
| 6,394,743 B1 * | 5/2002 | Marsden | B62B 3/008 414/812 |
| 6,443,250 B1 | 9/2002 | Kamen et al. | |
| 6,547,026 B2 | 4/2003 | Kamen et al. | |
| 6,571,892 B2 | 6/2003 | Kamen et al. | |
| 6,779,621 B2 | 8/2004 | Kamen et al. | |
| 6,799,649 B2 | 10/2004 | Kamen et al. | |
| 6,976,685 B1 * | 12/2005 | King | B60N 2/286 280/30 |
| 7,506,921 B1 * | 3/2009 | Sigmon, Jr. | B60N 2/2848 280/30 |
| 7,546,889 B2 | 6/2009 | Kamen et al. | |
| 7,592,900 B2 | 9/2009 | Kamen et al. | |
| 7,779,939 B2 | 8/2010 | Kamen et al. | |
| 9,079,466 B2 * | 7/2015 | Bailey | B60F 3/0007 |
| 9,922,306 B1 * | 3/2018 | Russell | G06K 19/07758 |
| 10,216,188 B2 | 2/2019 | Brady et al. | |
| 10,222,798 B1 | 3/2019 | Brady et al. | |
| 10,308,430 B1 | 6/2019 | Brady et al. | |
| 10,613,533 B1 * | 4/2020 | Payson | G05D 1/0297 |
| 11,091,182 B1 * | 8/2021 | Lwali | B62B 13/18 |
| 2008/0265821 A1 | 10/2008 | Theobald | |
| 2010/0152922 A1 | 6/2010 | Carlson et al. | |
| 2010/0234995 A1 * | 9/2010 | Zini | B25J 11/009 700/258 |
| 2012/0185115 A1 | 7/2012 | Dean | |
| 2015/0274214 A1 * | 10/2015 | Riddick | B62D 25/182 29/434 |
| 2018/0056985 A1 | 3/2018 | Coulter et al. | |
| 2019/0227551 A1 * | 7/2019 | Igata | G06Q 10/0836 |
| 2019/0278274 A1 * | 9/2019 | Igata | G06Q 30/0607 |
| 2019/0365585 A1 * | 12/2019 | Hacikadiroglu | A61G 5/042 |
| 2019/0388171 A1 * | 12/2019 | Schermeier | A61B 50/13 |
| 2020/0064852 A1 * | 2/2020 | Sibley | B60P 3/007 |
| 2020/0283080 A1 | 9/2020 | Rudakevych et al. | |
| 2022/0064852 A1 | 3/2022 | Warita et al. | |

FOREIGN PATENT DOCUMENTS

| | | | | |
|---|---|---|---|---|
| CN | 107671865 A | * | 2/2018 | ............ A47G 23/08 |
| CN | 207241835 U | | 4/2018 | |
| CN | 109159830 A | | 1/2019 | |
| CN | 208993797 U | | 6/2019 | |
| CN | 108216413 B | | 6/2020 | |
| CN | 210852694 U | * | 6/2020 | |
| CN | 213502643 U | * | 6/2021 | |
| CN | 114264306 A | * | 4/2022 | |
| EP | 2210793 A2 | * | 7/2010 | ............ B62B 3/008 |
| KR | 1020170127592 A | | 6/2019 | |
| WO | WO-2004016210 A1 | * | 2/2004 | ............ A61G 5/00 |
| WO | 2017220407 A1 | | 12/2017 | |
| WO | WO-2017220407 A1 | * | 12/2017 | ............ B62D 11/20 |

OTHER PUBLICATIONS

International Search Report for Application No. PCT/US2022/013696, dated May 2, 2022.
Written Opinion of ISA for Application No. PCT/US2022/013696, dated May 2, 2022.

* cited by examiner

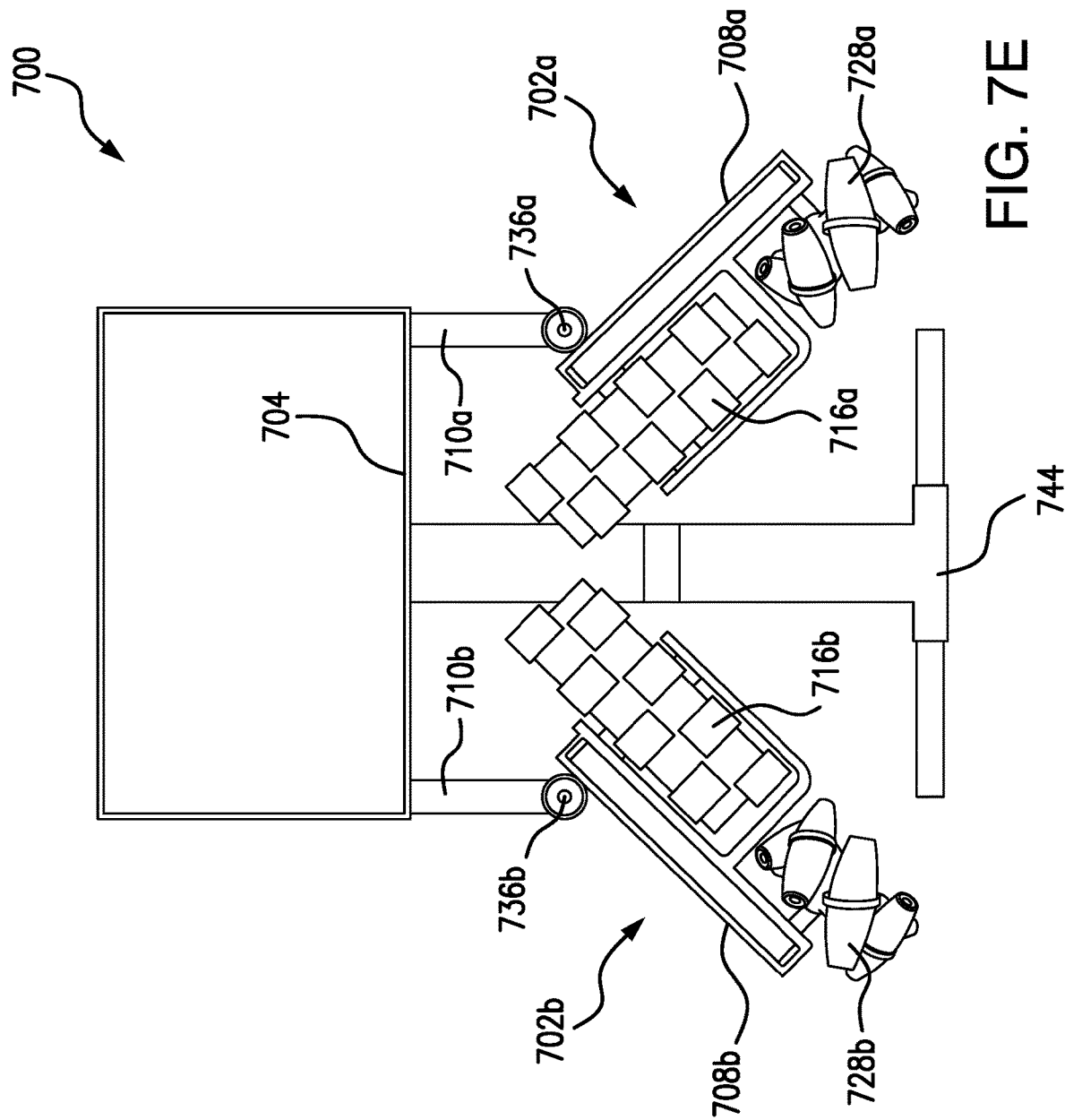

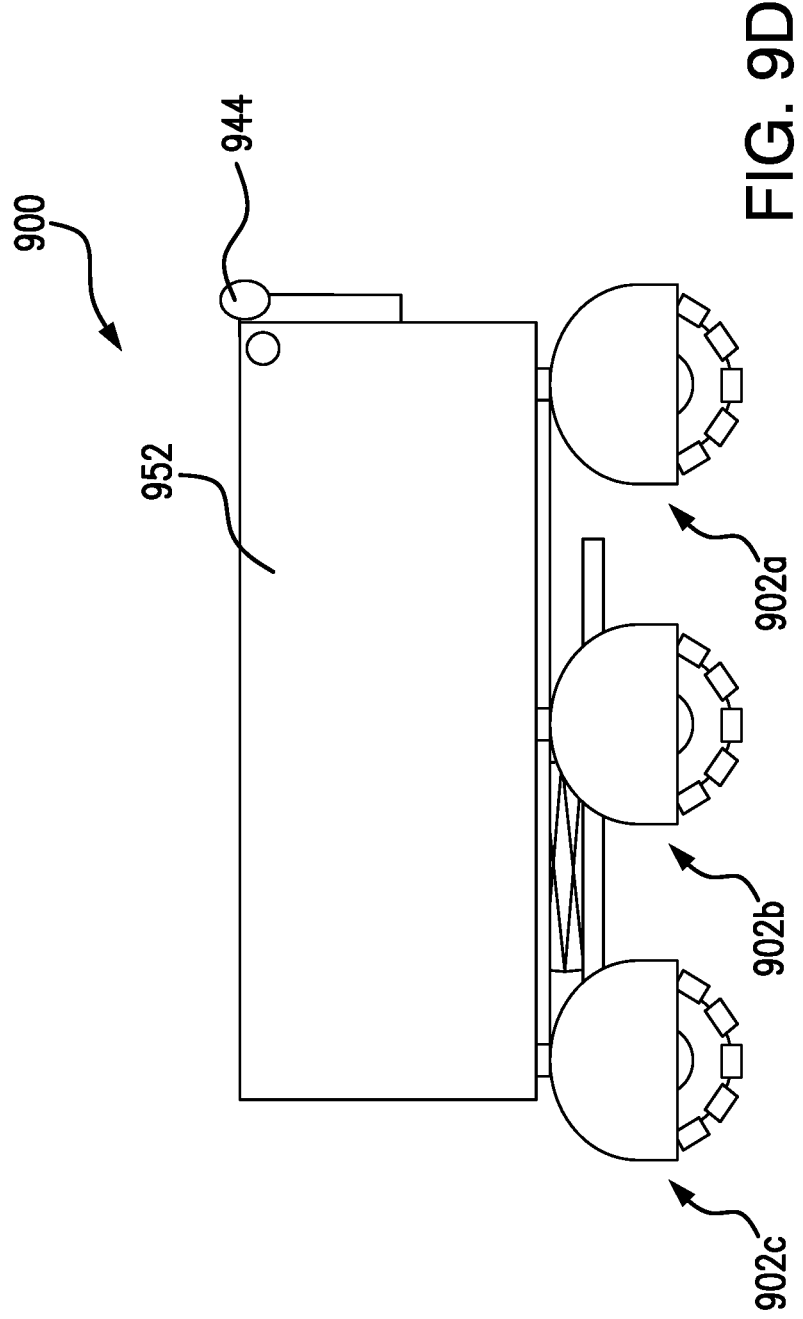

HOME DIALYSIS SUPPLIES DELIVERY ROBOT, NETWORK, AND METHOD

FIELD OF THE INVENTION

The present invention relates to the delivery of supplies using a robot. The present invention also relates to a delivery network for delivering supplies to a home

BACKGROUND OF THE INVENTION

Home dialysis is often a preferred dialysis treatment modality due to patients being able to dialyze more often, on their own schedule, and in the comfort of their home. Home dialysis is also typically more cost effective because it does not require the physical infrastructure costs of a clinic, transportation costs, and the accompanying costs of medical professionals to deliver treatment. One of the challenges, however, of home dialysis, is the distribution of dialysis supplies to a patient's home.

Current methods of delivering home dialysis supplies involve the use of large delivery trucks that require drivers to use a motorized pallet jack and an electric hand truck to pack, load, deliver, unload, and unpack the dialysis supplies. Sometimes, as many as six pallets worth of dialysis supplies are delivered. The delivery can include up to a month's worth of dialysis supplies, including, for example, dialysis solution bags, disposable tubing sets, bags of saline, other chemicals, cleaning supplies, masks, gloves, wipes, and related supplies. Six to ten individual deliveries from the truck to different home dialysis patients may take place during a regular workday.

Home dialysis supplies, once delivered to a patient's home, and then must be stored. Delivering large amounts of supplies all at once places a storage burden on the dialysis patients. Additionally, when moving the dialysis supplies from the truck into the house, the drivers can track mud, rain, snow, dirt, sand, grass, leaves, pet feces, and other lawn and yard debris into the patient's home. Another difficulty includes reaching isolated patients at remote locations, or reaching patients that live in dwellings having obstacles to an entrance, for example, curbs, steps, steep slopes, rough driveways, landings, porches, gates, fences, and the like. Some of such obstacles have heretofore precluded an option of home dialysis altogether.

SUMMARY OF THE INVENTION

A feature of the present invention is to provide greater flexibility and convenience to dialysis patients, particularly home dialysis patients.

Another feature of the present invention is to provide a delivery robot, network, and method to increase the frequency of delivery of dialysis supplies, to a dwelling, such as to the home of a dialysis patient, and therefore reduce storage space requirements at the dwelling.

A further feature of the present invention is to provide a delivery robot, network, and method that enable the delivery of dialysis supplies to a dwelling, such as the home of a dialysis patient, in a remote location.

A further feature of the present invention is to provide a delivery robot, network, and method that enable the delivery of dialysis supplies to a dwelling that has various obstacles along a pathway to the dwelling.

An additional feature of the present invention is to provide a delivery robot, network, and method that enable an autonomous delivery and access into a dwelling to drop off dialysis supplies in a safe and secure manner.

An additional feature of the present invention is to provide a delivery robot, network, and method that enable an autonomous delivery robot to gain access to the inside of a dwelling, to drop off home dialysis goods, without tracking debris into the dwelling, such as grass, mud, water, snow, slush, dirt, leaves, rocks, clay, sand, animal waste, and the like.

Additional features and advantages of the present invention will be set-forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates a delivery robot that can be used, for example, for home dialysis supplies deliveries. The delivery robot can be an autonomous delivery robot. The delivery robot comprises a drive train for moving and transforming the delivery robot, and a control unit configured to control the drive train, at least based on signals received. A sensor system is included and is configured to sense objects and send signals to the control unit. A supplies holder is provided that is configured to hold supplies. The supplies holder is connected to the drive train for movement with movement of the drive train. The delivery robot can comprise an outdoor motive traction device for traversing an outdoor surface, and an indoor motive traction device for traversing an indoor surface. A power source can be configured to power the drive train and the power source can comprise a rechargeable or disposable battery. Separate drive trains can be provided to drive the outdoor motive traction device and the indoor motive traction device, separately.

The drive train can be configured to be controlled by the control unit to accomplish various tasks. The drive train can be controlled to maintain the indoor motive traction device in a lifted position while the outdoor motive traction device traverses an outdoor surface. The drive train can be controlled to lower the indoor motive traction device into a home at a threshold into the home while the outdoor motive traction device remains in contact with an outdoor surface outside of the threshold. The drive train can further be controlled to lift the outdoor motive traction device once the indoor motive traction device contacts an inside surface inside the home. In such a way, the outdoor motive traction device does not, or can be prevented from, contacting the inside surface and tracking debris into the home.

The delivery robot can further comprise an outdoor motive traction device shield. The control unit can be configured to control the drive train to move the outdoor motive traction device shield into a position to shield the outdoor motive traction device, for example, after the outdoor motive traction device has been lifted at a threshold to a home and before the delivery robot moves past the threshold and into the home.

Each of the indoor and outdoor motive traction devices can independently comprise one or more of wheels, a track, treads, tires, rollers, brushes, rims, walking legs, combinations thereof, and the like. Each of the indoor and outdoor motive traction devices can comprise a wheel module, a set of wheels, a plurality of wheels, a single axis, multiple axes, combinations thereof, and the like.

According to one or more embodiments, a system for delivering items is provided. The system can comprise one or more autonomous ground vehicles (AGVs), including at least a first AGV. The first AGV can comprise an outdoor motive traction device, an indoor motive traction device, a receptacle configured to retain one or more items therein, and one or more motors configured to drive the outdoor motive traction device and the indoor motive traction device and to convert the AGV between an outdoor configuration and an indoor configuration.

The system can further comprise a computing system associated with the first AGV and comprising a processor and a memory. The memory can store therein, or have stored therein, computer-readable instructions. The computer-readable instructions, upon execution by the processor, can configure the computing system to instruct the first AGV to take actions. The actions can involve (1) driving the first AGV in the outdoor configuration to an entrance of a dwelling associated with a delivery of one or more items retained in the receptacle. The actions can involve (2) converting from the outdoor configuration to the indoor configuration at an entrance to the dwelling, wherein, in the indoor configuration, the indoor motive traction device is deployed from the first AGV such that the indoor motive traction device is engaged on a dwelling surface while the outdoor motive traction device is retracted such that the outdoor motive traction device is elevated above the dwelling surface. The actions can involve (3) driving the first AGV in the indoor configuration on the dwelling surface inside of the dwelling, to an indoor drop-off location. The system can further comprise a delivery vehicle, a warehouse, or both.

The present invention also relates to a method of delivering items. The method can comprise loading one or more autonomous ground vehicles (AGVs), including a first AGV, onto a delivery vehicle. The first AGV can comprise a receptacle, a motive traction device, a motor, and a computing system comprising a processor and a memory to control the motor and the motive traction device for autonomous driving. The method can involve operating a navigation system in communication with the computing system. The method can comprise loading the receptacle of the first AGV with one or more items for delivery, driving the delivery vehicle to an AGV drop-off location, and deploying the first AGV from the delivery vehicle.

The one or more items can comprise dialysis supplies and the dialysis supplies can comprise solution bags, disposable tubing sets, saline, chemicals, masks, gloves, wipes, a combination thereof, or the like. The delivery pathway can comprise a street pathway and an entrance pathway. The street pathway can comprise directions from the AGV drop-off location to a front of a dwelling associated with a delivery of the one or more items. The entrance pathway can comprise directions from the front of the dwelling to an entrance of the dwelling. The computing system can instruct the first AGV to drive along an indoor pathway from the entrance of the dwelling to an indoor drop-off location within the dwelling. The computing system can instruct the first AGV to convert from an outdoor configuration to an indoor configuration in between driving the entrance pathway and driving the indoor pathway.

The method can involve using a first AGV comprising an identification tag. The dwelling can comprise a reader configured to read the identification tag. The reader can read the identification tag and send a signal. The signal can unlock the entrance, signal the entrance to open, or both. The reader can read the identification tag using radio frequency transmission.

The methods can also involve dropping off multiple delivery robots, at different respective locations, and then returning to pick them up after each has delivered supplies to a respective dwelling. A robot delivery vehicle, such as a truck, can be used according to the method and can include a charging station, a cleaning station, and a supplies store. The robot delivery vehicle and delivery robots can all operate autonomously, for example, based on prescription information received that pertains to home dialysis patients at the different respective dwellings.

It is to be understood that both the foregoing general description and the following detailed description are exemplary and explanatory only and intended to provide a further explanation of the present invention, as claimed.

It is to be understood that both the foregoing general description and the following detailed description are exemplary and explanatory only and intended to provide a further explanation of the present invention, as claimed.

BRIEF DESCRIPTION OF THE DRAWINGS

The invention may be more fully understood with reference to the accompanying drawings. The drawings are intended to illustrate, not limit, the present teachings, according to an embodiment of the present invention.

FIG. 7E is a front view of the autonomous ground vehicle shown in FIGS. 7A-7D, further transitioning from the outdoor configuration shown in FIG. 7A to an indoor configuration.

FIG. 9D is a side view of the autonomous ground vehicle shown in FIGS. 9A-9C, in an outdoor configuration.

DETAILED DESCRIPTION OF THE INVENTION

Figure 1A:
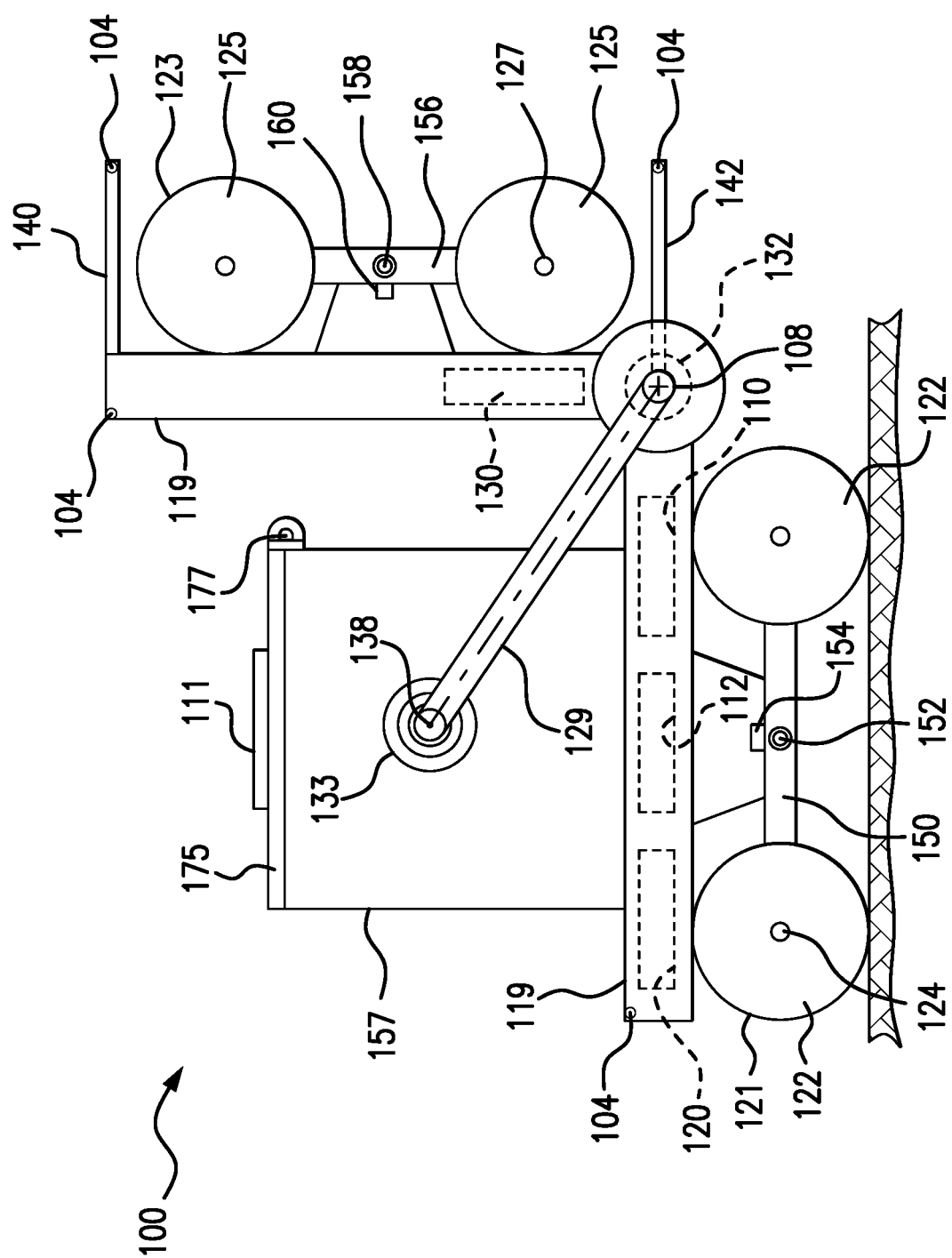
FIG. 1A is a side view of an autonomous ground vehicle in an outdoor configuration, according to an embodiment of the present invention.

According to one or more embodiments of the present invention, a delivery robot is provided that can be used, for example, for home dialysis supplies deliveries. According to various embodiments, the delivery robot can comprise a drive train configured for moving the delivery robot and for transforming the delivery robot into an outdoor configuration and into an indoor configuration. The drive train can transform the delivery robot between the outdoor configuration and the indoor configuration. A control unit can be provided that is configured to control the drive train, at least based on signals received. The delivery robot can have a sensor system configured to sense objects and to send signals to the control unit. The delivery robot can have a supplies holder configured to hold supplies. The supplies holder can be connected to the drive train for movement with movement of the drive train. The delivery robot can have an outdoor motive traction device for traversing an outdoor surface, and an indoor motive traction device for traversing an indoor surface.

The drive train can be configured to be controlled by the control unit to carry out various operations. The operations can include: (1) maintaining the indoor motive traction device in a lifted position while the outdoor motive traction device traverses an outdoor surface in the outdoor configuration; (2) transforming the delivery robot from the outdoor configuration to the indoor configuration; and (3) maintaining the outdoor motive traction device in the lifted position while the indoor motive traction device traverses an indoor surface in the indoor configuration.

The outdoor motive traction device and the indoor motive traction device can together comprise sets of wheels. Each set of wheels can comprise one or more indoor wheels mounted for rotation on a respective pivoting bracket, and one or more outdoor wheels mounted for rotation on the same respective pivoting bracket. Each pivoting bracket can comprise a motorized drive configured to pivot the pivoting bracket between (1) the outdoor configuration, wherein the outdoor wheel of the respective set of wheels is in a lower position relative to the indoor wheel of the respective set of wheels, and (2) the indoor configuration, wherein the indoor wheel of the respective set of wheels is in a lower position relative to the outdoor wheel of the respective set of wheels. The indoor wheel of each set of wheels can comprise a mecanum wheel, for example to enable the robot to move diagonally or perpendicularly in tight spaces within the home.

The delivery robot can have a first maximum height in the outdoor configuration and a second maximum height in the indoor configuration. The second maximum height can be greater than the first maximum height, less than the first maximum height, or the same as the first maximum height. The delivery robot can have a first maximum width in the outdoor configuration, and a second maximum width in the indoor configuration. The first maximum width can be greater than the second maximum width, less than the second maximum width, or the same width as the second maximum width.

The delivery robot can further comprise a lift. The lift can be configured to lift the delivery robot into an elevated position such that the outdoor motive traction device and the indoor motive traction device are both lifted off of an outdoor surface, off of an indoor surface, or off of both an outdoor surface and an indoor surface. The delivery robot can be configured to transition between the outdoor configuration and the indoor configuration while in the elevated position.

The delivery robot can be an autonomous delivery robot. The delivery robot can comprise a drive train for moving and transforming the autonomous delivery robot, and a control unit configured to autonomously control the drive train, at least based on signals received. A sensor system can be included and configured to sense objects and send signals to the control unit. A supplies holder can be provided and can be configured to hold supplies and to be connected to the drive train for movement with movement of the drive train. The robot can comprise an outdoor motive traction device for traversing an outdoor surface, and an indoor motive traction device for traversing an indoor surface. A power source can be configured to power the drive train. The power source can comprise a rechargeable or disposable battery.

According to one or more embodiments, the drive train can be configured to be controlled by the control unit to (1) maintain the indoor motive traction device in a lifted position while the outdoor motive traction device traverses an outdoor surface, (2) lower the indoor motive traction device into a home at a threshold into the home while the outdoor motive traction device remains in contact with an outdoor surface outside of the threshold. The drive train can further be configured to be controlled by the control unit to (3) lift the outdoor motive traction device once the indoor motive traction device contacts an inside surface inside the home. In such a way, the outdoor motive traction device does not, or can be prevented from, contacting the inside surface.

The delivery robot can further comprise an outdoor motive traction device shield. The control unit can be configured to control the drive train to move the outdoor motive traction device shield into a position to shield the outdoor motive traction device, for example, after the outdoor motive traction device has been lifted at a threshold to a home and before the delivery robot moves past the threshold and into the home. The delivery robot can comprise an indoor motive traction device shield. The control unit can be configured to control the drive train to move the indoor motive traction device shield into a position to shield the indoor motive traction device before the indoor motive traction device has been lowered into a home at a threshold into the home.

The delivery robot can comprise both an outdoor motive traction device shield and an indoor motive traction device shield. The control unit can be configured to (1) control the drive train to move the outdoor motive traction device shield into a position to shield the outdoor motive traction device, for example, after the outdoor motive traction device has been lifted at a threshold to a home and before the delivery robot moves past the threshold and into the home. The control unit can further be configured to (2) control the drive train to move the indoor motive traction device shield into a position to shield the indoor motive traction device before the indoor motive traction device has been lowered into a home at a threshold into the home. The control unit can further be configured to (3) unshield the indoor motive traction device at the threshold so that the indoor motive traction device can be lowered onto and make contact with an inside surface inside a home.

The supplies holder can comprise a flatbed. The supplies holder can comprise a clamp. The supplies holder can comprise a frame that includes a motor-drive gate. According to one or more embodiments, the delivery robot further comprises a package of home dialysis supplies, for example, held by the supplies holder. The supplies holder can comprise a lock. The supplies holder can remain locked, for example, at all times, but can be configured to be unlockable when within a warehouse, when within a delivery truck, when within a home, or a combination thereof. The supplies holder can be configured to remain locked and not unlockable during transit. The supplies holder can be unlockable, for example, by using a key. Exemplary keys include physical mechanical keys, electronic keys, codes, key FOBs, bioinformatics, RFID tags, combinations thereof, and the like. The supplies holder can be configured to remain locked at all times, except when within a warehouse, within a delivery truck, within a patient's home, a combination thereof, or the like, where it can be locked but unlockable. The supplies holder can be configured to be unlocked only at one or more specified locations, and otherwise be configured so as not to be unlockable. The supplies holder can be configured to be unlockable at different locations, by different user's, by using different keys, or by a combination thereof. For example, supply company personal can possess authority or keys to unlock the supplies holder at a specific warehouse or within a specific delivery truck, while a patient, the patient's caregiver, or the patient's care partner can possess authority or a key to unlock the supplies holder only within the patient's home. The lock can include a keypad for entering information such as a code.

The outdoor motive traction device can comprise one or more of wheels, a track, treads, tires, rollers, brushes, rims, walking legs, combinations thereof, and the like. The indoor motive traction device can comprise one or more of wheels, a track, treads, tires, rollers, brushes, rims, walking legs, combinations thereof, and the like. The outdoor motive traction device can comprise a wheel module, a set of wheels, a plurality of wheels, a single axis, multiple axes, combinations thereof, and the like. The indoor motive traction device can comprise a wheel module, a set of wheels, a plurality of wheels, a single axis, multiple axes, combinations thereof, and the like.

According to one or more embodiments, a home dialysis supplies delivery network is provided. The network can comprise a delivery robot as described herein. The network can comprise a remote network computer configured to send information, instructions, or both, to the delivery robot. The delivery robot can be an autonomous delivery robot. The delivery robot can be configured to autonomously react to information, instructions, or both, received from the remote network computer. The home dialysis supplies delivery network can further comprise a robot carrier vehicle. The remote network computer can be located, for example, inside or on the robot carrier vehicle. The robot carrier vehicle can comprise a lift to load, unload, or load and unload, the delivery robot. The robot carrier vehicle can comprise an autonomous vehicle, for example, an autonomous truck. The robot carrier vehicle can comprise an autonomous truck that has a truck bed. One or more additional delivery robots, for example, autonomous delivery robots, can be stored on the truck bed. The truck bed can have additional space available for storing a first delivery robot, for example, a first autonomous delivery robot. A first autonomous delivery robot can be stored on the truck bed and one or more additional autonomous delivery robots can also be stored on the truck bed. The robot carrier vehicle can comprise an autonomous truck that comprises a battery charger, and a delivery robot on or in the truck can comprise a rechargeable battery configured to be charged by the battery charger.

A home dialysis supplies delivery network is also provided wherein a remote network computer can be configured to send prescription information pertaining to a home dialysis patient living at a home. An autonomous delivery robot can be configured to receive prescription information from the remote network computer. The autonomous delivery robot can be configured to autonomously react to prescription information received, load itself with prescribed home dialysis supplies based on prescription information received, and deliver the prescribed home dialysis supplies to the home dialysis patient at the home.

The network can comprise a robot carrier vehicle and the robot carrier vehicle can comprise a lift to load, unload, or load and unload, an autonomous delivery robot. The robot carrier vehicle can comprise a store of home dialysis supplies. The lift can be configured to be used by the autonomous delivery robot to load itself with prescribed home dialysis supplies.

According to one or more embodiments, a home dialysis supplies delivery network is provided that includes an autonomous delivery robot as described herein, and a warehouse comprising a store of home dialysis supplies. The warehouse can further comprise a lift, a programming computer, or both. The programming computer can comprise a computer interface. The network can also comprise a robot carrier vehicle. The control unit of the autonomous delivery robot can comprise a memory. The autonomous delivery robot can comprise a robot interface configured to interface with the computer interface to receive a program of instructions from the programming computer. The control unit can be configured to store a program of instructions received through the robot interface, in the memory. The lift can be configured to lift the autonomous delivery robot, while the autonomous delivery robot is holding a load of prescribed home dialysis supplies, into the robot carrier vehicle. The autonomous delivery robot can comprise a power source to power the drive train. The power source can comprise a rechargeable battery. The warehouse can comprise a battery charger configured to charge the rechargeable battery. The warehouse can further comprise an autonomous supplies lift, wherein the autonomous supplies lift is configured to (1) receive prescription information pertaining to a home dialysis treatment, (2) retrieve prescribed home dialysis supplies from the store of the warehouse in fulfillment of the prescription information, and (3) load the prescribed home dialysis supplies onto the autonomous delivery robot. The network can further comprise one or more additional autonomous delivery robots each of which is identical to a first autonomous delivery robot.

According to one or more embodiments, a home dialysis supplies delivery method is provided. The method can comprise loading a first autonomous delivery robot, with prescribed home dialysis supplies, to form a first loaded autonomous delivery robot. The method can comprise loading a second autonomous delivery robot with prescribed home dialysis supplies, to form a second loaded autonomous delivery robot. The method can comprise loading the first and second loaded autonomous delivery robots into a robot carrier vehicle. The method can comprise unloading the first loaded autonomous delivery robot, from the robot carrier vehicle, at a first location, and leaving the first loaded autonomous delivery robot at the first location while moving the robot carrier vehicle to a second location. The method can involve unloading the second loaded autonomous delivery robot, from the robot carrier vehicle, at the second location. The method can involve autonomously delivering the prescribed home dialysis supplies from the first loaded autonomous delivery robot to a first home. The method can involve unloading the first loaded autonomous delivery robot at the first home, to form a first unloaded autonomous delivery robot. The method can involve returning the robot carrier vehicle to the first location from the second location, and loading the first unloaded autonomous delivery robot into the robot carrier vehicle at the first location. The method can involve autonomously delivering the prescribed home dialysis supplies from the second loaded autonomous delivery robot to a second home, and unloading the second loaded autonomous delivery robot at the second home, to form a second unloaded autonomous delivery robot. The method can involve returning the robot carrier vehicle to the second location from the first location, and loading the second unloaded autonomous delivery robot into the robot carrier vehicle at the second location.

The home dialysis supplies delivery method can further comprise transporting the robot carrier vehicle to a warehouse having a store of home dialysis supplies, and unloading a first unloaded autonomous delivery robot and a second unloaded autonomous delivery robot from the robot carrier vehicle at the warehouse. The method can further comprise reloading each of the first autonomous delivery robot and the second autonomous delivery robot with prescribed home dialysis supplies at the warehouse. Each of the first autonomous delivery robot and the second autonomous delivery robot can comprise a rechargeable battery, the warehouse can comprise a battery charger, and the method can further comprise charging the rechargeable batteries at the warehouse.

According to one or more embodiments, a system for delivering items is provided. The system can comprise one or more autonomous ground vehicles (AGVs), including at least a first AGV. The first AGV can comprise an outdoor motive traction device, an indoor motive traction device, a receptacle configured to retain one or more items therein, and one or more motors configured to drive the outdoor motive traction device and the indoor motive traction device and to convert the AGV between an outdoor configuration and an indoor configuration. The system can further comprise a computing system associated with the first AGV and comprising a processor and a memory. The memory can store, or have stored thereon, computer-readable instructions. The computer-readable instructions, upon execution by the processor, can configure the computing system to instruct the first AGV to take actions. The actions can involve (1) driving the first AGV in the outdoor configuration to an entrance of a dwelling associated with a delivery of one or more items retained in the receptacle. In the outdoor configuration, the outdoor motive traction device can be deployed from the first AGV such that the outdoor motive traction device is engaged on an outdoor surface while the indoor motive traction device is retracted such that the indoor motive traction device is elevated above the outdoor surface. The actions can involve (2) converting from the outdoor configuration to the indoor configuration at an entrance to the dwelling, wherein, in the indoor configuration, the indoor motive traction device is deployed from the first AGV such that the indoor motive traction device is engaged on a dwelling surface while the outdoor motive traction device is retracted such that the outdoor motive traction device is elevated above the dwelling surface. The actions can involve (3) driving the first AGV in the indoor configuration on the dwelling surface inside of the dwelling, to an indoor drop-off location.

The system can further comprise a delivery vehicle. The computer-readable instructions, upon execution by the processor, can configure the computing system to instruct the first AGV to drive from the delivery vehicle to the entrance of the dwelling. The first AGV can comprise a global positioning system, and the computing system can be configured to determine a street pathway from the delivery vehicle to the dwelling. The delivery vehicle can comprise an autonomous truck. The first AGV can have a chargeable power module, the delivery vehicle can comprise a docking station, and the docking station can comprise a charger configured to charge the power module. The docking station can further comprise a cleaning station configured to clean at least the outdoor motive traction device.

According to one or more embodiments of the system, the computer-readable instructions, upon execution by the processor, can configure the computing system to instruct the first AGV to determine when the one or more items are removed from the receptacle, and, upon determining when the one or more items are removed from the receptacle, provide follow-up instructions the first AGV. The follow-up instructions can include instructions to (1) drive, in the indoor configuration, from the indoor drop-off location to the entrance of the dwelling. The follow-up instructions can include instructions to (2) convert from the indoor configuration to the outdoor configuration at the entrance of the dwelling. The follow-up instructions can include instructions to (3) drive, in the outdoor configuration, back to the delivery vehicle.

The first AGV can comprise one or more sensors and the one or more sensors can be configured to detect whether an access barrier at the entrance is open. The one or more sensors can be configured to send an open signal to the computing system when the access barrier is detected as being open. The computing system can be configured to instruct the first AGV to convert from the outdoor configuration to the indoor configuration upon receiving an open signal. An entrance pathway from a drop-off location to the entrance can be saved in the memory or streamed to the computing system. An indoor pathway from the entrance of the dwelling to the indoor drop-off location can be saved in the memory or streamed to the computing system. The computing system can be configured to determine the entrance pathway and the indoor pathway. The pathways can be determined form data loaded to the memory, data acquired by the one or more sensors, data acquired by a navigation system, data wirelessly acquired from a remote computing system, a combination thereof, or the like.

The first AGV of the system can comprise an optical sensor. The first AGV of the system can comprise a distance sensor. The first AGV of the system can comprise a proximity sensor directed at the receptacle and configured to determine if an item is within the receptacle. The dwelling can have an access barrier and the access barrier can have a lock. The first AGV can comprise an identification tag and the dwelling can comprise a reader configured to read the identification tag. The lock can be configured such that, when the identification tag is read by the reader, the lock unlocks and the access barrier opens. The identification tag can comprise a radio frequency identification (RFID) tag, and the reader can comprise an RFID reader.

The dwelling can comprise a remote computing system within the dwelling. The first AGV can comprise a wireless transmitter. The computing system can be configured to instruct the first AGV to send a wireless communication to the remote computing system. The wireless communication can comprise a notification that the first AGV has arrived at the dwelling, a notification pertaining to an estimated time of arrival of the first AGV at the dwelling, a combination thereof, or the like. The remote computing system can be part of a mobile device, a smart doorbell, a smart lock, a smart television, a smart speaker, a combination thereof, or the like.

According to one or more embodiments, the outdoor motive traction device and the indoor motive traction device can be pivotably coupled to a frame. A system can be provided such that, when the first AGV converts from the outdoor configuration to the indoor configuration, the one or more motors pivot the indoor motive traction device from an elevated position to a horizontal position through the entrance such that the indoor motive traction device engages the dwelling surface inside of the dwelling. The converting can involve the one or more motors pivoting the outdoor motive traction device from a horizontal position to an elevated position such that the outdoor motive traction device is lifted up and off of the outdoor surface outside of the entrance and before the first AGV completely enters the dwelling. The first AGV can further comprise a pivoting arm pivotably connecting the receptacle to the frame, and the one or more motors can be configured to pivot the pivoting arm such that the receptacle moves from a position over the outdoor motive traction device to a position over the indoor motive traction device while the outdoor motive traction device and the indoor motive traction device are both in the horizontal position.

The first AGV can further comprise at least one shield configured to cover the indoor motive traction device in the outdoor configuration and configured to cover the outdoor motive traction device in the indoor configuration. The at least one shield can comprise a first shield configured to cover the indoor motive traction device in the outdoor configuration and a second shield configured to cover the outdoor motive traction device in the indoor configuration. According to one or more embodiments of the system, the outdoor motive traction device comprises one or more of wheels, a track, treads, tires, rollers, brushes, rims, walking legs, combinations thereof, and the like. According to one or more embodiments of the system, the indoor motive traction device comprises one or more of wheels, a track, treads, tires, rollers, brushes, rims, walking legs, combinations thereof, and the like. The outdoor motive traction device can comprise a first wheel module comprising a plurality of outdoor wheels. The first wheel module can comprise a first cluster axis and a pair of first cluster arms rotatable about the first cluster axis, the plurality of outdoor wheels can be rotatable about member axes fixed with respect to the pair of first cluster arms, and the one or more motors can be configured for and capable of rotating the first cluster arms about the first cluster axis to cause the first wheel module to ascend or descend a curb or steps. The indoor motive traction device can comprise a second wheel module comprising a plurality of indoor wheels. The second wheel module can comprise a second cluster axis and a pair of second cluster arms rotatable about the second cluster axis, the plurality of indoor wheels can be rotatable about member axes fixed with respect to the pair of second cluster arms, and the one or more motors can be configured for and capable of rotating the second cluster arms about the second cluster axis to cause the second wheel module to ascend or descend steps. The system can include one or more items retained in the receptacle, for example, home dialysis supplies retained in the receptacle.

According to one or more embodiments, a method of delivering items is provided. The method can comprise loading one or more autonomous ground vehicles (AGVs), including a first AGV, onto a delivery vehicle. The first AGV can comprise a receptacle, a motive traction device, a motor, and a computing system comprising a processor and a memory to control the motor and the motive traction device for autonomous driving. The method can involve operating one or more sensors of the first AGV in communication with the computing system. The method can involve operating a navigation system in communication with the computing system. The method can comprise loading the receptacle of the first AGV with one or more items for delivery. The method can comprise driving the delivery vehicle to an AGV drop-off location, and deploying the first AGV from the delivery vehicle. The method can involve causing the computing system to instruct the first AGV to drive along a delivery pathway from the AGV drop-off location to an entrance of the dwelling, based on coordinates communicated to the computing system. The method can involve determining the coordinates to communicate to the computing system by using the plurality of sensors, the navigation system, or a combination thereof. The coordinates can be preloaded in the memory.

The one or more items can comprise dialysis supplies and the dialysis supplies can comprise solution bags, disposable tubing sets, saline, chemicals, masks, gloves, wipes, a combination thereof, or the like. The delivery pathway can comprise a street pathway and an entrance pathway. The street pathway can comprise directions from the AGV drop-off location to a front of a dwelling associated with a delivery of the one or more items. The entrance pathway can comprise directions from the front of the dwelling to an entrance of the dwelling. The computing system can instruct the first AGV to drive along an indoor pathway from the entrance of the dwelling to an indoor drop-off location within the dwelling. The computing system can instruct the first AGV to convert from an outdoor configuration to an indoor configuration in between driving the entrance pathway and driving the indoor pathway.

The method can involve using a first AGV comprising an identification tag. The dwelling can comprise a reader configured to read the identification tag. The reader can read the identification tag and send a signal. The signal can unlock the entrance, signal the entrance to open, or both. The reader can read the identification tag using radio frequency transmission. The method can involve using a motive traction device of a first AGV, which can comprise a first wheel module comprising a plurality of outdoor wheels, and a second wheel module comprising a plurality of indoor wheels. The method can involve switching the first AGV between an outdoor configuration comprising the first wheel module deployed from the first AGV such that the plurality of outdoor wheels are engaged on an outdoor surface while the second wheel module is retracted such that the plurality of indoor wheels are elevated above the outdoor surface, and an indoor configuration. In the indoor configuration, the second wheel module is deployed from the first AGV such that the plurality of second wheels are engaged on a dwelling surface inside the dwelling while the first wheel module is retracted such that the plurality of outdoor wheels are elevated above the dwelling surface.

The computing system can instruct the first AGV to drive a return pathway once the computing system determines that an item has been or items have been removed from the receptacle. The return pathway can comprise directions from the dwelling to a meeting location to meet with the delivery vehicle. Coordinates of the return pathway can be loaded or preloaded on the memory. Coordinates can be wirelessly communicated to the computing system. Coordinates can be determined by the computing system using a plurality of sensors, a navigation system, a combination thereof, or the like. The return pathway can include at least a reverse direction relative to the indoor pathway, the entrance pathway, or both. The computing system can instruct the first AGV to convert from the indoor configuration to the outdoor configuration in between driving the reverse of the indoor pathway and the entrance pathway. The delivery vehicle can be an autonomous truck.

An "indoor drop-off location," as used herein, refers to any designated location within a dwelling to which one or more delivery items can be delivered, unloaded, and left. An "AGV drop-off location," as used herein, refers to any designated location outside of a dwelling in which a robot delivery vehicle drops off one or more AGVs that are then to be driven to a dwelling. An AGV drop-off location can also refer herein to a designated location outside of a dwelling, where a robot delivery vehicle drops off one or more non-autonomous delivery robots. A "meeting location," as used herein, refers to any designated location outside of a dwelling, at which a delivery vehicle meets with one or more AGVs or other delivery robots to distribute items to the one or more delivery robots for delivering to a dwelling, or to pick up the one or more delivery robots and return to a home base, such as a warehouse. A "dwelling," as used herein refers to the residence (home) of a home dialysis patient, or any building where a dialysis patient user spends a considerable amount of time, and can include a hospital, nursing home, work place, dormitory, prison, or the like. A "wheel module," as used herein, refers to any group of wheels that are used together to traverse a ground or surface, regardless of whether the wheels are physically joined together, comprise a cluster arm, are physically separate and distinct from one another, are driven together, or are driven separately and distinctly.

The delivery robots, network and methods of the present invention can be implemented to enable a delivery robot to deliver dialysis supplies such as, but not limited to, solution bags, disposable tubing sets, bags of saline, other chemicals, masks, gloves, wipes, cleaning solutions, and combinations thereof. The supplies can be packaged within a crate, box, bag, barrel, or provided without such packaging and instead placed directly within the delivery robot receptacle. The present invention is not limited to the delivery of dialysis supplies and can be used to deliver any goods that can be delivered to a dwelling.

Components, machines, systems, and methods related to AGVs and other delivery robots, which can be used in or as a part of the present invention, include those described in U.S. Pat. No. 10,216,188 B2 to Brady et al. and U.S. Pat. No. 10,393,528 B2 to Schubert et al., and in U.S. Patent Application Publications Nos. US 2018/0232839 A1 to Heinla et al. and US 2019/0179329 A1 to Keivan et al., each of which is incorporated herein by reference in its entirety.

The delivery robots or AGVs can be sized and shaped to be drivable on a standard sidewalk or road, and to fit within a doorway or other access point, for example, to fit within a home dialysis patient's dwelling. The delivery robot can have one or more receptacles, including, for example, receptacles of different sizes. Different receptacles can be interchanged, added, removed, replaced, or switched, so that the delivery robot can accommodate different loads of supplies. In various implementations, weatherproofing techniques can be utilized to protect the functionality of the delivery robot and any operational components thereof, for example, the receptacles, user interfaces, motive tractions devices, computing system, antennae, and the like. The delivery robot can further include a computing system that controls the operation of, routing, charging, navigation, communications, sensors, item engagement features, configuration, reconfiguration, and the like, of the delivery robot.

Various sensors can be mounted to the delivery robot. For example, sensors can be mounted on the front, back, top, bottom, sides, a combination thereof, or the like, of the delivery robot. The sensors can be of various types and can include sensors of different types. In general, certain sensors can be utilized to assist with the navigation, object-sense-and-avoidance, configuring, loading, unloading, and the like, of the delivery robot. For example, the sensors can include imaging sensors, laser sensors, distance detection sensors, heat sensors, obstacle sensors, light sensors, curb sensors, steps sensors, and the like. Distance detection sensors can be used for measuring and monitoring the distance between the delivery robot and other objects such as an obstacle, a roadway, a robot delivery vehicle, another delivery robot, a threshold, a gate, a fence, a doorway, or the like. The delivery robot and network can include an array of sensors that are utilized to assist with the various functions of the delivery robot.

The delivery robot can include a power source, for example, a such as a power module. In certain embodiments, the power module can be is removably mounted to the delivery robot. The power module can be in the form of a battery, a solar power cell, a gas powered engine, a super capacitor, a fuel cell, an alternative power generation source, or a combination thereof. The power module can be coupled to and provide power for the delivery robot computing system and motor, as well as any other attached input/output devices. The power module can store energy to maintain a corresponding energy level. In various implementations, the stored energy level of the power module can be recharged through various techniques. For example, when the delivery robot is at a docking station, for example, at a dwelling, inside a robot delivery vehicle, or inside a warehouse, the delivery robot can engage with a charging component configured to recharge the power module. As another example, the delivery robot can also, or alternatively, utilize other techniques for recharging, for example, utilize sunlight to recharge through solar panels. In addition, in some implementations, the power module can be configured such that it can be autonomously removed and/or replaced with another power module while the delivery robot is at a docking or power station.

In certain embodiments, the delivery robot includes an item engagement mechanism. For example, the item engagement mechanism can include a robotic arm or other mechanism that can be utilized to engage an item for placement in the receptacle of the delivery robot. The item engagement mechanism can include a robotic arm or other mechanism that can be utilized for removing an item from the receptacle when the item is being delivered at an indoor drop-off location. The item engagement mechanism can communicate with and be controlled by the delivery robot computing system, for example, via wired or wireless communication. In certain embodiments, such an item engagement mechanism can also, or alternatively, be included in a robot delivery vehicle, a home dialysis patient's dwelling, or the like location, for placing items in and/or removing items from the receptacle of the delivery robot.

The delivery robot computing system can maintain information as to whether the receptacle of the delivery robot is full, empty, damaged, partially loaded, partially unloaded, or the like. The delivery robot computing system can include items, access codes, or other identifiers necessary to open the receptacle, close the receptacle, lock the receptacle, unlock the receptacle, or the like. The delivery robot computing system can have stored therein, download, stream, or be programmed with, any other information necessary to maintain and operate the delivery robot. The delivery robot computing system can lock and unlock the receptacle or receptacles, can activate or inactivate sensors, and the like. The delivery robot can be configured to obtain information from a remote computing resource. The delivery robot can be configured to operate primarily as a stand-alone unit, with limited external communication to receive, provide, order, install, delivery, and transfer information, codes, signals, instructions, and programs. The delivery robot computing system can include a wireless connection configured to provide wired and/or wireless network connectivity, for example, with a computing system in a user device, with a remote computing system, with a robot delivery vehicle, with a warehouse, with a charging station, with a supplies store, or the like. Wireless connectivity can be implemented using a wireless antenna that can provide both receive and transmit functionality.

The delivery robot can also include a user interface. The user interface can be configured to receive and provide information to a user of the delivery robot. The user interface can include, but is not limited to, a display such as a touch-screen display, a scanner, a keyboard, a keypad, a biometric scanner, an audio transducer, one or more speakers, one or more microphones, one or more image capture sensors such as a video camera, and any other types of input or output devices that can support interaction between the delivery robot and a user. In certain embodiments, the user interface can be eliminated and control of the delivery robot is primarily provided remotely. For example, in order to access the receptacle, a user can send or reply to a text message to or from a centralized remotely located control system, for example, a central management system. The central management system can control the delivery robot to unlock and/or open the receptacle door so that the user, a loader, or a home dialysis patient can retrieve a delivered item from the receptacle or place a recyclable, biohazard, or trash item in the receptacle. In various implementations, the delivery robot can have capabilities for directly receiving such signals from a user device such as a smart phone, smart watch, tablet computer, smart speaker, or other device. The user device can be, for example, a device inside a user's residence, which provides a signal to open the receptacle.

In certain embodiments, the receptacle of the delivery robot includes a bottom, side walls, and a door, together configured to form a cavity in which items can be stored and transported. In addition, the receptacle can include various security, safety, stabilizing, or other components. For example, the receptacle can include a locking mechanism that can be controlled directly or remotely by the delivery robot computing system. The receptacle can also be temperature controlled. The receptacle can also include a presence detection sensor, a motion sensor, an image capture sensor, a temperature sensor, a camera, and/or other sensors.

In certain embodiments, the delivery robot includes a locator device that is configured to assist with finding the delivery robot, for example, when a robot delivery vehicle is searching for the delivery robot to load or unload an item or supplies, or to pick up the delivery robot. The locator device can also be used when a recipient wants an update on the location of the delivery robot, for example, to acquire an estimated time of arrival (ETA). For example, the locator device can wirelessly transmit an electronic signal that enables the position of the delivery robot to be tracked and/or otherwise determined. The location can then be indicated on a display or screen, for example, of a smart phone, computer, smart watch, monitoring station, or the like. As another example, the locator device can emit various sounds, activate lights, vibrate, buzz, or the like. Such signals can be used to assist a carrier or loader that might be delivering items to multiple delivery robots and needs to determine which delivery robot is the correct delivery robot to be loaded with a specific item. In certain embodiments, the locator device can be controlled by the delivery robot computing system, a central management system, or the like. The delivery robot can also include a radio frequency identification (RFID) tag, a printed circuit board, or any other object or mechanism that can be detectable and used to identify the AGV(s) for security or other purposes, for example, by a delivery vehicle, a delivery driver, an access point into a patient's dwelling, or the like.

The delivery robot can be capable of converting from an outdoor configuration to an indoor configuration, for example, from outdoor wheels to indoor wheels, and vice versa. By changing from an outdoor motive traction device to an indoor motive traction device, prior to entering a dwelling, the delivery robot does not track into the dwelling water, snow, slush, or lawn or yard debris such as grass, dirt, mud, leaves, sand, animal waste, rocks, clay, or the like. If wheels are used as the motive traction devices, the outdoor wheels can be larger than the indoor wheels so that the outdoor wheels can achieve better traction and better navigate through outdoor terrain. Meanwhile, indoor wheels can be smaller and move more smoothly than larger wheels and can better navigate through an indoor pathway and across indoor floors. For example, the outdoor wheels can include large, rubber, pneumatic tires whereas the indoor wheels can comprise smaller, solid, plastic or rubber wheels or rollers.

In certain embodiments, the indoor wheels can include a mecanum wheel configuration for omnidirectional use. A mecanum wheel is a tireless wheel comprising a series of external rollers obliquely attached to the circumference of a rim. The rollers can each have an axis of rotation at about 45° to a wheel plane and be angled at with respect to an axle line, for example, angled at 45° with respect to the axle line. Each mecanum wheel is an independent non-steering drive wheel with its own powertrain, and when spinning generates a propelling force perpendicular to the roller axle, which can be vectored into a longitudinal component and a transverse component, in relation to the delivery robot. The mecanum wheels allow the delivery robot to navigate through tight hallways and corners without the need to turn directions. Components, machines, systems, and methods related to mecanum wheel technology and which can be used in or as a part of the present invention include those described in "Improved Mecanum Wheel Design for Omni-directional Robots," Australasian Conference on Robotics and Automation, November 2002, p. 117-121, to Diegel et al. that is incorporated herein in its entirety by reference.

According to various embodiments of the present invention, the delivery robot can include a frame in which a first motive traction device and a second motive traction device are attached. The motive traction devices can comprise, for example, a first wheel module and a second wheel module. Each wheel module can comprise multiple wheels, on the same or different axes. Using wheel modules as an exemplary motive traction device, in certain embodiments, when converting from the outdoor configuration to the indoor configuration, the second wheel module can deploy from the frame by pivoting downward from the bottom of the delivery robot. The pivoting can be motorized by one or more motors. Subsequently, the first wheel module can retract into the frame by pivoting upward toward the bottom of the delivery robot and such pivoting can also be motorized by one or more motors. Likewise, when converting from the indoor configuration to the outdoor configuration, the first wheel module can deploy from the frame by pivoting downward from a bottom of the delivery robot, using one or more motors, and, subsequently, the second wheel module can retract into the frame by pivoting upward towards the bottom of the delivery robot, also effected by one or more motors.

In certain embodiments, when either the first wheel module or the second wheel module is retracted into the frame, a shield can cover the wheel modules to prevent dirt from getting on or from getting off of the respective wheel module. The shield can swing down, move across, enclose, encase, or otherwise cover the wheel module or other motive traction device. The shield can be of a single piece construction, or can comprise multiple pieces, for example, two doors, a plurality of overlapping arcs or circular components, a rotatable cylinder having a side opening, or the like.

The shield can comprise any suitable material, for example, a plastic material, a metal material, a cloth material, a textile material, a wooden material, or the like. The shield can be moved by a stepper motor, a gear system, a hydraulic lift, a combination thereof, or the like. The shield can include or have provision for an absorbent material or layer, for example, a disposable absorbent rag or wipe. In an exemplary embodiment, when a delivery robot is approaching a dwelling, in the outdoor configuration, the shield prevents the indoor wheels from getting dirty or wet. When the delivery robot converts to the indoor configuration and enters the dwelling, the shield can then, or be moved into position to, prevent water, slush, snow, or lawn or yard debris or waste from tracking into the dwelling or falling off of the outdoor wheels onto a carpet or floor of the inside of the dwelling.

In certain embodiments, the first wheel module and the second wheel module are pivotably coupled together or to the frame, to form an L-shape. One or more motors pivots the first wheel module relative to the second wheel module and the second wheel module relative to the first wheel module. Using wheel modules as an exemplary motive traction device, in an outdoor configuration, the first wheel module is substantially horizontal and the outdoor wheels engage the ground, while the second wheel module is elevated, in a substantially vertical position, with the indoor wheels elevated above the ground. To convert from the outdoor configuration to the indoor configuration, the one or more motors pivot the second wheel module relative to the first wheel module, downward, so that each of the first wheel module and the second wheel module rest horizontally on a surface. At the threshold to a dwelling, the outdoor or first wheel module has wheels contacting an outdoor surface and the indoor or second wheel module has wheels contacting an indoor surface. The one or more motors then pivots the first wheel module relative to the second wheel module, upward, so that the first wheel module is in a substantially vertical position with the outdoor wheels elevated above the ground. To convert from the indoor configuration to the outdoor configuration, the one or more motors pivot the first wheel module relative to the second wheel module, downward, so that each of the first wheel module and the second wheel module are horizontal and contact respective outdoor and indoor surfaces, and straddle the threshold. The one or more motors then pivots the second wheel module relative to the first wheel module, upward, so that the second wheel module is in a substantially vertical position with the indoor wheels elevated above the ground.

In such embodiments, the receptacle can be pivotably connected to the frame by a pivot arm. The pivot arm can allow the receptacle to shift from being disposed over the first wheel module to being disposed over the second wheel module when the delivery robot is converting from the outdoor configuration to the indoor configuration. The pivot arm can also enable the receptacle to shift back when the delivery robot converts from the indoor configuration to the outdoor configuration. For example, in the outdoor configuration, the pivot arm can be arranged at an angle toward the first wheel module such that the receptacle is disposed over the first wheel module, resting on the frame above the first wheel module. During converting the delivery robot, the one or more motors pivots the pivot arm from being angled over the first wheel module to being angled over the second wheel module while the first and second module are both horizontally disposed. A pivot axis or point can be provided at the center middle of one side or opposing sides of the receptacle, so that the contents of the receptacle remain horizontally oriented throughout the converting. The receptacle can pivot relative to the pivot arm, thus enabling the receptacle to maintain a horizontal position without disrupting items within the receptacle while converting between the configurations is taking place.

The shield or shields can be provided for preventing water or dirt from dropping off of the outdoor wheels or motive traction device, while the delivery robot is in the indoor configuration inside a dwelling. The shield or shields also protect the indoor wheels from gathering or being exposed to water, slush, snow, dust, dirt or other lawn or yard debris while outside and in the outdoor configuration. For example, an indoor wheel shield can be provided that is configured to cover a plurality of indoor wheels from a top of the second wheel module, while in the outdoor configuration, protecting the indoor wheels. When the delivery robot converts from the outdoor configuration to the indoor configuration, the one or more motors can pivot the indoor wheel shield to a retracted position so that the indoor wheel shield does not obstruct movement of the delivery robot. An outdoor wheel shield can be in a retracted position in the outdoor configuration, but when the delivery robot converts from the outdoor configuration to the indoor configuration, the outdoor wheel shield can be pivoted by the one or more motors to cover the plurality of outdoor wheels from a bottom of the first wheel module, preventing water or dirt from dropping off of the outdoor wheels and onto the floor inside of the dwelling.

The delivery robot can include other components to repel or protect the delivery robot from the outdoor elements. For example, the delivery robot can include a retractable cover, such as a retractable umbrella to cover the delivery robot from precipitation. The cover or umbrella can be decoupled from the delivery robot at the entrance of the dwelling. The delivery robot can further include air blowing jets that repel water or dry the delivery robot prior to the delivery robot entering a dwelling.

The first and second motive traction devices, for example, the first wheel module and the second wheel module, can be capable of climbing steps, curbs, and other potential obstructions. Components, machines, systems, and methods related to step climbing technology and which can be used in or as a part of the present invention include those described in U.S. Pat. No. 6,311,794 B1 to Morrell et al. and U.S. Pat. No. 6,571,892 B1 to Kamen et al., and in U.S. Patent Application Publication No. US 2018/0244327 to Liivik et al., each of which is incorporated herein in their entireties by reference.

In exemplary embodiments, the first motive traction device is a first wheel module including a pair of outdoor wheels on one side of a frame. The first wheel module is mounted to one of a first pair of cluster arms. Another pair of outdoor wheels is mounted on another side of the frame to another one of the first pair of cluster arms. The outdoor wheels are rotatable about member axes with respect to the pair of first cluster arms. The first pair of cluster arms rotate about a first cluster axis. The computing system is capable of independently rotating the first pair of cluster arms and independently rotating the outdoor wheels using the one or motors. In addition, sensors on the first wheel module are capable of sensing the pitch, roll, and yaw of the delivery robot as well as such variables as the angular position and/or rate of rotation of the outdoor wheels and the first pair of cluster arms. The signals from the sensors are communicated to the computing system and are used by the computing system to drive the one or more motors in order rotate the first pair of cluster arms about the first cluster axis and to rotate the outdoor wheels so as to cause the first wheel module to ascend or descend a curb or steps.

The second motive traction device can be a second wheel module and can include at least a pair of indoor wheels on one side of the frame mounted to one of a second pair of cluster arms. Another pair of indoor wheels on another side of the frame is mounted to another one of the second pair of cluster arms. The indoor wheels are rotatable about member axes with respect to the pair of second cluster arms. The second pair of cluster arms rotate about a second cluster axis. The computing system is capable of independently rotating the second pair of cluster arms and independently rotating the indoor wheels using the one or more motors. In addition, sensors on the second wheel module are capable of sensing the pitch, roll, and yaw of the delivery robot as well as such variables as the angular position and/or rate of rotation of the indoor wheels and the second pair of cluster arms. The signals from the sensors are communicated to the computing system and are used by the computing system to drive the one or more motors to rotate the second pair of cluster arms about the second cluster axis and to rotate the indoor wheels so as to cause the second wheel module to ascend or descend steps.

In exemplary embodiments, the motive traction devices can comprise outdoor tracks and indoor tracks. The outdoor tracks can include a first pair or more of outdoor gears or wheels on a first side of the frame and a second pair or more of outdoor gears or wheels on a second side of the frame. A first looped outdoor track can span the first pair of the outdoor gears or wheels and a second looped outdoor track can span the second pair of outdoor gears or wheels. The indoor pair of tracks can include a first pair or more of indoor gears or wheels on the first side of the frame and a second pair or more of indoor gears or wheels on the second side of the frame. A first looped indoor track can span the first pair of the indoor gears or wheels and a second looped indoor track can span the second pair of the indoor gears or wheels. The outdoor tracks, the indoor tracks, or a combination thereof can be configured to climb stairs, steps, curbs, or the like. Components, machines, systems, and methods related to track technology and which can be used in or as a part of the present invention include those described in U.S. Patent Application Publication Nos. US 2020/0283080 A1 to Rudakevych et al., US 2012/0185115 A1 to Dean, US 2010/0152922 A1 to Carlson et al., and US 2008/0265821 A1 to Theobald, each of which is incorporated herein in their entireties by reference.

A central management system can be used to perform order planning and filling of a delivery vehicle with orders, for example, at a warehouse. The central management system can be used for transporting a delivery robot to a drop-off location or a meeting location where the delivery robot is either dropped off or met. The drop-off or meeting location can be used for transporting items to a user-specified delivery location such as a home or other dwelling. The central management system can include computing systems, for example, including a server, that can be used in the implementations described herein. The server can include a processor, such as one or more redundant processors, a video display adapter, a disk drive, an input/output interface, a network interface, and a memory.

The robot delivery vehicle can be a car, a truck, a van, a train, a robot, a commercial carrier vehicle, or any large commercial vehicle that has a cargo area large enough for holding and transporting at least one delivery robot. The delivery vehicle can be an autonomous self-driving vehicle, a non-autonomous vehicle, a human driven vehicle, or the like. The delivery robot can be assigned or paired with a respective delivery vehicle. The delivery vehicle can accommodate the delivery robot by including a plurality of docking stations, each docking station corresponding to a respective delivery robot to be transported by the delivery vehicle. Each of the docking stations can include charging components to charge the respective delivery robot. In certain embodiments, each of the docking stations can further include cleaning components, such as brushes and nozzles for delivering a cleaning solution to the motive traction devices, plurality of outdoor wheels, plurality of indoor wheels, or the like, as well as for cleaning the remainder of the delivery robot.

The delivery robot can also be deployed directly from a train car along established rail lines for lower long-distance shipping costs compared to those from using conventional trucks. The delivery robot can initially leave a warehouse and drive to a meeting location for meeting a train. The train can drive to a delivery robot drop-off location, at which the delivery robot disembarks the train and drives to a respective dwelling. The delivery robot can drive along streets to more remote areas with lower density populations. For longer travel in which battery power might be insufficient, the delivery robot can stop, for example, autonomously stop, at one or more designated charging stations along the way. This would enable even extremely remote home dialysis patients to receive deliveries of supplies, and, therefore, the ability for home dialysis.

In certain embodiments, the delivery items are loaded onto the delivery robot at a warehouse. In such embodiments, each delivery robot can be pre-programmed with a delivery pathway and a delivery location corresponding to a dwelling to which the items are to be delivered. The delivery robot can then be loaded onto a delivery vehicle. Alternatively, the delivery items can be loaded into a delivery vehicle separate from the delivery robot. In such embodiments, the delivery items can include addresses, such as packing slips, typically used for mailing items, or computer readable codes, such as barcodes, two-dimensional bar codes, QR codes, an RFID, or the like, or other identifiers that identify the location of the dwelling in which the delivery items are to be delivered. The delivery robot can be capable of reading the identifiers using a scanner or reader, or otherwise be suited to have an identifier manually entered into the delivery robot, for example, using a user interface. The input can occur when the delivery items are loaded into the receptacle of the delivery robot by delivery personnel. The delivery vehicle can drive to a delivery robot drop-off location, open a cargo door, and lower a ramp, so the delivery robot can deploy from the delivery vehicle and drive to a respective dwelling.

In certain embodiments, delivery robots are stationed at respective dwellings and travel out, for example, to a curb or the end of a driveway, to meet a delivery vehicle that is carrying items. For example, each delivery robot can be docketed at a docking station located at the dwelling. The at home docking station can also include charging components and cleaning components. The delivery vehicle can be deployed from the warehouse with only delivery items and without delivery robots. A notification can be received by the delivery robot indicating that the delivery vehicle is expected to arrive at a designated meeting location at a particular time. The delivery robot can automatically drive from the docking station toward a meeting location.

As another example, various types of sensors, for example, image sensors, sound sensors, or the like, can be utilized to determine when a delivery vehicle is approaching an area. In response to an approaching delivery vehicle, the delivery robot can travel out to the meeting location to receive items from the delivery vehicle. In an exemplary configuration, a starting travel time can be established for a delivery robot to begin travel toward the meeting location so that the delivery robot can arrive ahead of the transportation vehicle. The determination of the starting travel time can be based, at least in part, on an estimated time when the delivery vehicle is expected to arrive at the meeting location. Once the delivery vehicle reaches a designated meeting location, the items can be transferred to or otherwise acquired by a particular delivery robot for delivering the items to an indoor drop-off location, for example, inside of a home dialysis patient' dwelling. It will be appreciated that by picking items directly from storage areas of a delivery vehicle, and then further transporting the items with delivery robots, the items may not need to be packed in shipping packages. In addition, the packing slip typically included on a shipping package, can be applied directly to the item, for example, stickered to the item. The packing slip can be printed out at the delivery vehicle, printed or produced by the delivery robot upon retrieval of the item, or otherwise made available. In other instances, items that are either pre-packaged, fragile, or need additional protection prior to transport, can be packed in a shipping package.

In various implementations, different types of techniques can be utilized for the delivery robot to receive items for delivery. For example, the delivery robot and/or a delivery vehicle can include an item engagement mechanism, for example, a robotic arm, for engaging an item that is on the delivery vehicle and that is to be received by the delivery robot. The robotic arm can place the item in the receptacle of the delivery robot. As another example, a delivery personnel who is operating the delivery vehicle can take the item from the delivery vehicle and place it in the receptacle of the delivery robot. Once the item is placed in the receptacle, the receptacle can be locked or otherwise secured for the safe transport of the item to an indoor drop-off location.

The receptacle can include an electronic locking mechanism that can be controlled to lock the receptacle once it is determined that the item has been placed in the receptacle. The determination that an item has been placed in the receptacle can be made according to various types of procedures. For example, an input can be received, for example, by the delivery robot computing system, from a carrier, a delivery vehicle, a remote computing resource, or the like, indicating that an item has been placed in the receptacle and is to be delivered to the indoor drop-off location. As another example, various sensors can be utilized to determine that an item has been placed in the receptacle and has, thus, been received by the delivery robot.

The delivery robot can be capable of traversing different pathways depending on different configurations of delivery. For example, the delivery robot can be dropped off and/or picked up by a delivery vehicle. A "delivery pathway," as used herein, is a pathway driven by the delivery robot and can encompass any pathway from the robot delivery vehicle to an indoor drop-off location. The delivery pathway can include a street pathway, an entrance pathway, an indoor pathway, or any combination thereof. A "return pathway," as used herein, is a pathway driven by the delivery robot and can encompass any pathway from the indoor drop-off location back to the delivery vehicle, such as, but not limited to, a reverse of the indoor pathway, the entrance pathway, the street pathway, or a combination thereof.

In certain embodiments, the robot delivery vehicle can drive directly in front of a dwelling and the delivery robot can drive a delivery pathway that includes the entrance pathway. Alternatively, the robot delivery vehicle can drop off a plurality of delivery robots at one or more delivery robot drop-off locations and at least one delivery robot can drive a delivery pathway that includes a street pathway and an entrance pathway. The street pathway can include a pathway from the delivery vehicle to a dwelling of an intended recipient. In various implementations, the street pathway directions, instructions and/or information, can be received by the delivery robot, determined by the delivery robot, or involve a combination thereof. The street pathway can be calculated or derived from an onboard computing system, onboard sensors, an onboard global positioning system, a central management system, a robot delivery vehicle, a remote computing resource, a combination thereof, or the like. As part of travelling along the street pathway, the one or more motors of the delivery robot can be controlled, for example, by the delivery robot computing system, to navigate the delivery robot along the street pathway to the front of the dwelling to deliver the item. The delivery robot can include one or more sensors to determine whether any obstacles are encountered along the street pathway. If obstacles are encountered, the street pathway to the dwelling location can be altered to avoid the obstacles. In addition to the street pathway being altered to avoid any obstacles, a determination can also be made as to whether any openable access barriers, for example, openable doors or gates, are encountered. If openable access barriers are encountered, the access barriers can be opened to allow the delivery robot to travel through the access barriers. As obstacles and/or access barriers are passed, the delivery robot can continue to travel along the street pathway, and if additional obstacles and/or access barriers are encountered, the above-mentioned process can be repeated. Once the delivery robot has passed any remaining obstacles and/or access barriers as it continues to travel along the street pathway, the delivery robot arrives at a threshold at an entrance to a dwelling.

Once the delivery robot has arrived at the front of a dwelling, the delivery robot drives the entrance pathway. The entrance pathway is a pathway from the street, for example, in front of the dwelling, to an entrance to the dwelling. Entrance pathway directions, instructions, and/or information can be received by the delivery robot, determined by the delivery robot, or a combination thereof. The entrance pathway directions, instructions, and/or information can be received or determined by the onboard computing system, the onboard sensors, the onboard global positioning system, the central management system, the delivery vehicle, a remote computing resource, a combination thereof, or the like. In certain embodiments, the computing system of the delivery robot can receive video data that shows a demonstration path for navigating the location. Other types of sensor data representative of the demonstration path can be received as well, including global positioning system (GPS) data and inertial measurement unit (IMU) data. By processing the video data to identify permissible surfaces of the demonstration path, for example, paved or unpaved walkways, driveways, curbs, and steps, the computing system can develop a navigation path that enables the delivery robot to follow the same general path (entrance pathway) as the demonstration path while also allowing for variations from the demonstration path when needed. In certain embodiments, the computing system can develop a navigation path for the delivery robot to follow at the location by analyzing data provided by a user, for example, provided by a home dialysis patient and intended recipient of a package. For example, the user can input waypoints to the delivery robot, or setup pathway beacons or markers such as RFID tags, RFID readers, bar codes, two-dimensional bar codes, visual reflectors, lights, painted markers, combinations thereof, and the like, that the delivery robot can detect and follow. Voice recognition technology can be used whereby the delivery robot recognizes and follows a voice to create the pathway. The data acquired by the delivery robot regarding the entrance pathway can be saved in the memory for return to the street from the dwelling and/or for future deliveries.

According to certain embodiments, a notification can be sent to the home dialysis patient or other intended recipient once the delivery robot arrives at an entrance to the dwelling. For example, the delivery robot or the central management system can send a wireless communication to a remote computing system. The wireless communication can include a message indicating that the delivery robot has arrived at the dwelling or indicating an estimated time of when the delivery robot will arrive at the dwelling. The remote computing system can be part of a smart phone, a smart doorbell, a smart lock, or a combination thereof. The message can also include information pertaining to an identification of the item(s) to be delivered, for example, a line item listing showing, for example, a number of dialysis solution bags, a number of disposable tubing sets, a number of saline bags, chemicals, masks, gloves, wipes, and the like.

The delivery robot can also include an identification tag that is configured to transmit a signal, or otherwise to cause an access barrier at the entrance to be opened or otherwise unlocked to allow the delivery robot to travel through or otherwise past the access barrier. For example, the access barrier can include a reader that senses an identification tag of the delivery robot for unlocking the access barrier and allowing the delivery robot to pass through and enter the dwelling. The reader and the identification tag can use RFID technology.

According to various embodiments, the delivery robot can sense via a sensor that the access barrier of the entrance is open and automatically convert or prepare to convert from the outdoor configuration to the indoor configuration. The delivery robot can also include a manual button, touch button icon, or lever that, when applied, converts the delivery robot from the outdoor configuration to the indoor configuration. As an example, when the indoor wheels are deployed from the bottom of the delivery robot, the indoor wheels can be deployed first on an outdoor floor mat and the outdoor wheels can be retracted. The delivery robot can then drive into the dwelling. Alternatively, the delivery robot can drive through an open access barrier and immediately stop once entirely within the dwelling. The indoor wheels can then be deployed on an indoor floor mat and the outdoor wheels can be retracted, at which time the delivery robot can then proceed to an indoor drop-off location.

Alternatively, when the delivery robot includes the L-shaped configuration described herein, the second wheel module can pivot through the open access barrier until the indoor wheels of the second wheel module engage the floor on the inside of the dwelling. At this point, the first wheel module is also engaging the ground on the outside of the dwelling. Then the first wheel module is pivoted upward and is retracted. The delivery robot then proceeds to the indoor drop-off location. In this configuration, the outdoor wheels never touch a floor on the inside of the dwelling and the indoor wheels never touch the ground on the outside of the dwelling.

Once the delivery robot is inside the dwelling, an indoor pathway is driven. The indoor pathway can be from the entrance to the indoor drop-off location. Instructions, information, or both of the indoor pathway can be received by the delivery robot, determined by the delivery robot, preprogrammed, saved in memory, shown to the robot by a recipient, or a combination thereof. For example, the onboard computing system, the onboard sensors, the onboard GPS, the central management system, the delivery vehicle, a remote computing resource, a combination thereof, or the like can be used to define the indoor pathway. In certain embodiments, the computing system of the delivery robot can receive video data that shows a demonstration path for navigating the location. Other types of sensor data representative of the demonstration path can be received as well, including GPS data and IMU data. By processing the video data to identify permissible surfaces of the demonstration path, for example, hallways, staircases, and doorways wide enough to drive through, the computing system can develop a navigation path that allows the delivery robot to follow the same general path (indoor pathway) as the demonstration path while also allowing for variations from the demonstration path when needed.

In certain embodiments, the computing system can develop a navigation path for the delivery robot to follow at the location by analyzing data provided by a user, the user being an intended recipient of the items or package or another human person or entity. For example, the user can input waypoints to the delivery robot, setup pathway beacons or markers that the delivery robot can detect and follow, and/or use voice recognition technology that the delivery robot recognizes and follows to create the pathway. Exemplary beacons and markers can include RFID tags, RFID readers, bar codes, two-dimensional bar codes, visual reflectors, lights, painted markers, combinations thereof, and the like. The data acquired by the delivery robot regarding the indoor pathway can be saved on the memory to facilitate a return to the entrance, to facilitate future deliveries, and the like.

The delivery of items or package at the indoor drop-off location can be performed by following various procedures. For example, an item engagement mechanism, for example, a robotic arm of the delivery robot or a robotic arm at the delivery location, can be utilized to remove the items or package from the receptacle of the delivery robot and place the items or package at the indoor drop-off location. The indoor drop-off location can be in a corner of a room, on the floor, on a counter, in a refrigerator, or the like.

As another example, the delivery can include having the delivery robot wait at the drop-off location until a recipient arrives and removes the items or package from the receptacle of the delivery robot. In some instances, a recipient can be required to perform an action to complete a delivery. For example, the recipient can be required to unlock or otherwise open the receptacle, such as by interacting with the user interface, entering an access code, sending a signal from a remote computer or smart phone, utilizing another electronic or mechanical opening device, a combination thereof, or the like. In response to such unlocking and/or unloading procedures, the locking mechanism can be controlled to unlock the receptacle to enable the items or package to be retrieved by the recipient from the receptacle at the indoor drop-off location. The control can be enabled by the delivery robot computing system, a central management system, a remote computing resource, a robot delivery vehicle, a smart device, a combination thereof, or the like. In certain embodiments, the locking mechanism can be controlled to automatically unlock the receptacle once the delivery robot reaches the indoor drop-off location, for example, according to a sensed location of the delivery robot, or according to a signal from a transmitting device located within the dwelling, or the like. In response to such unlocking procedures, the locking mechanism can be controlled to unlock the receptacle to enable the items or package to be retrieved by the recipient from the receptacle at the indoor drop-off location. In other embodiments, the locking mechanism can be controlled to be unlockable once the delivery robot reaches the indoor drop-off location.

If the delivery robot has a docking station at the dwelling, the delivery robot can move to the docking station once the items are or package is delivered. If the delivery robot had been dropped off by a robot delivery vehicle and needs to return to the delivery vehicle, the delivery robot can follow the return pathway that can include at least the indoor pathway and the entrance pathway, in reverse, and, if needed, also a pathway back to the robot delivery vehicle. In this regard, the delivery robot can either open an access barrier or the access barrier can be opened by a user or motor in a similar fashion as described above with regard to the delivery robot entering the dwelling. Along the reverse pathway, the delivery robot can convert from the indoor configuration to the outdoor configuration. The delivery robot can then follow the reverse of the entrance pathway back to the street.

The delivery robot can send a signal to the robot delivery vehicle, to a different, robot pick-up vehicle, or to the central management system of the delivery robot. The signal can contain information indicating that the delivery robot is ready to be picked up and pertaining to the location where the robot delivery or pick up vehicle can automatically pick up the delivery robot, for example, curbside or at the end of a driveway. Alternatively, the delivery robot can drive back to the delivery vehicle at the delivery robot drop-off location, or the delivery robot and the robot delivery or pick up vehicle can meet at a meeting location that is different from the delivery robot drop-off location. The delivery robot can be configured to charge at a charging station in the dwelling until a robot delivery or pick up vehicle is within range for a pick up, or until a sufficient or full battery charge is put on the delivery robot battery.

Certain portions of the above method of delivery can be repeated, in particular with regard to deliveries of multiple items. For example, if the delivery robot is carrying multiple items that are to be delivered to different delivery locations the items can be stored in separate receptacles of the delivery robot. The delivery robot can travel from one delivery location to another location before returning to the robot delivery vehicle. In a configuration where receptacles are utilized for separate deliveries, a separate access code or other mechanism can be utilized for opening each of the receptacles, so that each recipient can only access or otherwise receive the item or items that are intended for delivery to that recipient.

The present invention is particularly useful for the delivery of dialysis supplies such as disposable components, saline solutions, and chemicals needed for use with a home dialysis machine. Patients with reduced or non-functioning kidney function are highly dependent on regular hemodialysis, hemodiafiltration, or peritoneal dialysis. Home dialysis has been shown to greatly improve the removal of waste products from the body, improve health, and reduce the need for medication. This is mainly due to the fact that patients can increase dialysis time by performing dialysis more frequently than the typical three-times-per-week. For example, patients can increase dialysis time by performing dialysis daily. Home dialysis machines, however, utilize numerous disposable components, such as sorbent cartridges, dialyzers, tubings, and other disposables, as well as chemicals and saline. Such disposables are described, for example, in U.S. Patent Application Publication No. US 2011/0315611 A1 to Fulkerson et al. that is incorporated herein in its entirety by reference.

Heretofore, home dialysis supplies are delivered to a home once a month, and fill a large space within a user's home. The present invention allows for more frequent delivery of supplies, for example, twice per month, three times per month, once per week, twice per week, three times per week, or even more often. Thus, less disposables and liquids need to be delivered, per delivery, and less storage space needs to be taken-up within the home. As mentioned above, another advantage is that the separate indoor and outdoor motive traction devices, for example, wheels, keep the house from getting dirty as a result of the deliveries. Additionally, the present invention allows for delivery to patients in remote regions, reduces product damage and lost loads, reduces waste, creates a predictable environment for production and warehousing operations, and increases convenience for delivery recipients. In addition, the deliver robot and network can be operated entirely autonomously, providing added safety, minimizing the spread of germs from person-to-person, eliminating waiting times for robot delivery and pick up vehicles, eliminating human error in filling prescriptions and loading the delivery robot, providing battery charging while waiting for a robot delivery or pick-up vehicle, and maximizing resources.

Figure 1B:
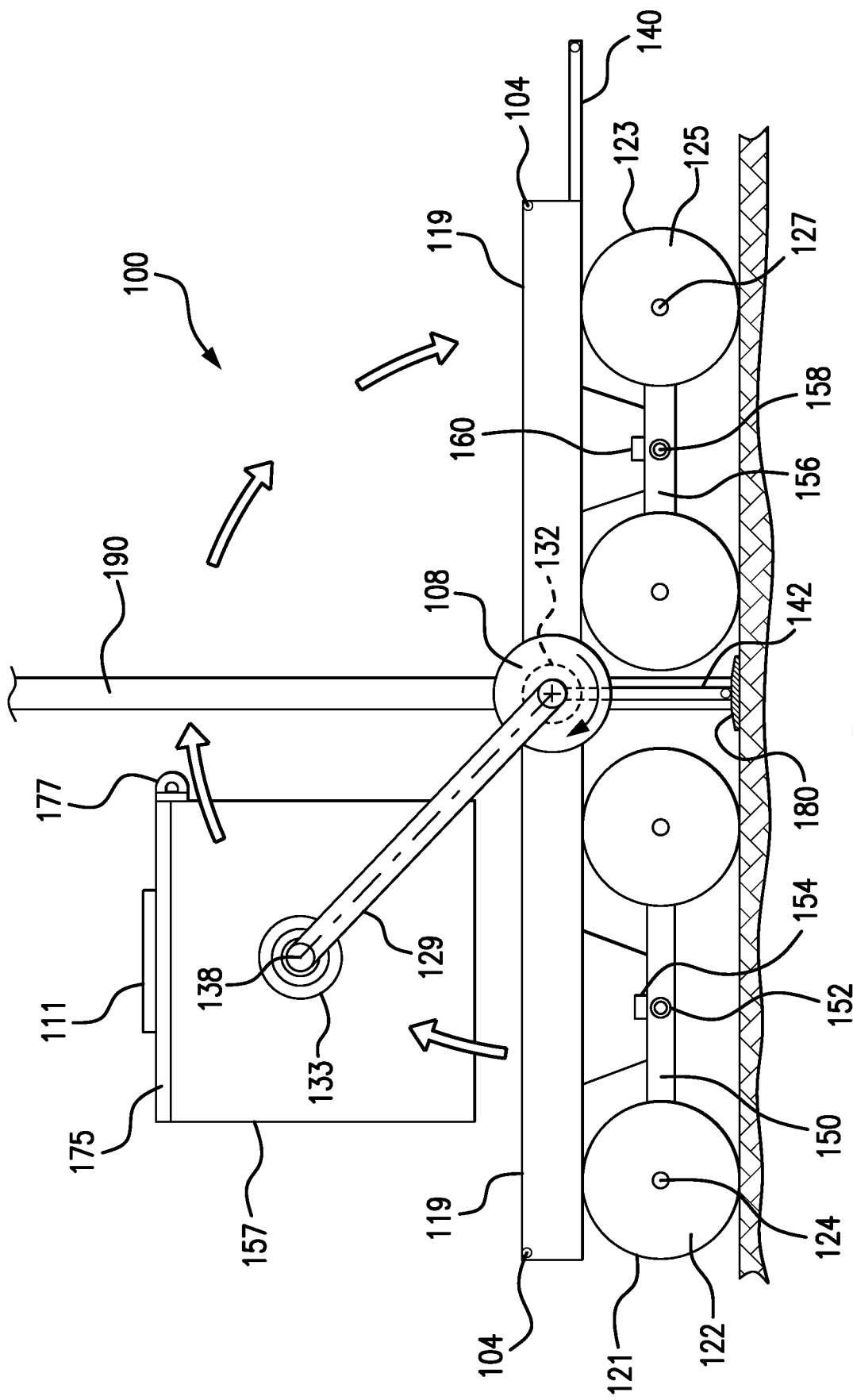
FIG. 1B is a side view of the autonomous ground vehicle shown in FIG. 1A, at a threshold of a dwelling, and transitioning from the outdoor configuration shown of FIG. 1A to an indoor configuration.
Figure 1C:
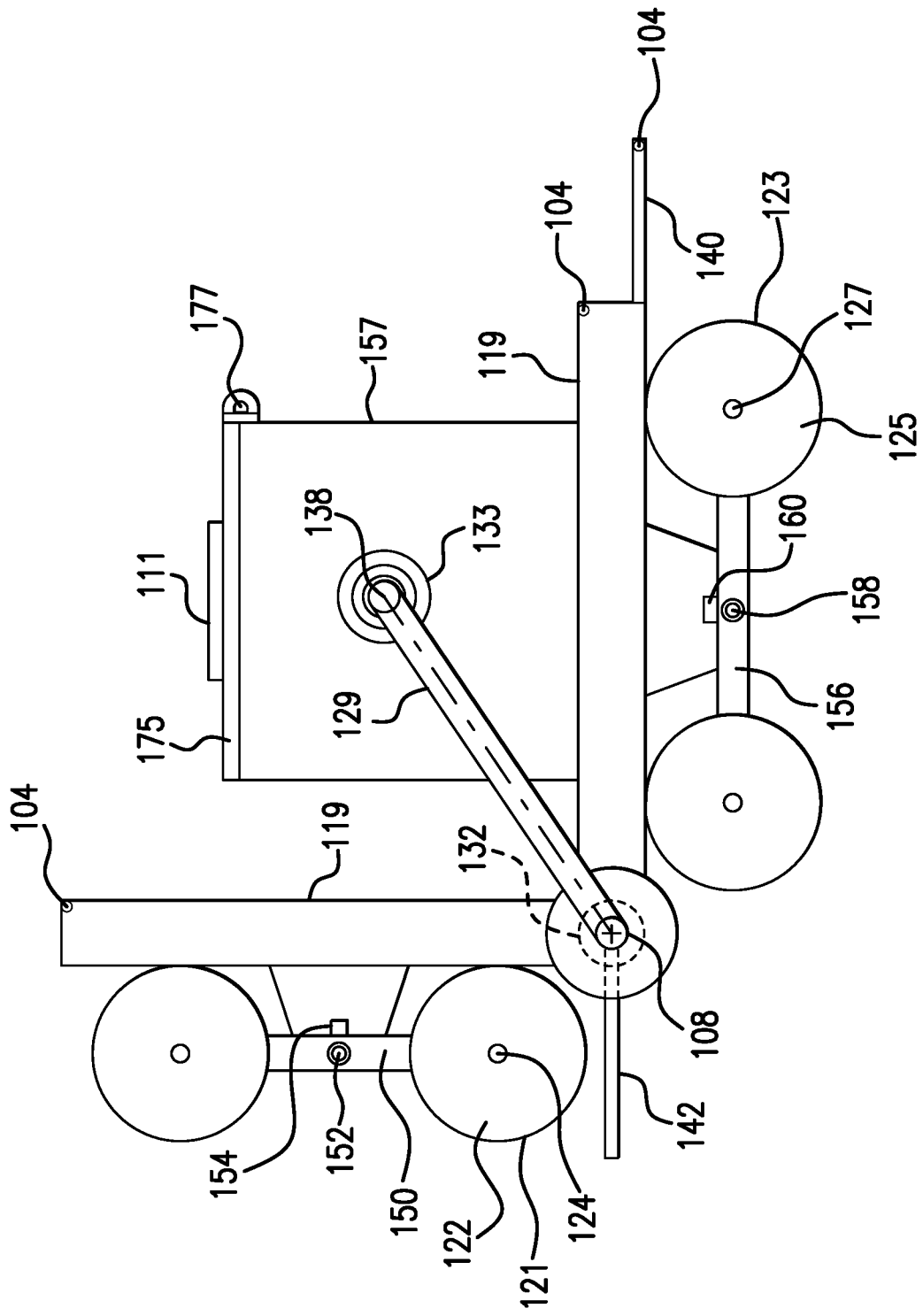
FIG. 1C is a side view of the autonomous ground vehicle shown in FIGS. 1A and 1B, in an indoor configuration, inside of the dwelling shown in FIG. 1B.
Figure 1D:
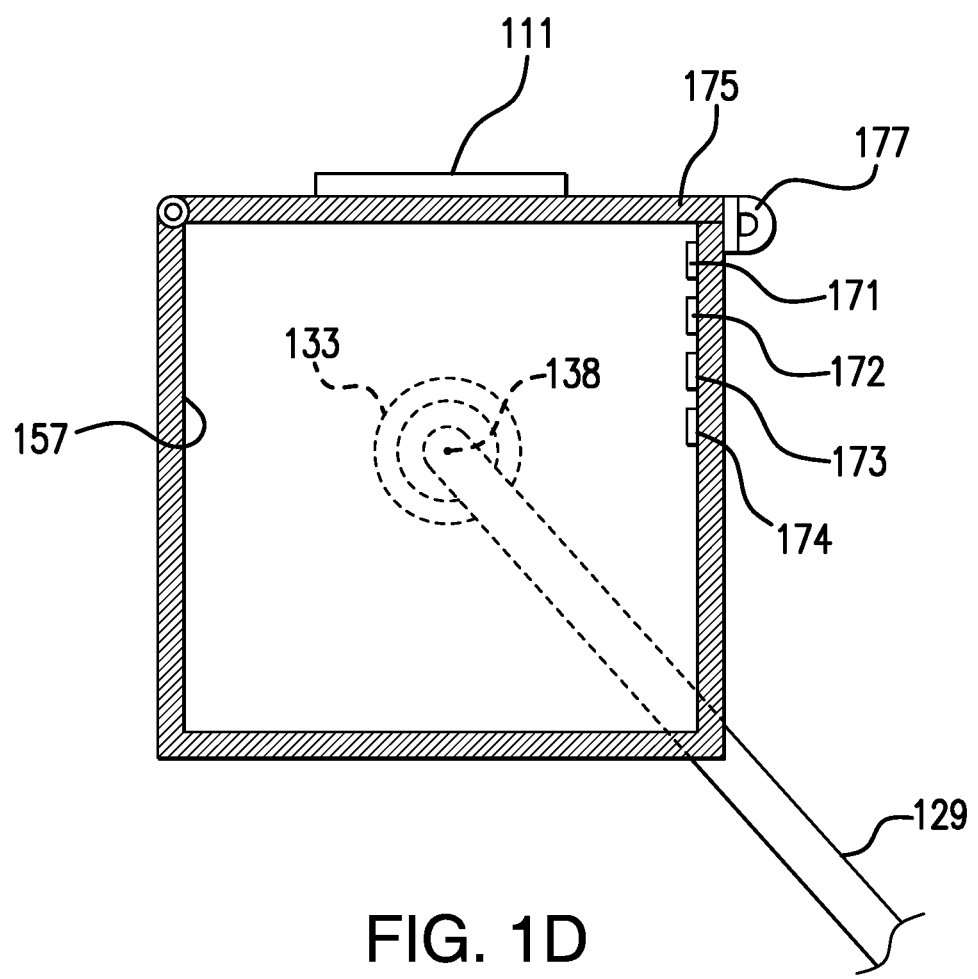
FIG. 1D is a cross-sectional view of the supplies receptacle of the autonomous ground vehicle shown in FIGS. 1A-1C, and showing boxes of home dialysis supplies held therein.

With reference now to the drawings, FIGS. 1A-1D depict a delivery robot 100 according to an exemplary embodiment of the present invention. The delivery robot 100 is in the form of an autonomous ground vehicle (AGV) that can convert from an outdoor configuration as shown in FIG. 1A, to an indoor configuration as shown in FIG. 1C. FIG. 1B depicts AGV 100 in the middle of converting from the outdoor configuration to the indoor configuration, at the threshold 180 of a doorway 190 to a dwelling. In the example shown in FIGS. 1A-1D, AGV 100 includes a frame 119. A first wheel module 121 and a second wheel module 123 are mounted to frame 119. First wheel module 121 has four outdoor wheels 122 mounted on axles 124 and that can be rotated by one or more motors 120. Second wheel module 123 has four indoor wheels 125 that are mounted to axles 127 that are rotated by one or more motors 130. In both the outdoor and the indoor configurations, first wheel module 121 and second wheel module 123 are at an angle relative to one another, such as a 90° angle, whereby frame 119 defines an L-shape as illustrated in FIGS. 1A and 1C. Wheel modules 121, 123 can be at different angles relative to one another, for example, at an angle of from 45° to 135°, or from 65° to 115°, or from 85° to 95°. First wheel module 121 and second wheel module 123 are pivotably coupled together by frame 119 at a pivotal connection 108. A motor 132 pivots first wheel module 121 relative to second wheel module 123 and second wheel module 123 relative to first wheel module 121.

In the outdoor configuration, first wheel module 121 is substantially horizontal and outdoor wheels 122 engage an outside surface, such as the ground, a street, a driveway, or a walkway. At the same time, second wheel module 123 is elevated, such as in a substantially vertical position, with indoor wheels 125 elevated above a horizontal surface such as the ground, as shown in FIG. 1A. To convert from the outdoor configuration to the indoor configuration, motor 132 pivots second wheel module 123 relative to first wheel module 121 via pivotal connection 108, downward so that each of first wheel module 121 and second wheel module 123 are horizontally disposed, as shown in FIG. 1B. The conversion can take place at threshold 180 of doorway 190 such that first wheel module 121 stays outside of the dwelling, while second wheel module 123 pivots downward to contact an inside horizontal surface of the dwelling, for example, contacts a foyer floor, a carpet, a rug, a tile floor, a ceramic floor, a vinyl floor, or the like. Motor 132 then pivots first wheel module 121 relative to second wheel module 123, upward so that first wheel module 121 is moved into a vertical or substantially vertical position wherein outdoor wheels 122 are elevated above the outdoor horizontal surface, as shown in FIG. 1C. The indoor wheels can take the form of Mecanum wheels to enable omnidirectional travel within the home environment.

To convert from the indoor configuration to the outdoor configuration, motor 132 pivots first wheel module 121 relative to second wheel module 123, downward so that each of first wheel module 121 and second wheel module 123, are horizontally disposed. The pivoting of first wheel module 121, downward, can be carried out again at doorway 190. Motor 132 then pivots second wheel module 123 relative to first wheel module 121, upward so that second wheel module 123 is now in a substantially vertical position whereby indoor wheels 125 are elevated above the inside horizontal surface.

AGV 100 further includes a receptacle 157 that is pivotably connected to frame 119 by a pair of pivot arms 129, with one pivot arm 129 being shown in the side view of FIGS. 1A-1C. Pivot arms 129 enable receptacle 157 to shift from being disposed over first wheel module 121 to being disposed over second wheel module 123, when AGV 100 is converted from the outdoor configuration to the indoor configuration. Pivot arms 129 further enable receptacle 157 to shift back to a position over first wheel module 121 when AGV 100 is converted from the indoor configuration to the outdoor configuration.

FIG. 1A illustrates AGV 100 in the outdoor configuration and pivot arm 129 at an angle such that receptacle 157 is disposed over first wheel module 121 and resting on frame 119. While AGV 100 is in between the outdoor configuration and the indoor configuration, as illustrated in FIG. 1B, motor 132, using gearing and transmission components, pivots pivot arms 129 from being angled over first wheel module 121 (as shown in FIG. 1A) to being angled over second wheel module 123 (as shown in FIG. 1C). Receptacle 157 can also pivot relative to pivot arms 129 at respective pivot points 138, by a pair of motors 133, thus enabling receptacle 157 to maintain a horizontal position without disrupting items within the receptacle while conversion from one configuration to the other takes place. In the side views shown in FIGS. 1A-1C, only one pivot point 138 and one motor 133 can be seen. In the cutaway or cross-sectional view shown in FIG. 1D, the backside motor 133 and backside pivot point 138 are shown in phantom.

FIGS. 1A-1C depict shields 140, 142 for preventing water, slush, snow, dirt, and other lawn and yard debris from dropping off of outdoor wheels 122 while driving AGV 100 inside a dwelling in the indoor configuration. Shields 140, 142 are also configured for protecting indoor wheels 125 from water, slush, snow, dirt, and other lawn and yard debris while driving outside in the outdoor configuration. FIG. 1A illustrates shield 140 as an indoor wheel shield 140 that covers indoor wheels 125 from above first wheel module 123, in the outdoor configuration, protecting indoor wheels 125. When AGV 100 reaches a threshold 180 at a doorway 190 of a dwelling, as shown in FIG. 1B, AGV 100 converts from the outdoor configuration to the indoor configuration, at which time motor 132 pivots indoor wheel shield 140 or moves it into a retracted position so that indoor wheel shield 140 does not obstruct the movement of AGV 100.

Shield 142 is in the form of an outdoor wheel shield 142 and is extended into an extended position while AGV 100 is in the outdoor configuration, as shown in FIG. 1A. When AGV 100 converts from the outdoor configuration to the indoor configuration, outdoor wheel shield 142 can be pivoted by motor 132 to a dangling or dropped configuration, as shown in FIG. 1B, and then be pivoted or extended to form a catch below outdoor wheels 122, below first wheel module 121, as shown in FIG. 1C. Covering outdoor wheels 122 can prevent water, slush, snow, dirt and other lawn and yard debris from dropping off of outdoor wheels 122 and onto an inside surface of the dwelling.

AGV 100 is also configured to climb steps, curbs, and other potential obstructions. First wheel module 121 includes two or more pairs of outdoor wheels 122, each pair mounted to a respective cluster arm 150 on opposing sides of frame 119. The two or more pairs of outdoor wheels 122 are rotatable about member axes fixed with respect to the cluster arms 150. Cluster arms 150 rotate about a first cluster axis 152. Second wheel module 123 includes two or more pairs of indoor wheels 125, each pair mounted to a respective cluster arm 156 on opposing sides of frame 119. The two or more pairs of indoor wheels 125 are rotatable about member axes fixed with respect to the cluster arms 156. Cluster arms 156 rotate about a second cluster axis 158.

A computing system 110 is capable of independently rotating cluster arms 150, 156 and independently rotating outdoor and indoor wheels 122, 125 using one or more motors 120. In addition, sensors 154 on first wheel module 121 and sensors 160 on second wheel module 123 are capable of sensing the pitch, roll, and yaw of AGV 100 as well as such variables as the angular position and/or rate of rotation of the outdoor and indoor wheels 122, 125 and of cluster arms 150, 156. Signals from sensors 154 are communicated to computing system 110 and are used by computing system 110 to drive one or more motors 120 to rotate cluster arms 150 about first cluster axis 152 and to rotate outdoor wheels 122 so as to cause first wheel module 121 to ascend or descend a curb, landing, or steps outside in the outdoor configuration. Similarly, signals from sensors 160 are communicated to computing system 110 and are used by computing system 110 to drive one or more motors 120 to rotate cluster arms 156 about second cluster axis 158 and to rotate indoor wheels 125 so as to cause second wheel module 123 to ascend or descend inside steps and landings in the indoor configuration.

As shown in FIGS. 1A-1C, various sensors 104 can be mounted to AGV 100. For example, sensors 104 can be mounted on the front, back, and sides of AGV 100, as well as at different locations on the frame 119 and at each of first and second wheel modules 121, 123. Sensors 104 can include imaging sensors and/or distance detection sensors for measuring and monitoring the distance between AGV 100 and other objects. AGV 100 also includes a power module 112. Power module 112 is coupled to and provides power for AGV computing system 110, for one or more motors 120, for one or more motors 130, for motor 132, for motor 133, as well as for any other related input or output devices.

Receptacle 157 of AGV 100 includes bottom and side surfaces and a door 175 configured to form a cavity in which items can be stored. Receptacle 157 can include a locking mechanism 177 controlled directly or remotely by computing system 110. Locking mechanism 177 can comprise a pad lock or combination lock that a recipient can open with an appropriate key or lock combination. Receptacle 157 can include a presence detection sensor 171, a motion sensor 172, an image capture sensor 173, a temperature sensor 174, one or more other sensors, a combination thereof, or the like. AGV 100 includes a user interface 111 configured to receive and provide information to a user of AGV 100, a programmer, or a home dialysis patient or other intended recipient.

Figure 2:
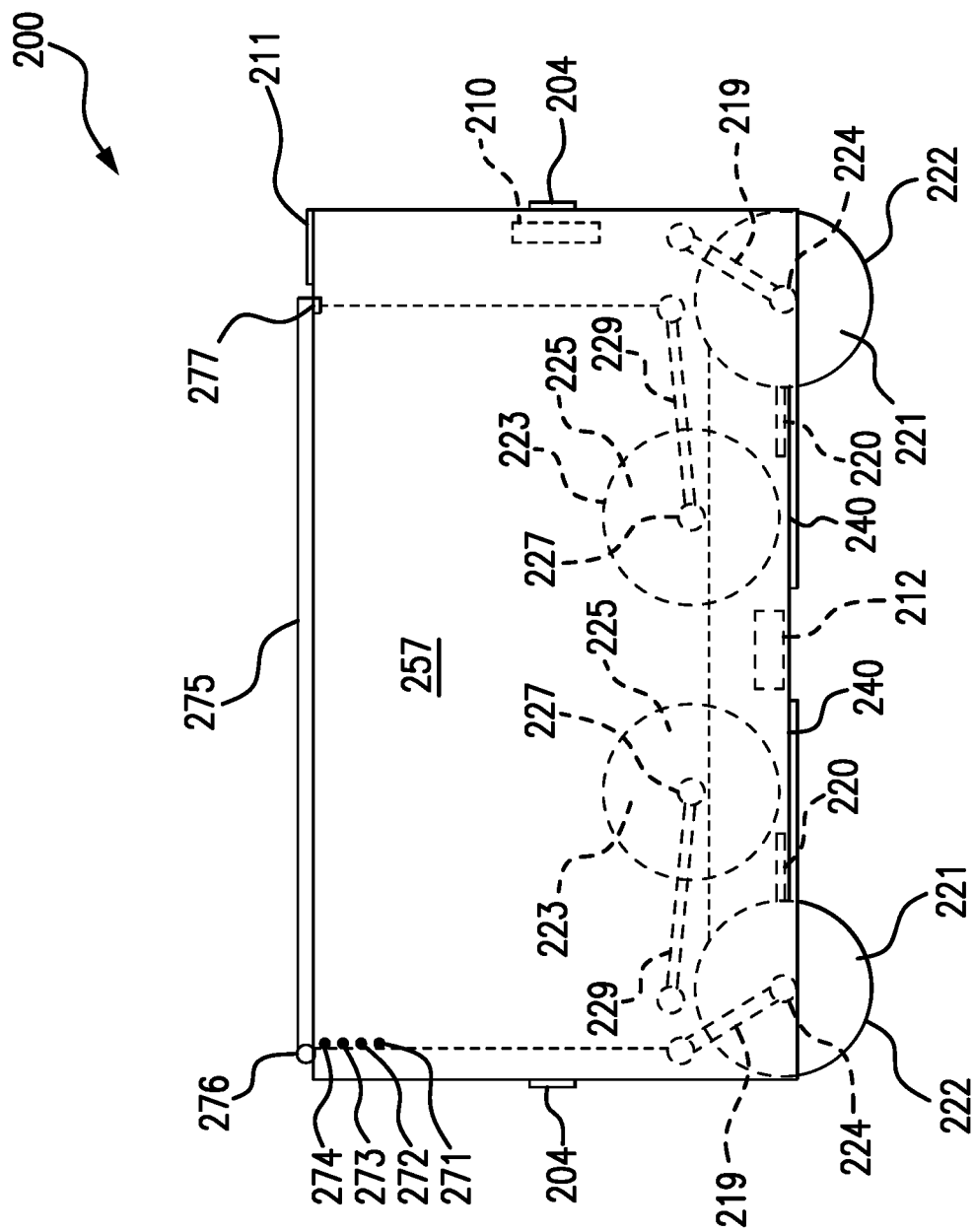
FIG. 2 is a side view in partial phantom, of an autonomous ground vehicle, according to another embodiment of the present invention, in an outdoor configuration and showing a plurality of indoor wheels in a retracted position.

FIG. 2 depicts a side view of an AGV 200, according to another embodiment of the present invention. In the exemplary embodiment of FIG. 2, an AGV 200 includes a first wheel module 221 having four outdoor wheels 222 that are mounted on axles 224 that are rotated by one or more motors 220. First wheel module 221 further includes pivoting arms 219 pivotably connecting outdoor wheels 222 to AGV 200. AGV 200 also includes a second wheel module 223 having four indoor wheels 225 that are mounted to axles 227 that are rotated by one or more motors 220. Second wheel module 223 further includes pivoting arms 229 pivotably connecting indoor wheels 225 to AGV 200.

FIG. 2 depicts AGV 200 in an outdoor configuration in which outdoor wheels 222 are in engagement with the ground and indoor wheels 225 are retracted, disposed within cavities defined at the bottom of AGV 200. To convert from the outdoor configuration to an indoor configuration, second wheel module 223 deploys from the bottom of AGV 200 by a pivoting motion of pivoting arms 229, downward, from the bottom of AGV 200. The pivoting is effected by one or more motors 220. Once indoor wheels 225 engage the ground and support AGV 200, first wheel module 221 is retracted into the bottom of AGV 200 by a pivoting motion of pivoting arms 219, upward, towards the bottom of AGV 200. Once retracted, outdoor wheels 222 are disposed in respective cavities defined in the bottom of AGV 200.

Likewise, when converting from the indoor configuration to the outdoor configuration, first wheel module 221 can deploy from the bottom of AGV 200 by a pivoting motion of pivoting arms 219, thus extending outdoor wheels 222, downward, from cavities in the bottom of AGV 200. The downward pivoting is enabled by activation of one or more motors 220. Once outdoor wheels 222 engage the ground and support AGV 200, second wheel module 225 can then retract into the bottom of AGV 200 by a pivoting motion of pivoting arms 229 causing indoor wheels 225 to move upward into the bottom of AGV 200 where indoor wheels 225 are received in respective cavities. When either first wheel module 221 or second wheel module 223 is retracted into the frame, a shield 240 can cover the wheel module to prevent dirt from falling off or getting on the retracted wheel module. Shield 240 can slide laterally into and out of a sheath provided in the bottom of AGV 200. The sliding can be motorized, for example, by one or more motors 220, and the sliding can enable clearance for the first and second wheel modules 221, 223 when converting from the indoor configuration to the outdoor configuration or from the outdoor configuration to the indoor configurations.

AGV 200 further includes a receptacle 257 that holds items that are transported by AGV 200. An electronic or manual lock can be provided to secure items within receptacle 257. As shown in FIG. 2, various sensors 204 can be mounted to AGV 200. For example, sensors 204 can be mounted on the front, back, and sides of AGV 200. Sensors 204 can include imaging sensors and/or distance detection sensors for measuring and monitoring the distance between AGV 200 and other objects. AGV 200 includes a power module 212. Power module 212 is coupled to and provides power for computing system 210, one or more motors 220, as well as any other attached input or output devices, the sensors, the electronic lock, and other related components. In the example of FIG. 2, receptacle 257 of AGV 200 includes bottom and side surfaces and a door 275 configured to form a cavity in which items can be stored. Receptacle 257 can include a locking mechanism 277 controlled directly or remotely by AGV computing system 210. Receptacle 257 can also include a presence detection sensor 271, a motion sensor 272, an image capture sensor 273, a temperature sensor 274, one or more other sensors, a combination thereof, or the like. AGV 200 also includes a user interface 211. User interface 211 is configured to receive and provide information to a user of AGV 200, to a programmer, or to a home dialysis patient or other intended recipient.

Figure 3:
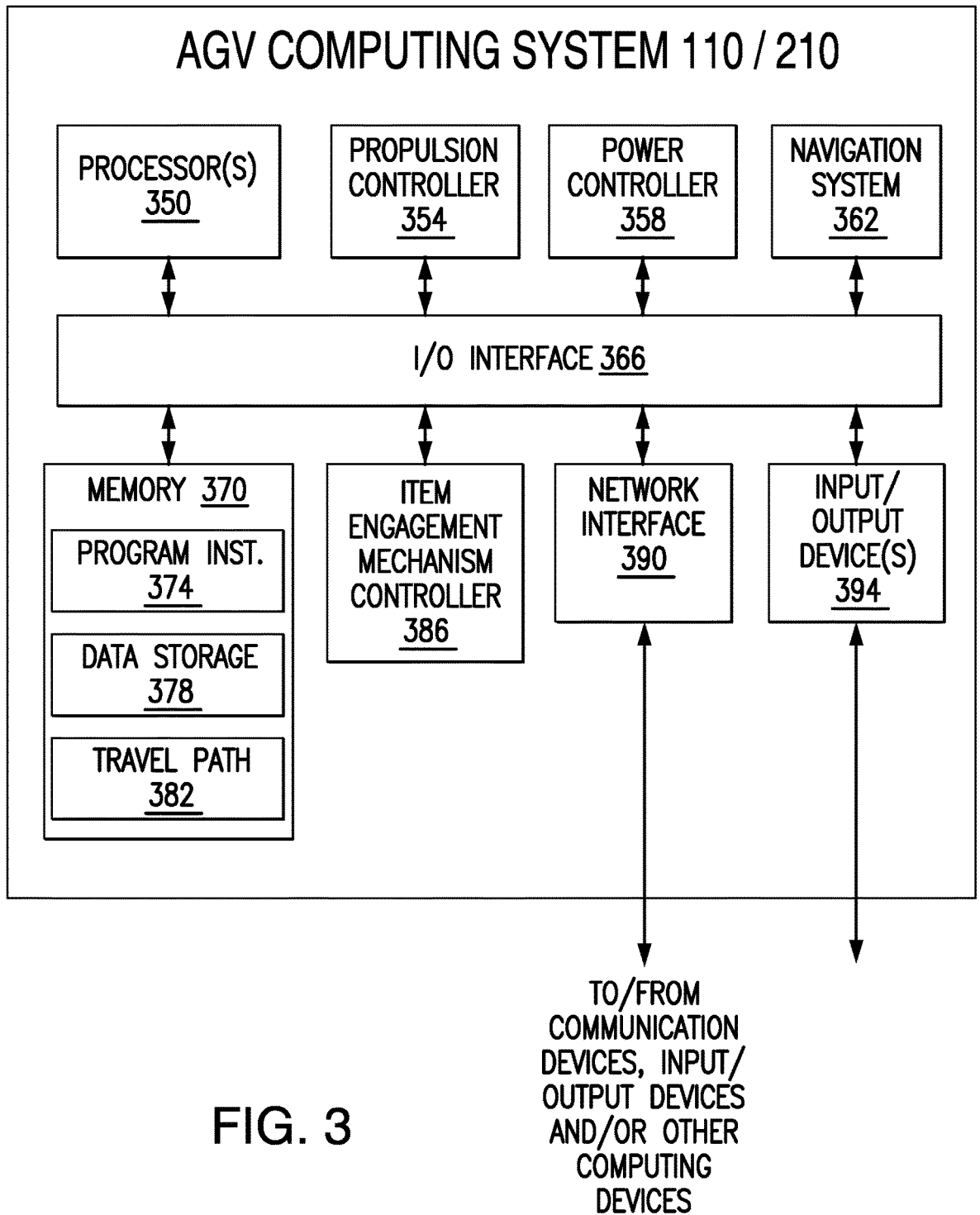
FIG. 3 is a schematic view of a computing system of an autonomous ground vehicle, delivery robot, according to an embodiment of the present invention.

FIG. 3 is a block diagram illustrating an example AGV computing system 110/210 that can be utilized, according to various embodiments of the present invention. AGV computing system 110/210 can be utilized in AGV 100 shown in FIGS. 1A-1D, in AGV 200 shown in FIG. 2, in any of the AGVs shown in FIGS. 6A-11, or for any of the other type of AGVs, autonomous delivery robot, or non-autonomous delivery robot, described herein.

In various examples, the block diagram of FIG. 3 is illustrative of one or more aspects of AGV computing system 110/210. AGV computing system 110/210 can be used to implement the various networks, systems, methods, motions, deliveries, charging, and other actions described herein. In the illustrated implementation, AGV computing system 110/210 includes one or more processors 350 coupled to a non-transitory computer readable storage medium 370 via an input/output (I/O) interface 366. AGV computing system 110/210 can also include a propulsion controller 354, a power controller 358, and a navigation system (GPS) 362. Propulsion controller 354 can be configured for controlling one or more drive motors, sensors, locks, lights, and the like. Power controller 358 can be configured for controlling, monitoring, and regulating the use and charging of the power module. AGV control system 110/210 further includes an item engagement mechanism controller 386, a network interface 390, and one or more input/output devices 394. Item engagement mechanism controller 386 can be configured for controlling an engagement mechanism, for example, an engagement mechanism as described herein.

Figure 4:
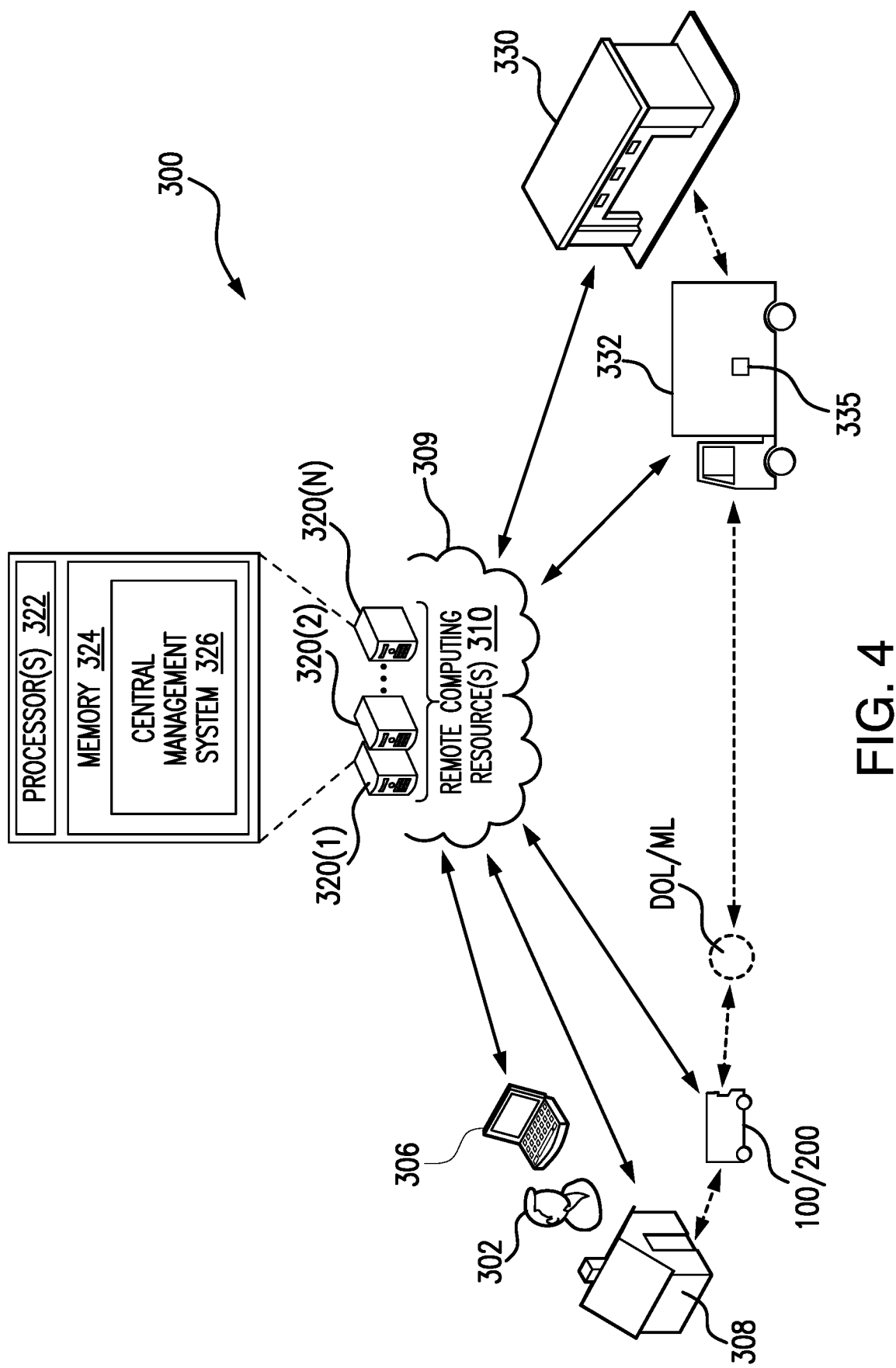
FIG. 4 is a schematic view of an autonomous delivery robot network, according to an embodiment of the present invention.
Figure 5:
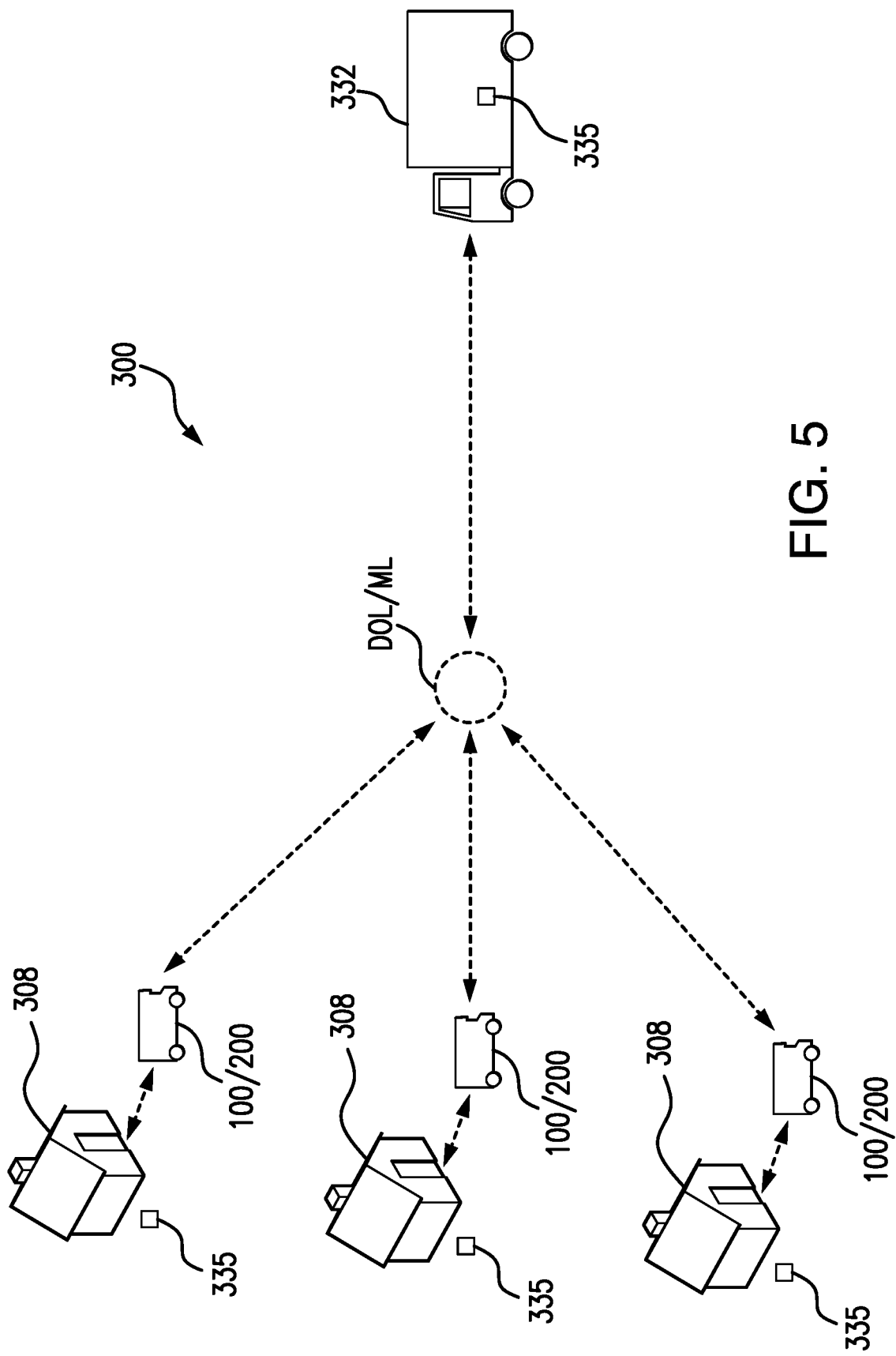
FIG. 5 is a schematic view of an autonomous delivery robot network, configured to deliver supplies to three different dwellings, according to an embodiment of the present invention.

FIGS. 4 and 5 are schematic diagrams of an illustrative AGV environment 300 that enables a home dialysis patient, other intended recipient, a physician, a pharmacist, a programmer, or a technician, herein depicted as a person 302, to communicate that an item is needed to be transported by an AGV 100/200 to a dwelling 308. Once a delivery vehicle 332 reaches an AGV drop-off location or meeting location DOL/ML, AGV 100/200 transports the item from the DOL/ML to a user specified residence 308. For example, AGV 100/200 may have travelled to the meeting location ML from a home docking station at a dwelling or residence 308 or may have been dropped off from delivery vehicle 332 at drop-off location DOL. In an exemplary configuration, a docking station 335 at a dwelling of a home dialysis patient, or a docking station on delivery vehicle 332, can include a charging station, a cleaning station, a servicing station for servicing components of AGV 100/200, or a combination thereof.

The AGV network 300 includes a user interface that enables person 302 to communicate that an item is needed for delivery by AGV 100/200, or to communicate that an item is not needed for delivery. The user interface can include a graphical user interface, an audio only interface, a multi-mode interface, a touch screen, voice activation, or any other interface for interacting with person 302. The user interface can be provided to person 302 through any type of electronic device 306, such as a tablet computer, desktop computer, laptop computer, smart phone, personal digital assistant, smart speaker, smart watch, or the like. The user interface can be delivered to electronic device 306 by one or more remote computing resources 310 that make up part or all of a central management system 326. In other embodiments, the user interface can be in direct communication between person 302 and an agent of a warehouse 330.

Remote computing resources 310 can form a portion of a network-accessible computing platform implemented as a computing infrastructure of processors, storage, software, data access, and other components, which is maintained and accessible via a network 309. Electronic device 306 can communicatively couple to remote computing resources 310 via network 309. Network 309 can comprise: wired technologies, for example, wires, USB cables and ports, fiber optic cables, ethernet cables and ports, firewire cables and ports, and the like; wireless technologies, for example RF transmitters and receivers, cellular components, satellite components, Bluetooth components, and the like; and/or other connection technologies. Network 309 carries data between electronic device 306 and remote computing resources 310.

After receiving from person 302 an order for an item that can be transported by AGV 100/200 to a dwelling 308, electronic device 306 can send the order information to remote computing resources 310 over network 309. As illustrated, remote computing resources 310 can include one or more servers, such as servers 320(1), 320(2), and 320(N). Servers 320(1)-(N) can be arranged in any number of ways, such as at server farms, in stacks, and in like formations that are commonly used in data centers. Furthermore, servers 320(1)-(N) can include one or more processors 322 and memory 324 that stores information for and software and firmware for central management system 326.

Central management system 326 can be configured, for example, to perform order planning and filling of transportation vehicles 332 with orders, for example, at warehouse 330, for transport to DOL/ML where one or more AGV 100/200 is then deployed to dwellings 308. Delivery vehicles 332 and/or one or more AGVs 100/200 can communicatively couple to remote computing resources 310 via network 309. For example, the communications to and from deliver vehicles 332 and/or AGV(s) 100/200 can utilize wireless transmitters and receiving antennae incorporated in or on delivery vehicles 332 and AGV(s) 100/200.

Central management system 326 can also be configured, for example, to communicate with delivery vehicles 332 and/or AGV(s) 100/200. In various implementations, the general activities of delivery vehicles 332 and AGV(s) 100/200, including those related to the planning and implementation of delivery vehicles 332 receiving and transporting items and AGV(s) 100/200 acquiring and transporting of items to indoor drop-off locations can be coordinated and/or otherwise controlled by central management system 326. For example, central management system 326 can receive or determine schedule data for the travel of the delivery vehicles 332 to drop-off location or meeting location DOL/ML and for travel of the AGV(s) 100/200.

AGV(s) 100/200 can be configured to communicate with other AGV(s) 100/200, for example, to receive or send signals, data, other information, or the like. AGV(s) 100/200 can be configured to communicate with central management system 326 to receive or send signals, data, other information, or the like. For example, AGV(s) 100/200 can sense and/or receive travel related data, including data related to travel conditions, obstacles, a pathway, a change to a pathway, a previously route, a previously route stored in memory, or the like. Data pertaining to travel, which is sensed and/or collected by AGV(s) 100/200, can be shared with central management system 326, other AGV(s) 100/200, delivery vehicles 332, person 302, another entity, a combination thereof, and the like. AGV(s) 100/200 can use this information locally, in combination with other received travel-related data, for navigating current travel pathways, combinations thereof, and the like. Such travel-related data can be centrally stored and processed to be utilized for: creating and updating travel pathways; informing other AGV(s) 100/200 regarding the availability and conditions of certain travel pathways; informing systems and persons of certain travel delays; informing robots, networks, and persons about weather conditions; combinations thereof; and the like.

Each of the remote computing resources 310 and central management system 326 can independently receive tracking data, for example, including but not limited to GPS coordinate data pertaining to the coordinates of one or more delivery vehicles 332, one or more AGV(s) 100/200, one or more dwellings, one or more warehouses, combinations thereof, and the like. GPS data can be utilized for various purposes, such as answering location status requests, sending notifications regarding current locations of delivery vehicles 332 and/or AGV(s) 100/200, and the like.

Figure 6A:
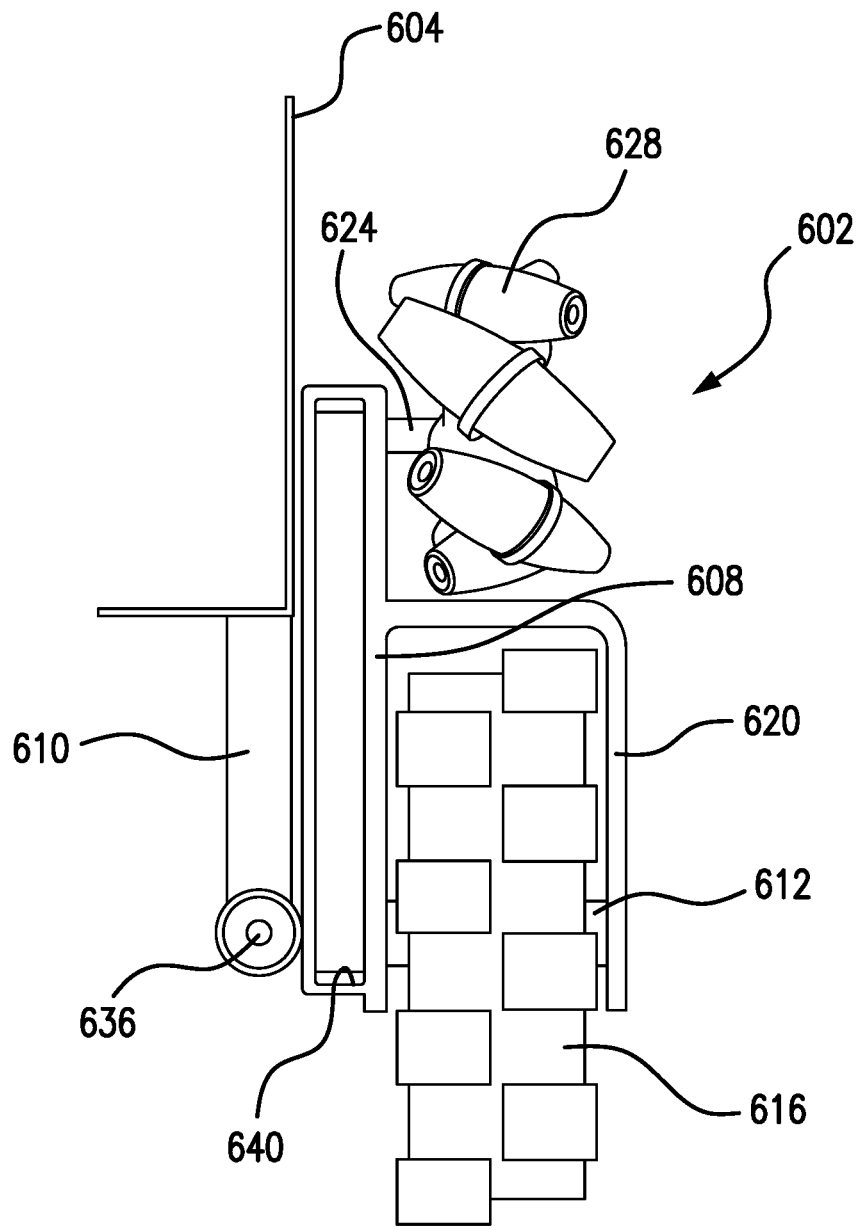
FIG. 6A is a front view of a dual-wheel propulsion unit of an autonomous ground vehicle in an outdoor configuration, according to an embodiment of the present invention.
Figure 6B:
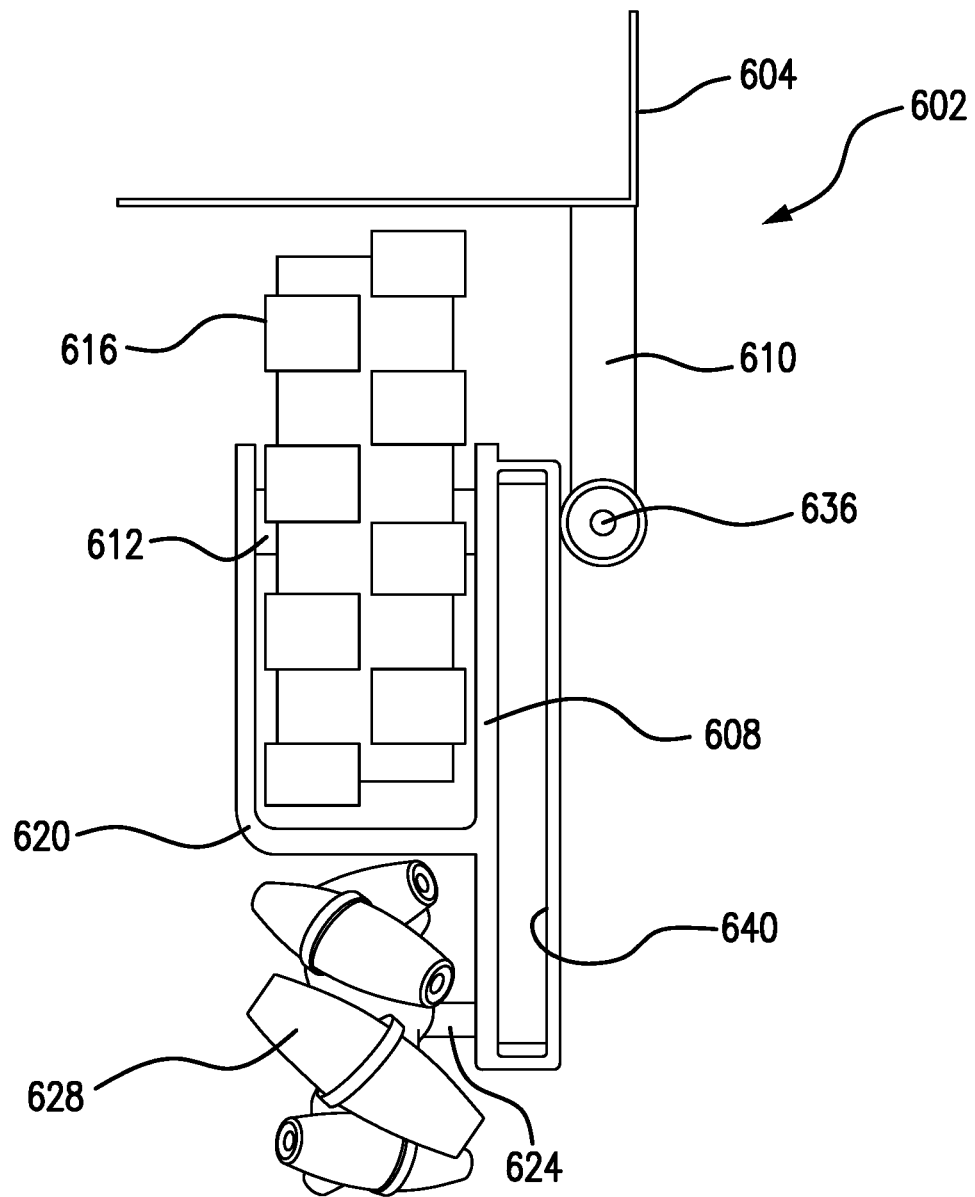
FIG. 6B is a front view of the dual-wheel propulsion unit shown in FIG. 6A, in an indoor configuration.

FIGS. 6A and 6B depict a front view of a dual-wheel propulsion unit 602 of an AGV, according to various embodiments of the present invention. Dual-wheel propulsion unit 602 enables one motor or drive system to drive both an outdoor wheel 616 and an indoor wheel 628, individually and independently. Dual-wheel propulsion unit 602 is coupled to a frame 604 of an AGV by a wheel strut 610. Wheel strut 610 can be adjustable in height to compensate for different wheel sizes when converting from an outdoor configuration to an indoor configuration and from an indoor configuration to an outdoor configuration. A wheel bracket 608 is pivotably coupled to wheel strut 610 at a pivot point 636. Outdoor wheel 616 is rotatably attached to wheel bracket 608 by an outdoor wheel axle 612 and indoor wheel 628 is rotatably attached to wheel bracket 608 by an indoor wheel axle 624. Outdoor wheel 616 and indoor wheel 628 can be attached to wheel bracket 608 above and below one another. Wheel bracket 608 can include a dual-drive enclosure 640. Dual-drive enclosure 640 can enclose gears, belts, inner wheel drives, and the like that drive outdoor wheel axle 612 and indoor wheel axle 624 independently, subsequently, and/or simultaneously. For example, a gear that is attached to outdoor wheel axle 612 can interlock with a gear that is attached to indoor wheel axle 624. The motor can drive one of the gears, which rotates the other of the gears, thereby driving both of outdoor wheel 616 and indoor wheel 628. Gear engagement and disengagement features can be provided that drive outdoor wheel axle 612 and indoor wheel axle 624 independently, subsequently, and/or simultaneously.

FIG. 6A depicts dual-wheel propulsion unit 602 in an outdoor configuration, wherein outdoor wheel 616 engages an outdoor surface. Outdoor wheel 616 can be a larger wheel than indoor wheel 628 and can include tread, for example, knobby tires, to traverse an outdoor terrain.

FIG. 6B depicts dual-wheel propulsion unit 600 in an indoor configuration, wherein indoor wheel 628 engages an indoor surface. Indoor wheel 628 can be a smaller wheel relative to outdoor wheel 616 and can be a mecanum wheel that utilizes a plurality of rollers disposed at angles relative to one another. A shield 620 is attached to the wheel bracket 608 and surrounds a portion of outdoor wheel 616 such that shield 620 covers outdoor wheel 616, from the bottom, when dual-wheel propulsion unit 602 is in the indoor configuration. Shield 620 catches outdoor debris that might fall off of outdoor wheel 616, preventing such debris from falling onto an indoor surface. Indoor wheel 628 can also be covered when the AGV is in the outdoor configuration, to prevent water or other debris from getting onto indoor wheel 628 when the AGV is outside. Such an indoor wheel cover can include an internal compartment of the AGV, a flap or a lid that covers each indoor wheel 628 individually, an umbrella, shroud or tarp that covers the entire AGV or the like. whatever the indoor wheel cover is, it can be manually installed and removed, automatically installed and removed, manually installed and automatically removed, automatically installed and manually removed, or the like. The present invention can also include air jets to dry off indoor wheel 628 and other portions of the AGV, for example, to dry off indoor wheel 628 just before indoor wheel enters a dwelling.

FIGS. 7A-7G depict front views of an AGV 700 with dual-wheel propulsion units 702a and 702b, according to various embodiments of the present invention. FIGS. 7A-7G sequentially depict AGV 700 converting from an outdoor configuration to an indoor configuration while using a lift 744. Dual-wheel propulsion units 702a and 702b include a first dual-wheel propulsion unit 702a and a second dual-wheel propulsion unit 702b. The system can include one or more additional pairs of such wheel systems. AGV 700 includes a frame 704. First dual-wheel propulsion unit 702a is coupled to a first side of frame 704 by a first wheel strut 710a. One or more first wheel brackets 708a are pivotably coupled to first wheel strut 710a at a first pivot point 736a. First dual-wheel propulsion unit 702a further includes a first outdoor wheel 716a, a first indoor wheel 728a, a first dual-drive enclosure 740a, and a first shield 720a. Second dual-wheel propulsion unit 702b is coupled to a second side of frame 704 by a second wheel strut 710b. One or more second wheel brackets 708b are pivotably coupled to second wheel strut 710b at a second pivot point 736b. Second dual-wheel propulsion unit 702b further includes a second outdoor wheel 716b, a second indoor wheel 728b, a second dual-drive enclosure 740b, and a second shield 720b.

Figure 7A:
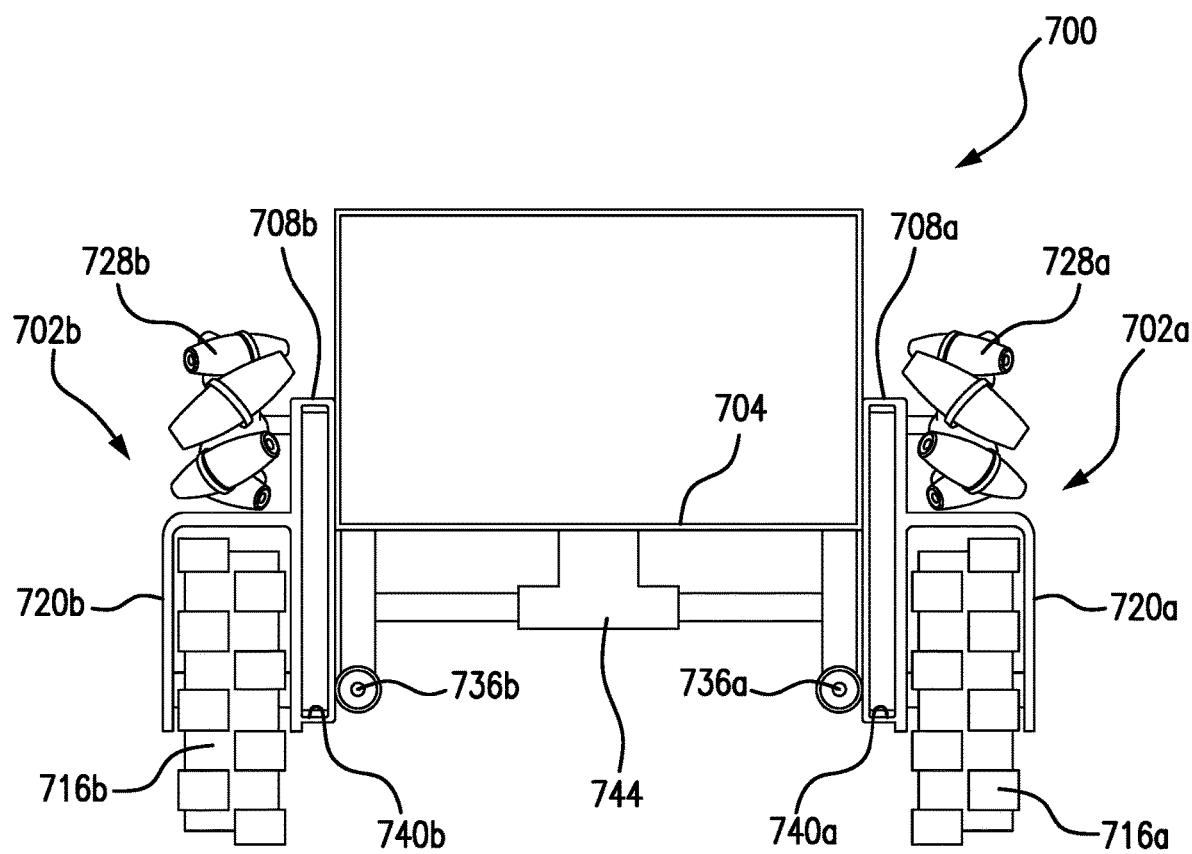
FIG. 7A is a front view of an autonomous ground vehicle in an outdoor configuration, according to an embodiment of the present invention.
Figure 7B:
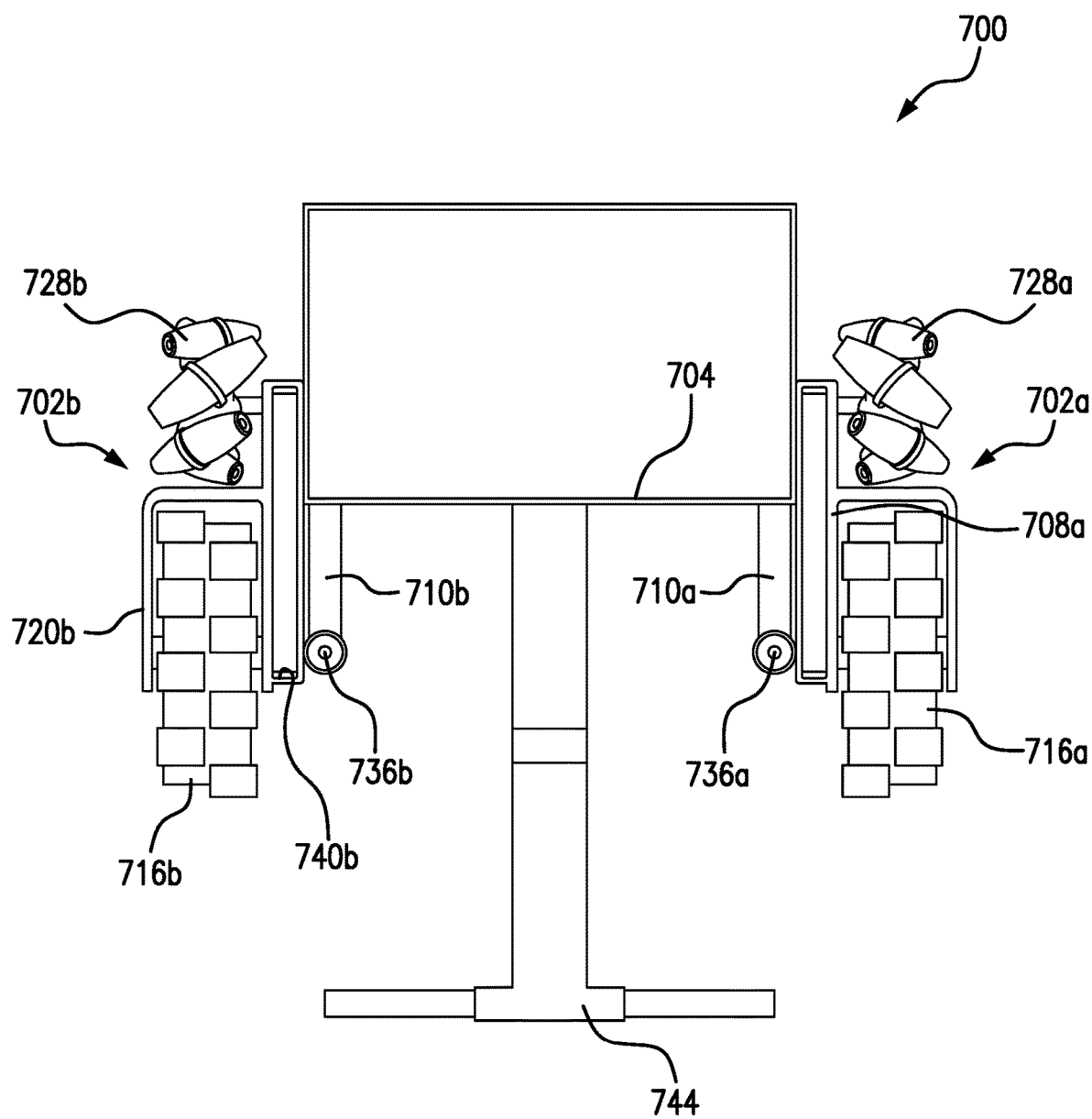
FIG. 7B is a front view of the autonomous ground vehicle shown in FIG. 7A, beginning a transition from the outdoor configuration shown in FIG. 7A to an indoor configuration.
Figure 7C:
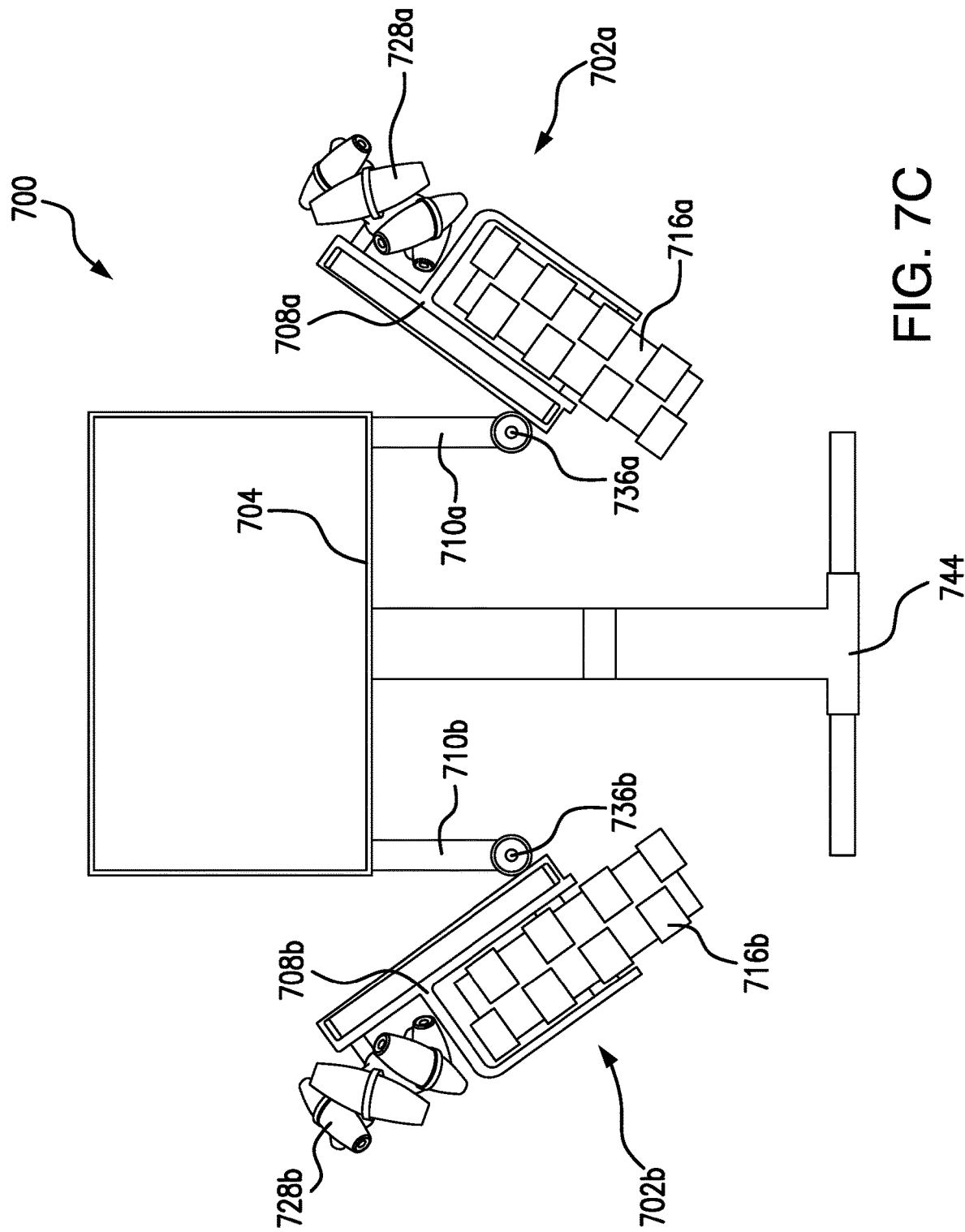
FIG. 7C is a front view of the autonomous ground vehicle shown in FIGS. 7A and 7B, further transitioning from the outdoor configuration shown in FIG. 7A to an indoor configuration.
Figure 7D:
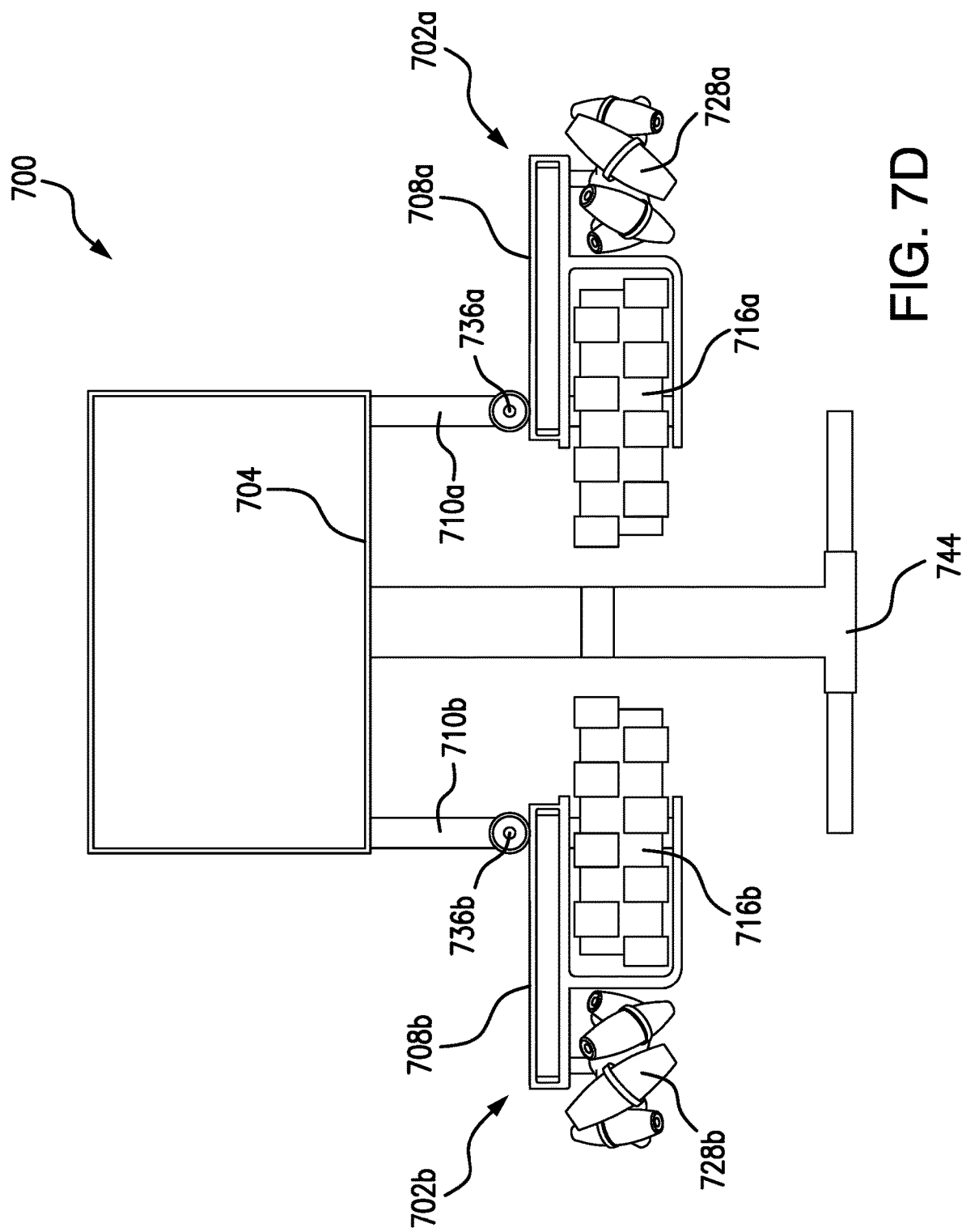
FIG. 7D is a front view of the autonomous ground vehicle shown in FIGS. 7A-7C, further transitioning from the outdoor configuration shown in FIG. 7A to an indoor configuration.
Figure 7F:
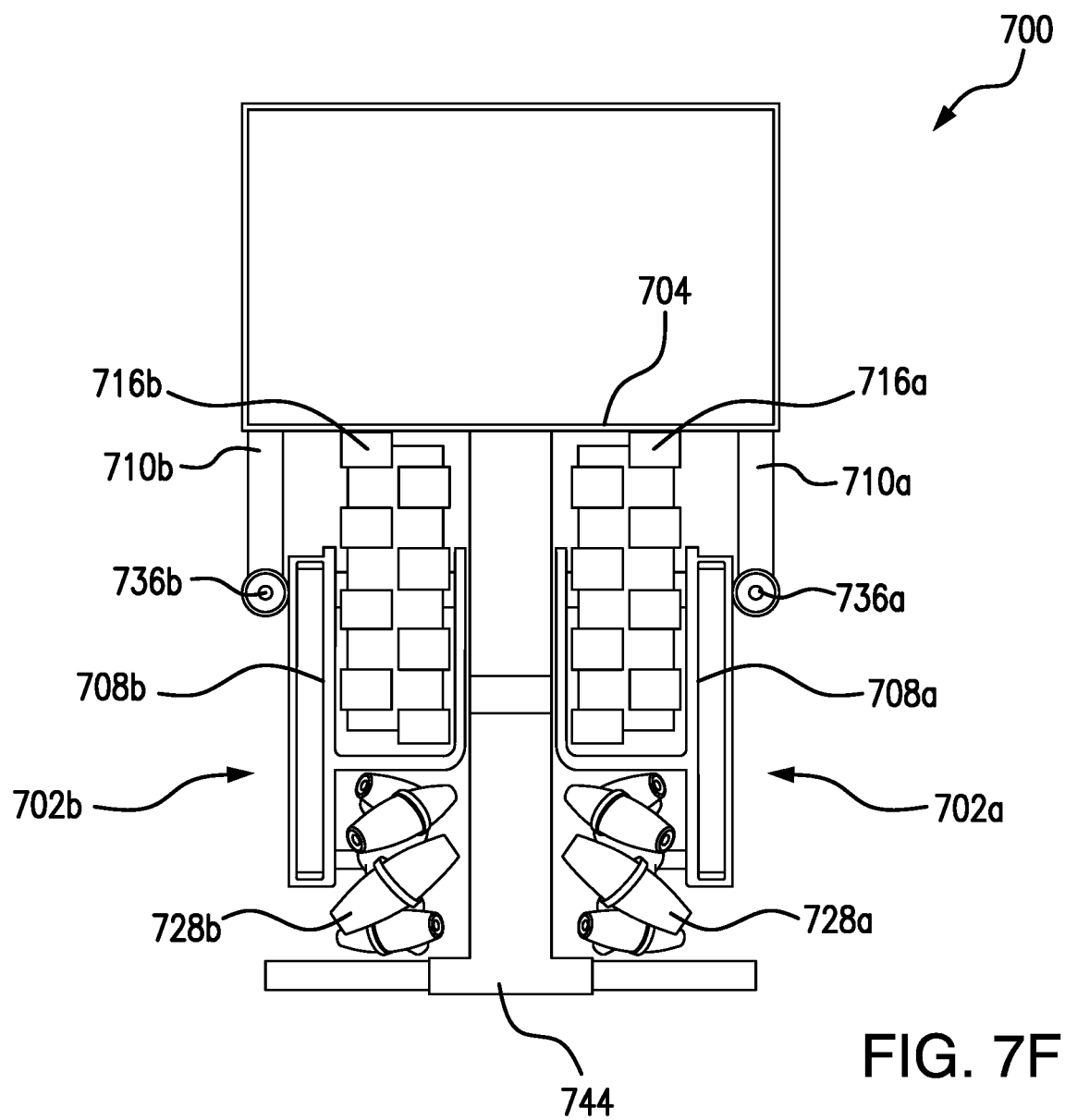
FIG. 7F is a front view of the autonomous ground vehicle shown in FIGS. 7A-7E, in a last stage of transitioning from the outdoor configuration shown in FIG. 7A to an indoor configuration.
Figure 7G:
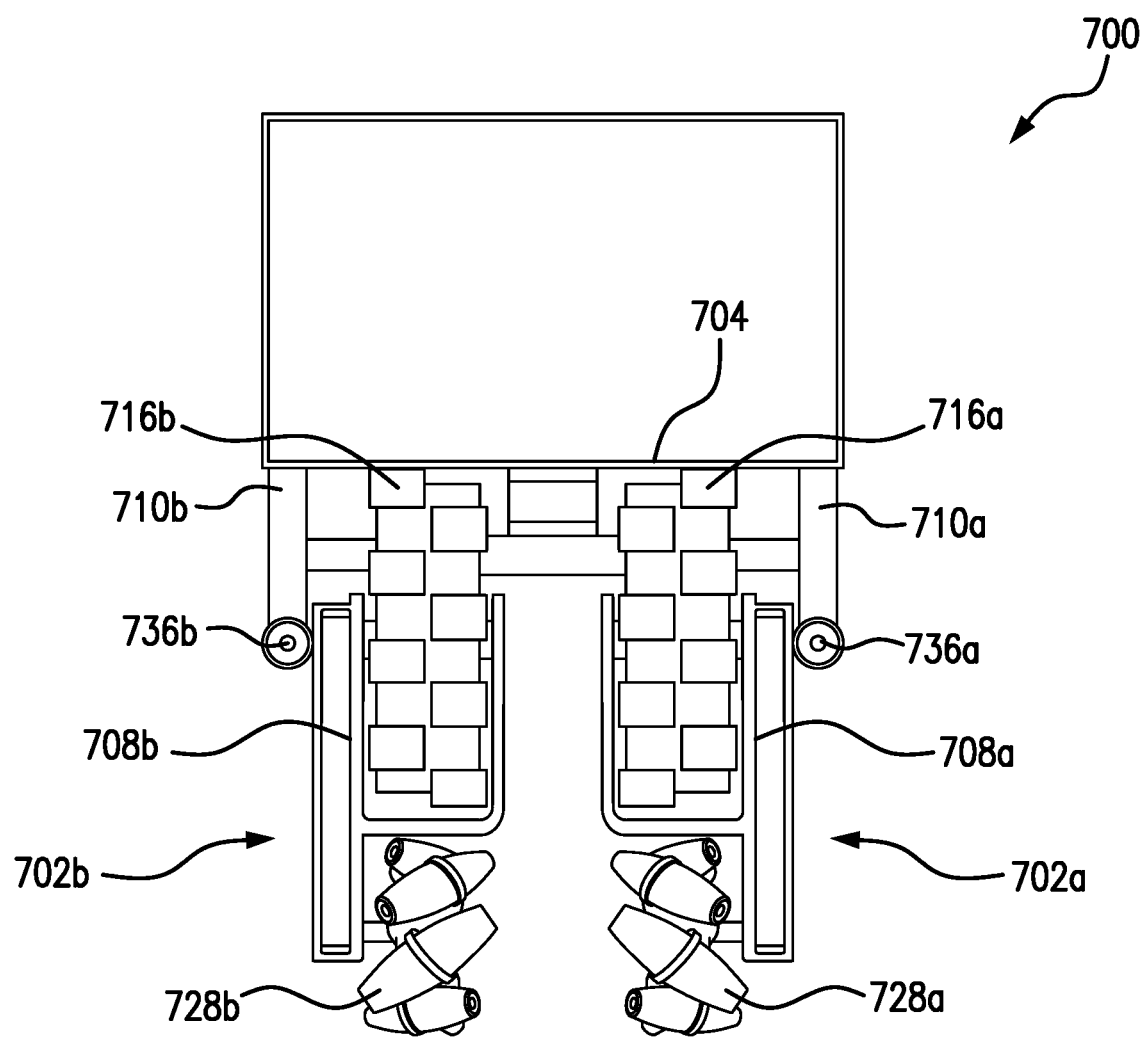
FIG. 7G is a front view of the autonomous ground vehicle shown in FIGS. 7A-7F, in an indoor configuration.

In the outdoor configuration, first and second wheel brackets 708a and 708b are pivoted upward such that first and second outdoor wheels 716a and 716b are engaged with an outdoor surface. To convert from the outdoor configuration to the indoor configuration, lift 744 deploys from a bottom of frame 704 and lifts the AGV 700 upwards off of the outdoor/indoor surface such that dual-wheel propulsion units 702a and 702b are elevated above an outdoor/indoor surface. First and second wheel brackets 708a and 708b then pivot and swing downward until the indoor wheels are facing the outdoor/indoor surface, and first and second outdoor wheels 716a and 716b are facing away from the outdoor/indoor surface. Lift 744 then lowers AGV 700 downwards so that first and second indoor wheels 728a and 728b engage the indoor/outdoor surface and lift 744 continues to raise upward toward the bottom of frame 704. The ending position shown in FIG. 7G shows indoor wheels 728a and 728b engaging a surface, and the surface can be an inside surface, or an outside surface, for example, an outside surface just outside of a doorway or threshold leading into a dwelling, such as a porch or patio or carport surface.

Figure 8:
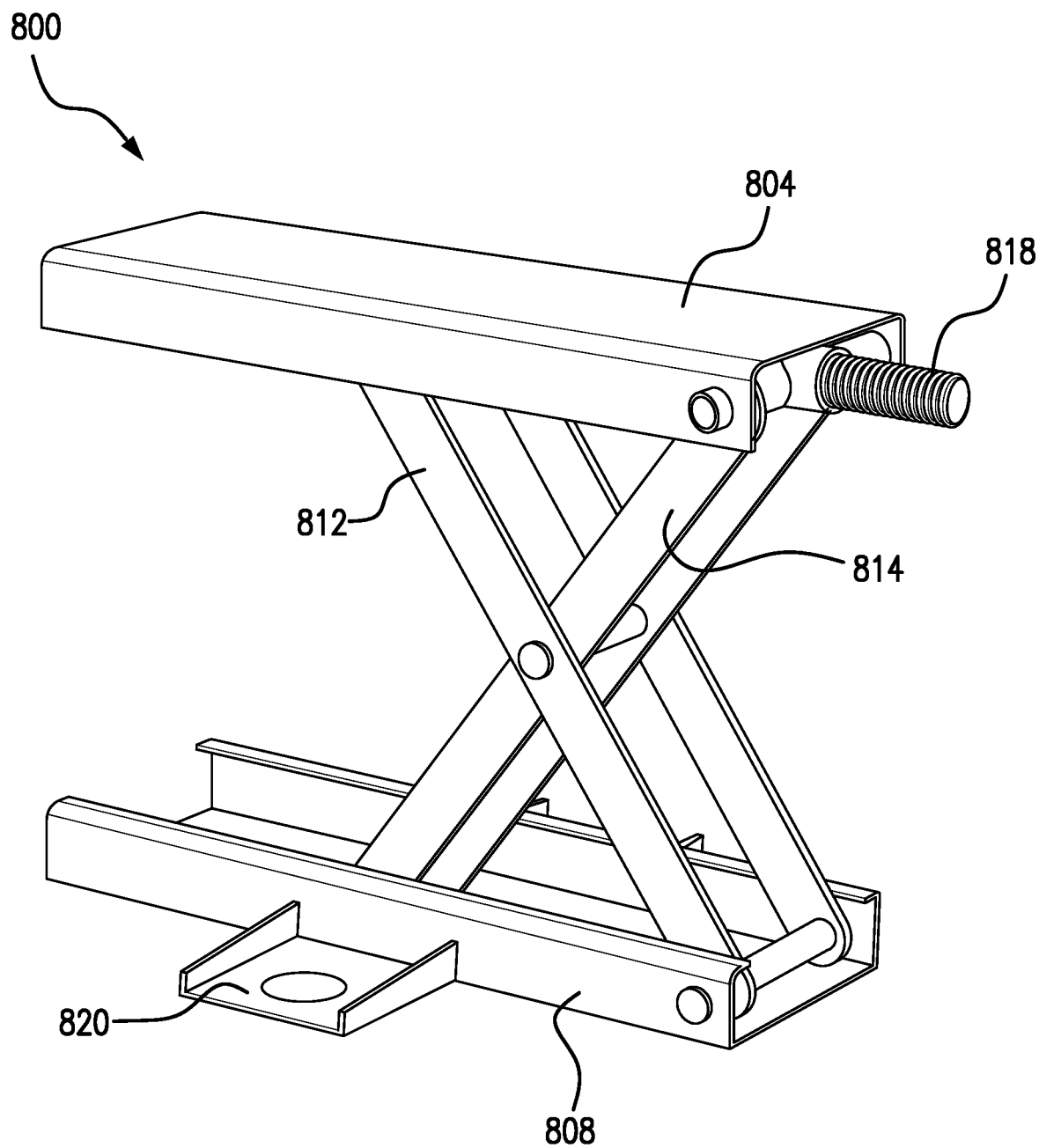
FIG. 8 is a perspective view of a lift of the autonomous ground vehicle shown in FIGS. 7A-7G.

FIG. 8 depicts a perspective view of an exemplary lift 800 that can be used to lift AGV 700 during a wheel change. Lift 800 can be a scissors jack, as shown. Alternatively, lift 800 can be a telescoping lift, a hydraulic lift, a pneumatic lift, or any other type of lift capable of lifting the AGV off of the indoor/outdoor surface.

As shown, scissors jack 800 can include a base 808, a mounting plate 804, a first pair of pivoting arms 812, and a second pair of pivoting arms 814. Second pair of pivoting arms 814 can be pivotably connected to first pair of pivoting arms 812. A foot 820 is attached at a bottom of base 808 and can extend laterally from base 808 to provide additional support for scissors jack 800. Foot 820 can have a width that is the same as, or about the same as, a width of the AGV. Mounting plate 804 can be attached to the bottom of frame of the AGV, for example, attached to frame 704 of AGV 700 shown in FIGS. 7A-7G.

When deploying lift 800, a motor is made to rotate a worm drive 818 that pivots first pair of pivoting arms 812 and second pair of pivoting arms 814, extending the lift and driving base 808 downward. The motor can rotate worm drive 818 until foot 820 engages the outdoor/indoor surface and the AGV is elevated off of the outdoor/indoor surface by a sufficient distance to enable switching of the wheels, for example, to enable full pivoting motion at pivot points 736a and 736b as shown in FIGS. 7A-7G. Activation, motor engagement, rotation of the worm drive, the length of extension, and other events, measurements, movements, and parameters of the lift can be calculated autonomously and the autonomous system can implement, for example, sensors to determine when lift 800 has been adequately extended or retracted. Clearance from the surrounding surface, whether an indoor surface or an outdoor surface, can be sensed rather than sensing only a length of extension. As such, the autonomous system can take into consideration variables, for example, sinking in soft ground such as mud, gravel, stones, grass, snow, or sand, tilting due to a slope or foreign object on a surface, and wind conditions that might limit calculations for a safe center of gravity.

To retract lift 800, the motor rotates worm gear 818 in an opposite direction, pivoting first pair of pivoting arms 812 and second pair of pivoting arms 814 in respective opposite directions, and thereby lifting foot 820 up and off of the outdoor/indoor surface. The AGV can comprise and implement one or more lifts 800 to raise and lower the AGV. Two lifts at opposite ends of the AGV can be used, four lifts at four corners of the AGV can be used, or the like.

Figure 9A:
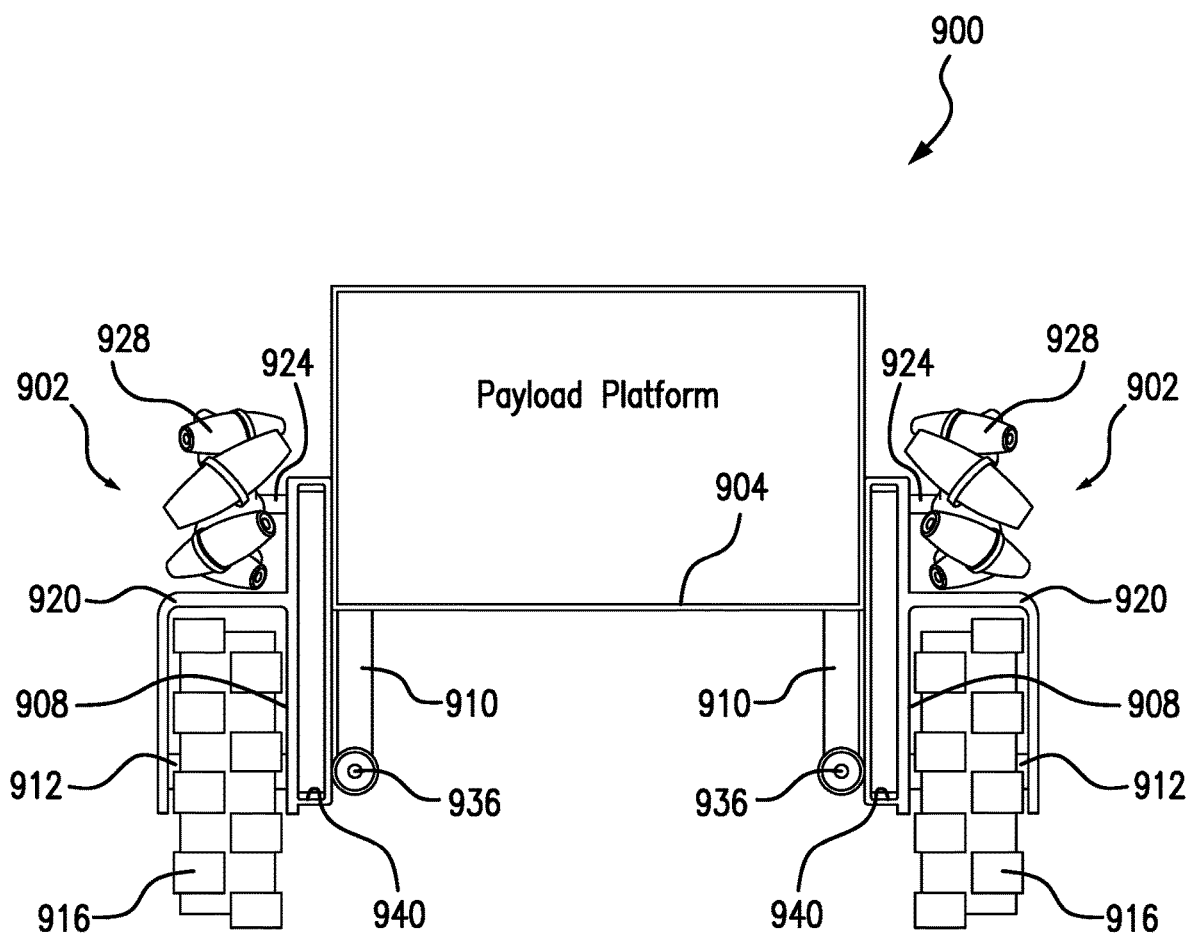
FIG. 9A is a front view of an autonomous ground vehicle in an outdoor configuration, according to an embodiment of the present invention.
Figure 9B:
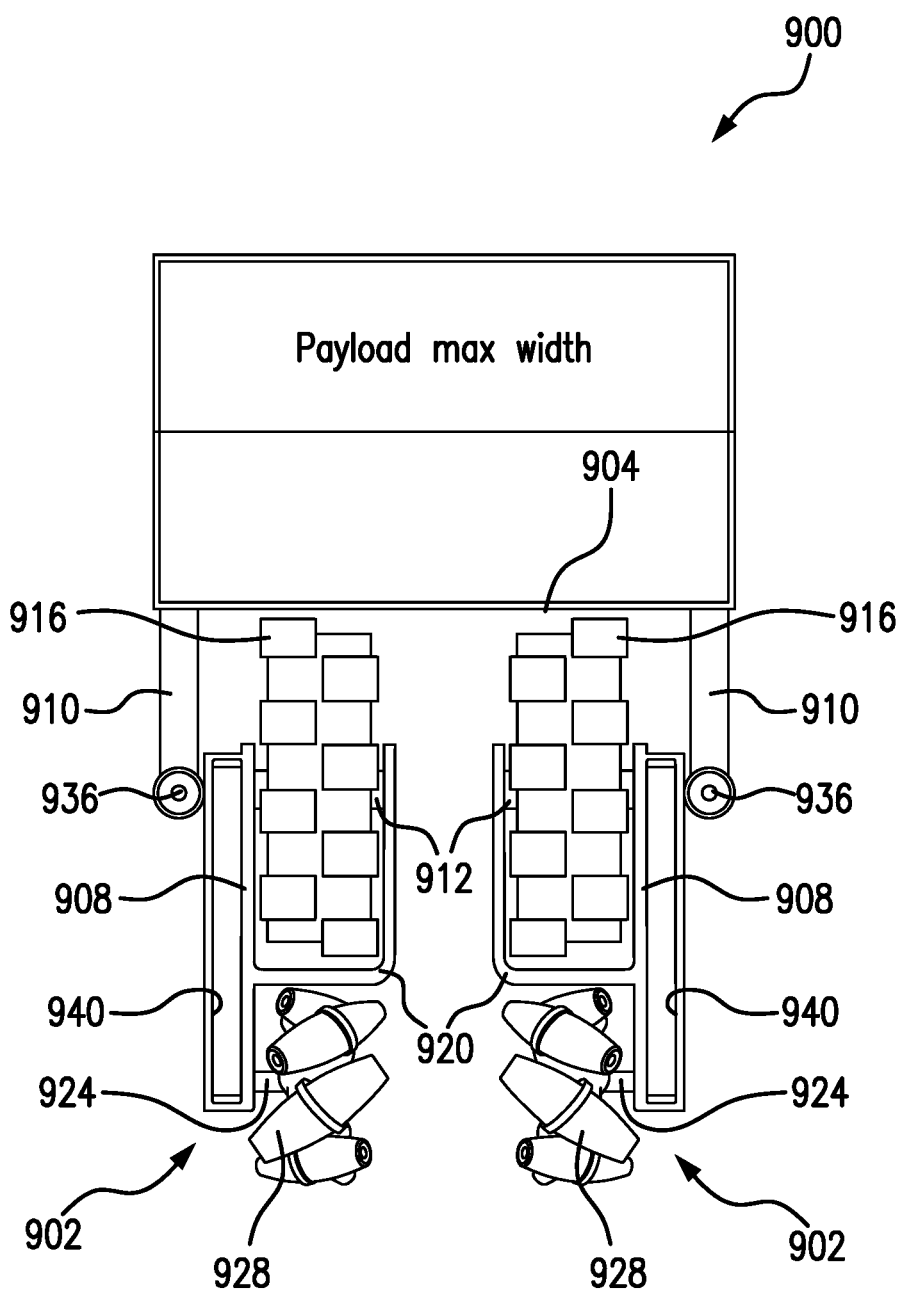
FIG. 9B is a front view of the autonomous ground vehicle shown in FIG. 9A, but in an indoor configuration, and showing the maximum payload width.
Figure 9C:
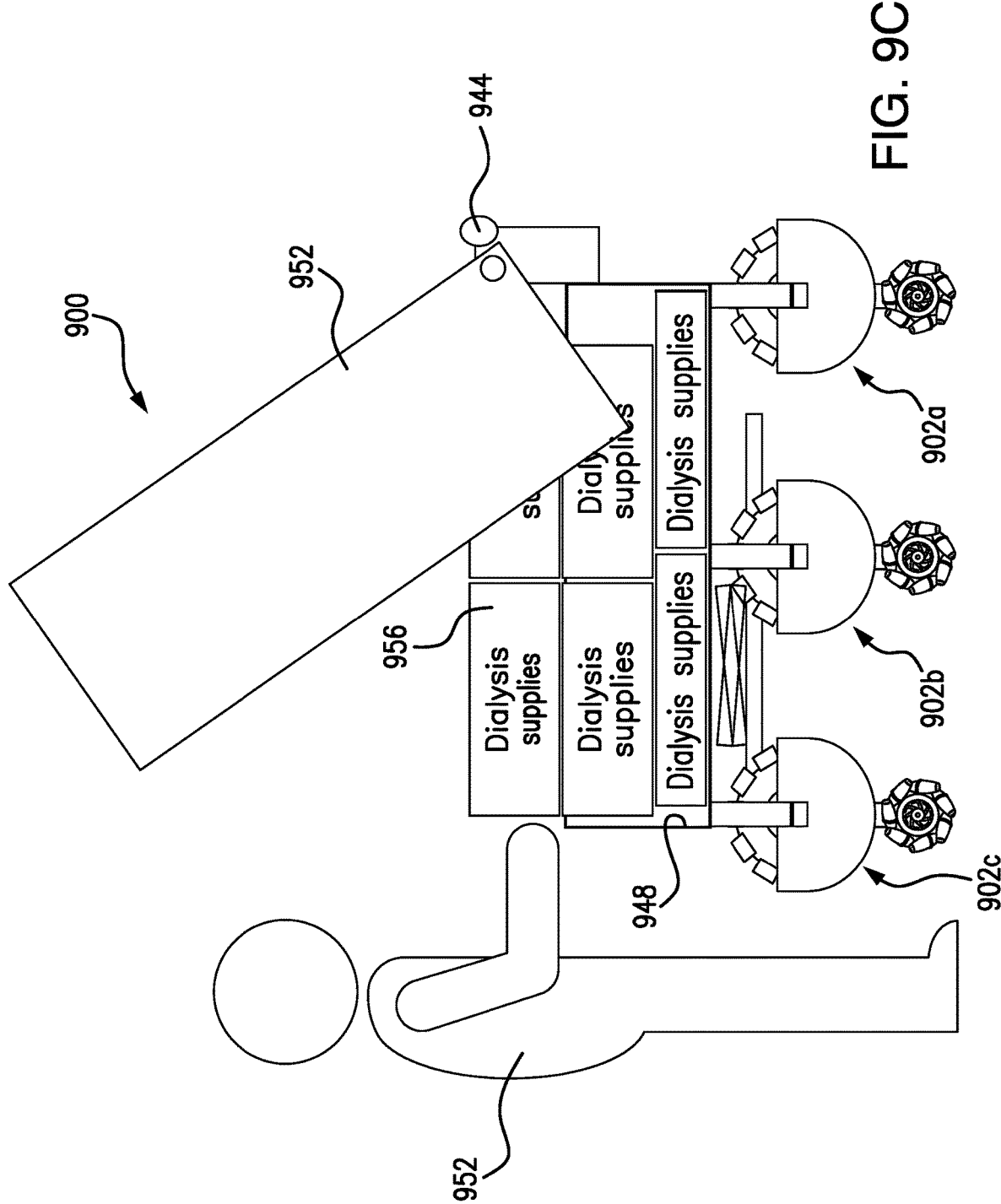
FIG. 9C is a side view of the autonomous ground vehicle shown in FIGS. 9A and 9B, in an indoor configuration, and illustrating a recipient retrieving dialysis supplies from a receptacle of the autonomous ground vehicle.

FIGS. 9A and 9B depict front views of an AGV 900 and FIGS. 9C and 9D depict side views of AGV 900, according to various embodiments of the present invention. AGV 900 includes a plurality of dual-wheel propulsion units 902. In the embodiment shown in FIGS. 9A-9D, AGV 900 comprises three pairs of dual-wheel propulsion units 902a, 902b, and 902c. The pairs can include a front pair of dual-wheel propulsion units 902a, a mid-pair of dual-wheel propulsion units 902b, and a back pair of dual-wheel propulsion units 902c, as shown in FIGS. 9C and 9D. FIGS. 9A and 9B are front views and show only a single pair of dual-wheel propulsion units, and while mirror images of one another, are generically depicted as 902 and 902. Dual-wheel propulsion units 902 are each independently coupled to a frame 904 of AGV 900 via wheel struts 910. Each of dual-wheel propulsion units 902 includes a wheel bracket 908 that is pivotably coupled to wheel strut 910 at a pivot point 936. Each dual-wheel propulsion unit 902 further includes an outdoor wheel 916, an outdoor wheel axle 912, an indoor wheel 928, an indoor wheel axle 924, a dual-drive enclosure 940, and a shield 920. AGV 900 comprises navigation sensors 944, a receptacle 948, and a protective shroud 952 that covers receptacle 948.

In an outdoor configuration, wheel brackets 908 are disposed on outer sides of the respective wheel struts 910 and thereby along outer sides of AGV 900. Wheel brackets 908 and wheel struts 910 are at 180 degrees, or at about 180 degrees, relative to one another such that wheel brackets 908 and wheel struts 910 are folded against one another. Wheel brackets 908 are disposed on outer sides of AGV 900 and enable a wider and more stable stance having a low center of gravity, especially in the outdoor configuration. Such a configuration enables AGV 900 to traverse uneven outdoor terrain with little or no risk of tipping over.

When switched to the indoor configuration, wheel brackets 908 pivot 180 degrees, or about 180 degrees, downward along longitudinal axes of AGV 900 and fold underneath AGV 900 such that wheel brackets 908 are become located on inner sides of wheel struts 910 and inside the foot-print width of AGV 900. Wheel brackets 908 and wheel struts 910 are again at 180 degrees, or about 180 degrees, relative to one another but in the indoor configuration extend away from one another. In such a configuration, AGV 900 becomes narrower and can fit through a 30" doorway.

As mentioned above, in the indoor configuration, wheel brackets 908 and wheel struts 910 extend away from one another. This configuration raises AGV 900 upwards to a waist height, allowing a recipient 952 to easily retrieve dialysis supplies 956 from receptacle 948. The outdoor configuration includes wheel brackets 908 and wheel struts 910 folded against one another, and thus AGV 900 is lower to the ground and has a lower center of gravity, enabling AGV 900 to better navigate outdoor terrain. As such, it can be appreciated that multiple advantages come from switching between the outdoor and indoor configurations.

Figure 10A:
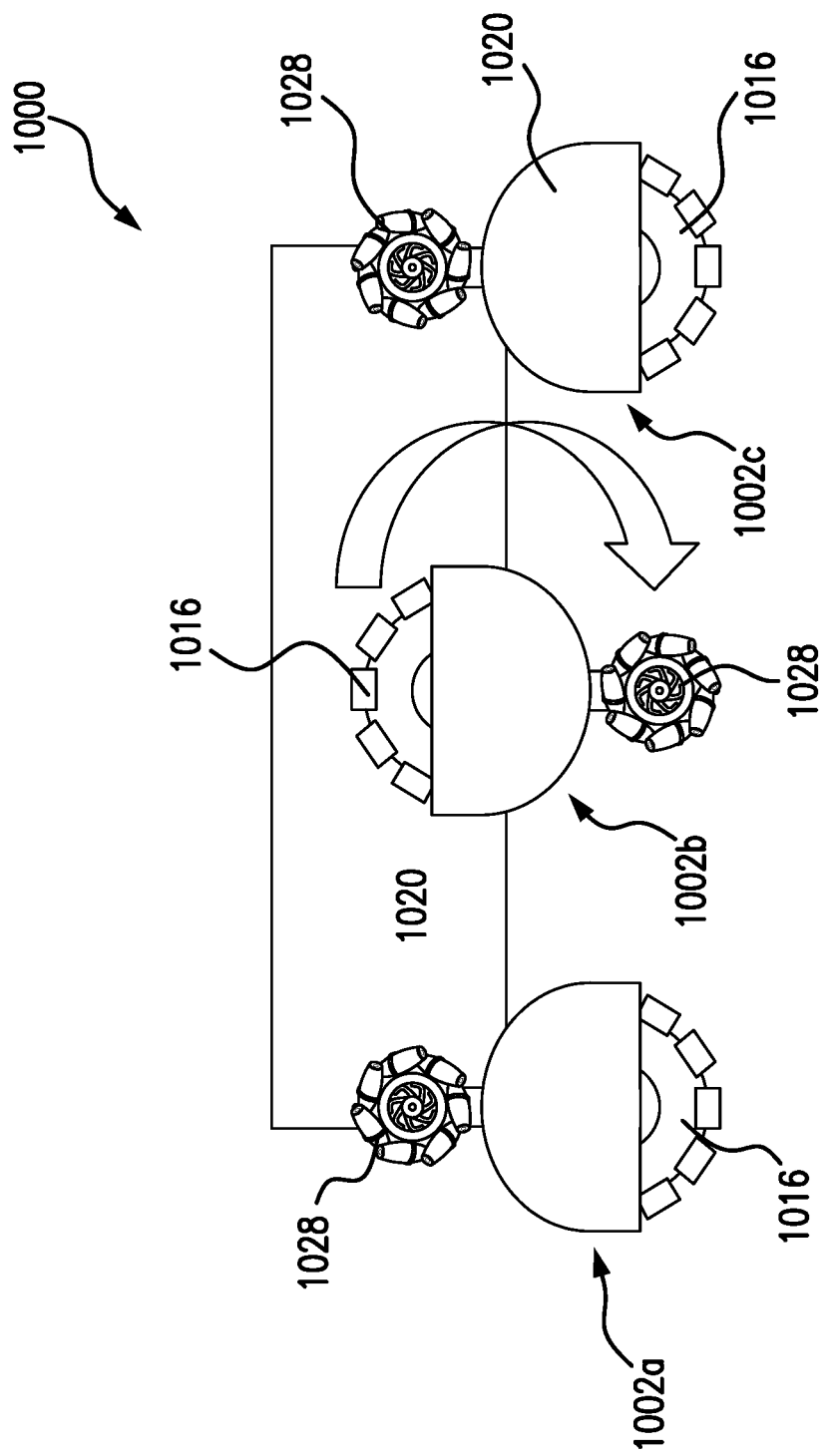
FIG. 10A is a side view of an autonomous ground vehicle, and showing the middle wheel structure transitioning from an indoor configuration to an outdoor configuration, according to an embodiment of the present invention.
Figure 10B:
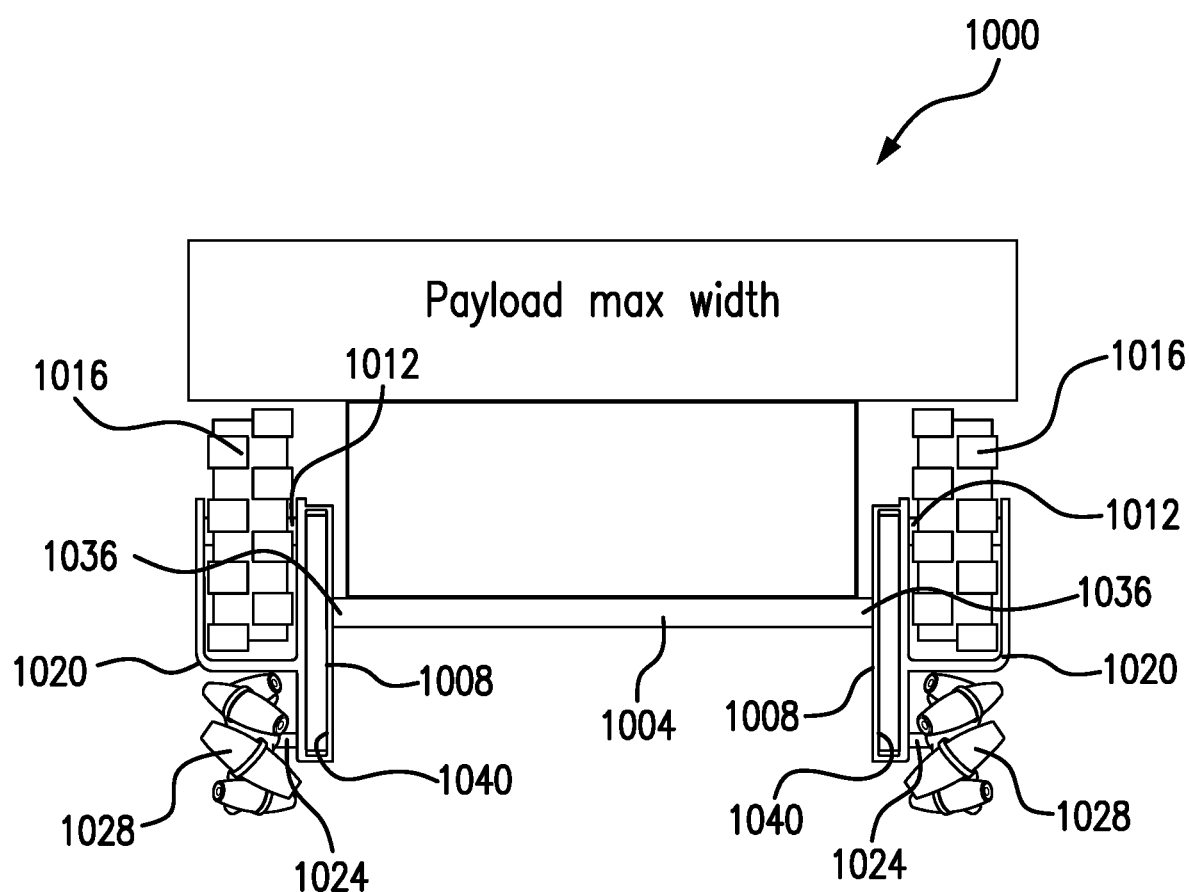
FIG. 10B is a front view of the autonomous ground vehicle shown in FIG. 10A, in an indoor configuration.
Figure 10C:
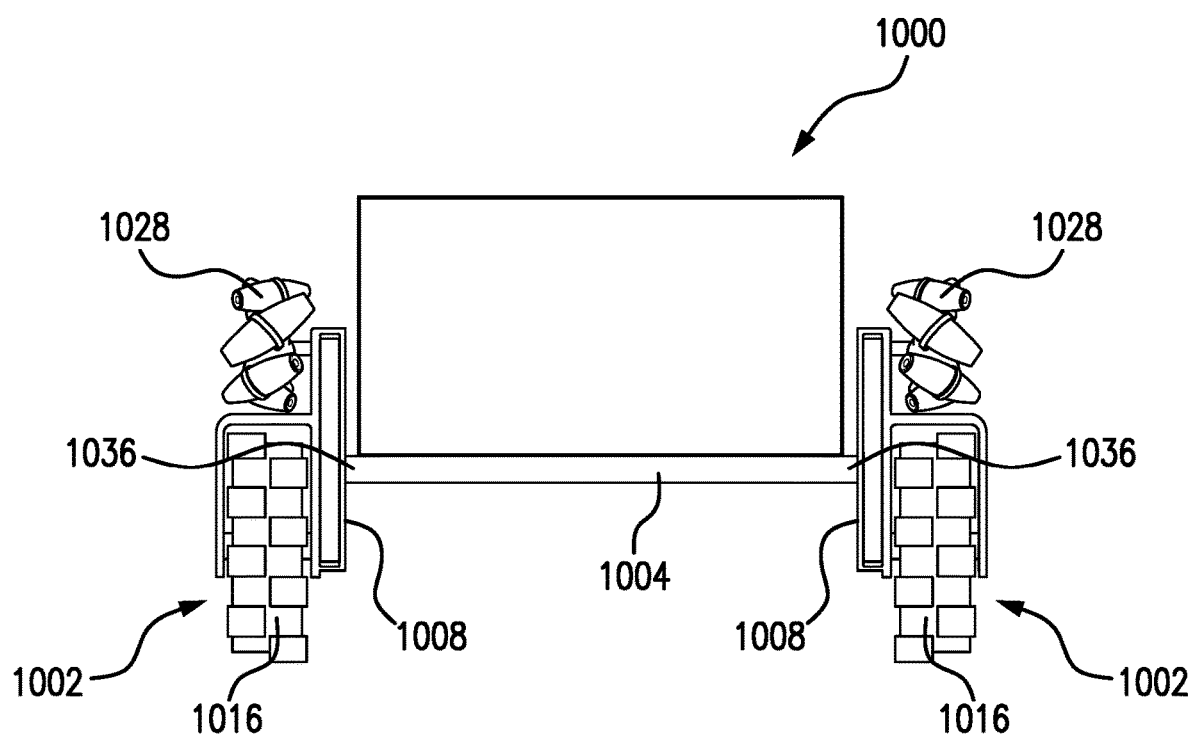
FIG. 10C is a front view of the autonomous ground vehicle shown in FIGS. 10A and 10B, in an outdoor configuration.

FIG. 10A depicts a side view of an AGV 1000, according to various embodiments of the present invention. FIGS. 10B and 10C depict front views of AGV 1000. AGV 1000 includes a plurality of dual-wheel propulsion units 1002, such as three pairs of dual-wheel propulsion units 1002a, 1002b, and 1002c. The three pairs include a front pair of dual-wheel propulsion units 1002a, a mid-pair of dual-wheel propulsion units 1002b, and a back pair of dual-wheel propulsion units 1002c. In FIGS. 10B and 10C, only a single pair of dual-wheel propulsion units 1002 and 1002 are shown.

Each dual-wheel propulsion unit 1002 includes a wheel bracket 1008 that is pivotably coupled to a frame 1004 of AGV 1000 at a pivot point 1036. Each dual-wheel propulsion unit 1002 further includes an outdoor wheel 1016, an outdoor wheel axle 1012, an indoor wheel 1028, an indoor wheel axle 1024, a dual-drive enclosure 1040, and a shield 1020.

AGV 1000 converts from the indoor configuration shown in FIG. 10B, to the outdoor configuration shown in FIG. 10C, by pivoting each dual-wheel propulsion unit 1002 by 180 degrees, or about 180 degrees, along a respective transverse axis of AGV 1000. As depicted in FIGS. 10B and 10C, converting from the indoor configuration to the outdoor configuration does not alter the width or the height of AGV 1000.

During a delivery, AGV 1000 can convert from the outdoor configuration to the indoor configuration by driving up to a doorway of a dwelling, using outdoor wheels 1016. Once at the doorway or other threshold to the dwelling, the front pair of dual-wheel propulsion units, for example, the pair represented by 1002*a*, can be lifted-up, rotated, driven across the threshold into the dwelling, and set-down. Sequentially, the mid-pair of dual-wheel propulsion units 1002*b* can be lifted-up, rotated, driven across the threshold into the dwelling, and set-down. Finally, the back pair of dual-wheel propulsion units 1002*c* can be lifted-up, rotated, driven across the threshold into the dwelling, and set-down.

To switch from the indoor configuration to the outdoor configuration, the above-mentioned steps can be reversed. AGV 900 can move in a reverse direction to exit the dwelling and the wheel units can be rotated in reverse, or AGV 900 can turn around inside the dwelling and the same order of wheel unit rotations can be used but resulting in the outdoor wheels being set-down outside of the threshold to the dwelling. This configuration limits outdoor wheels 1016 to contact only with an outdoor surface and limits indoor wheels 1028 to contact only with an indoor surface.

Figure 11:
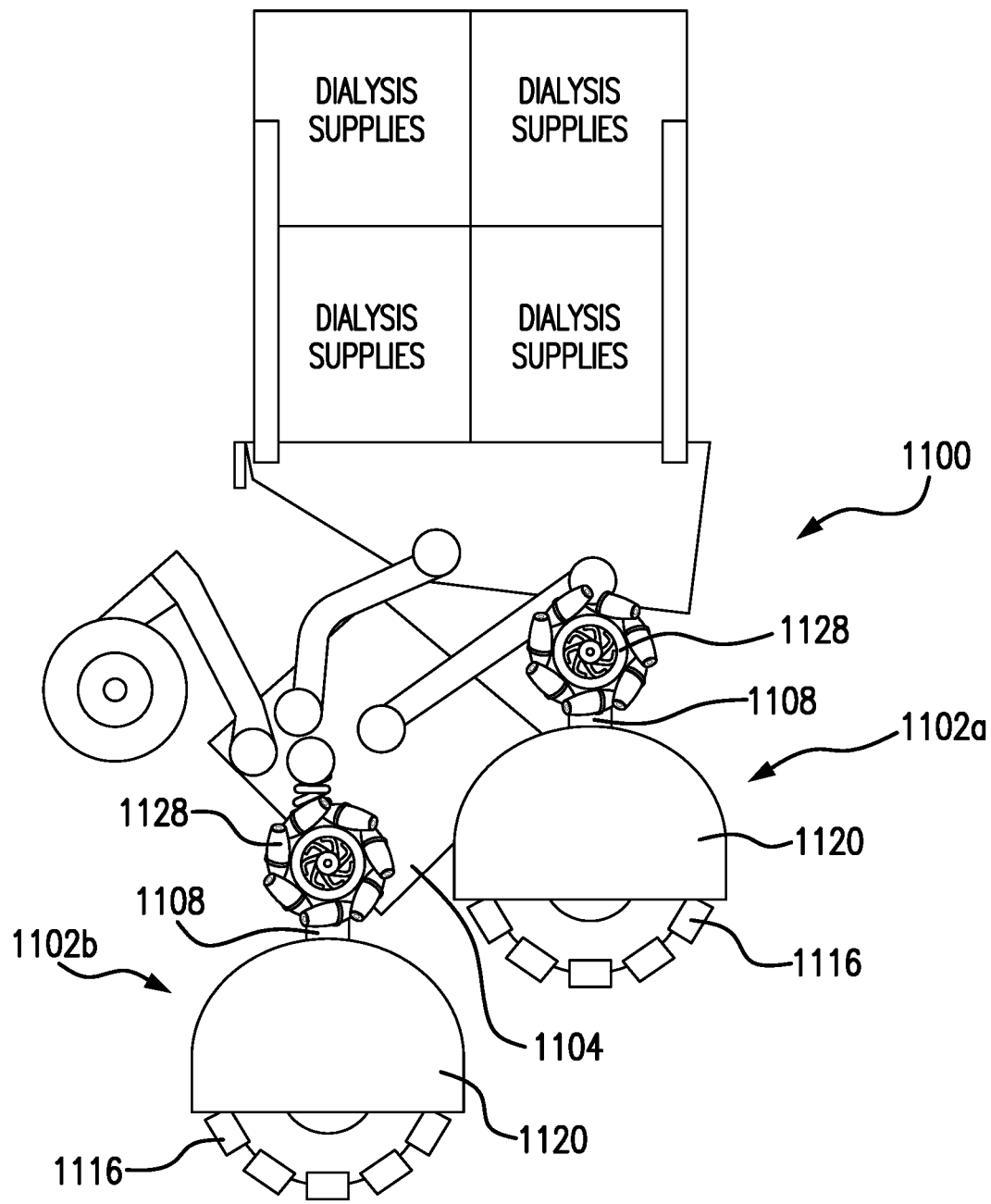
FIG. 11 is a side view of an autonomous ground vehicle in an outdoor configuration, according to an embodiment of the present invention.

FIG. 11 depicts a side view of an AGV 1100, according to various embodiments of the present invention. AGV 1100 includes two pairs of dual-wheel propulsion units, including a front pair of dual-wheel propulsion units 1102*a* and a back pair of dual-wheel propulsion units 1102*b*. Each of dual-wheel propulsion units 1102*a* and 1102*b* includes a wheel bracket 1108 that is pivotably coupled to a frame 1104 of AGV 1100. Each dual-wheel propulsion unit 1102*a* and 1102*b* further includes an outdoor wheel 1116, an indoor wheel 1128, and a shield 1120.

AGV 1100 is configured to balance on a back pair of dual-wheel propulsion units 1102*b* while a front pair of dual-wheel propulsion units 1102*a* is elevated above an outdoor/indoor surface. AGV 110 is also configured to balance on front pair of dual-wheel propulsion units 1102*a* while back pair of dual-wheel propulsion units 1102*b* is elevated above an outdoor/indoor surface. As such, AGV 1100 can traverse curbs, steps, and stairways. For example, AGV 1100 can lift front pair of dual-wheel propulsion units 1102*a* up and onto a step, and then subsequently lift back pair of dual-wheel propulsion units 1102*b* up and onto the same or a following, sequential step. Similarly, AGV 1100 can lower front pair of dual-wheel propulsion units 1102*a* down onto a step, and then subsequently lower back pair of dual-wheel propulsion units 1102*b* down and onto the same or a lower, sequential step.

AGV 1100 can approach a threshold, lift up front pair of dual-wheel propulsion units 1102*a* and rotate front pair of dual-wheel propulsion units along a transverse axis, so that outdoor wheels 1116 are facing upward and indoor wheels 1128 are facing downward. AGV 1100 is then configured to drive forward, partially into the dwelling, with back pair of dual-wheel propulsion units 1102*b*, and then lower front pair of dual-wheel propulsion units 1102*a* onto an indoor surface. AGV 1100 then lifts back pair of dual-wheel propulsion units 1102*b* up off of an outdoor surface and rotates back pair of dual-wheel propulsion units 1102*b* along a transverse axis so that outdoor wheels 1116 are facing upward and indoor wheels 1128 are facing downward. AGV 1110 can then drive forward with front pair of dual-wheel propulsion units 1102*a* until AGV 1110 is entirely inside of the dwelling, at which point the back pair of dual-wheel propulsion units 1102*b* can be lowered onto the indoor surface. To go from the indoor configuration to the outdoor configuration, the above-mentioned steps can be reversed, or AGV 1100 can be turned around and the same steps repeated, but to result in the outdoor wheels contacting an outdoor surface. Such a configurability enables outdoor wheel 1116 to be limited to only contacting outdoor surfaces while indoor wheels 1128 are limited to contacting only indoor surfaces.

Figure 12B:
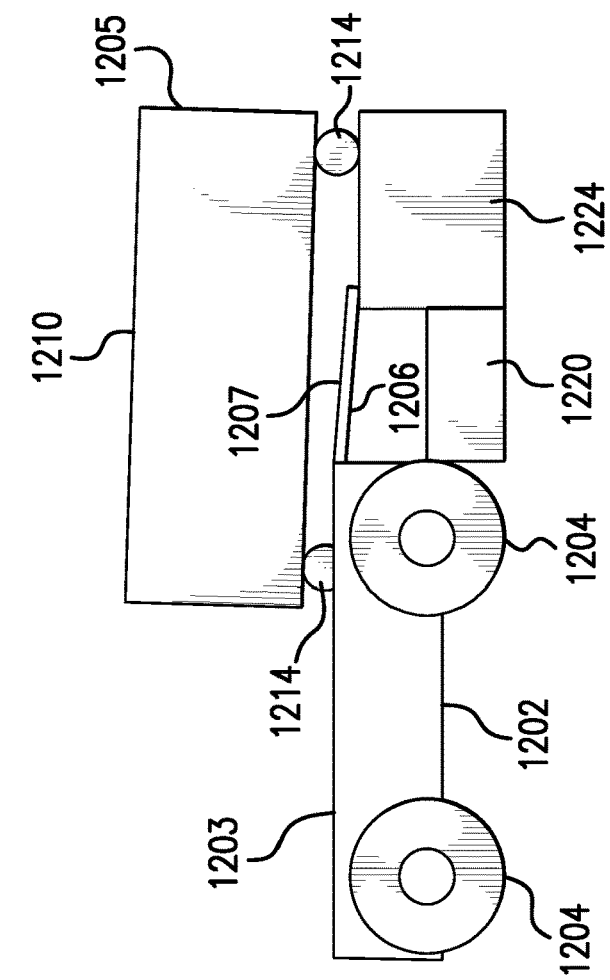
FIGS. 12A and 12B are side views of a delivery robot system according to the present invention, showing an indoor robot in a piggy-back configuration on an outdoor robot (FIG. 12A), and showing the indoor robot exiting the outdoor robot and entering a dwelling.
Figure 12A:
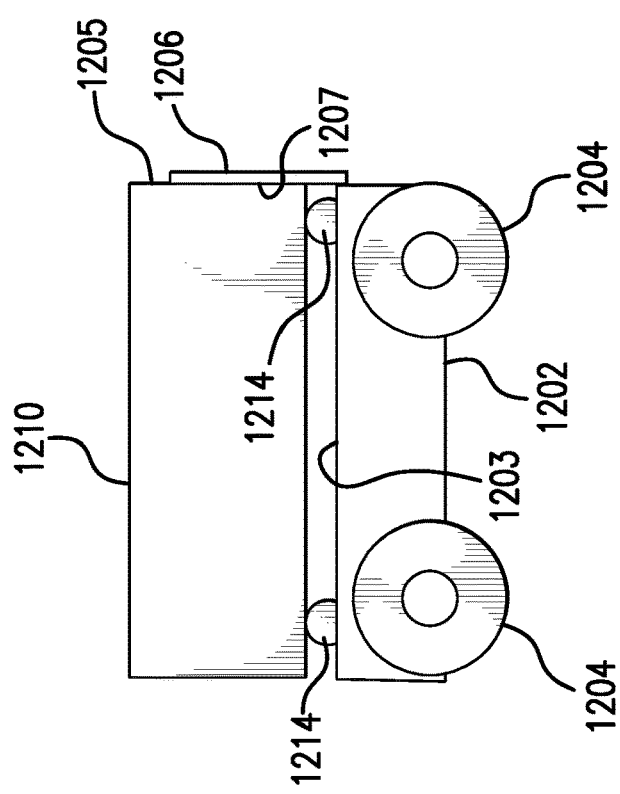

Yet another embodiment of the present invention is shown in FIGS. 12A and 12B, wherein an indoor robot 1210 is completely separate from, and not constructed together with, an outdoor robot 1202. Indoor robot 1210 has a plurality of wheels 1214, including four wheels 1214 in the example depicted. One or more of wheels 1214 can be provided with a brake. Indoor robot 1210 can be transported in a piggyback manner by outdoor robot 1202. Outdoor robot 1202 is provided with a plurality of wheels 1204, including four wheels 1204 in the example depicted. One or more of wheels 1204 can be provided with a brake. Outdoor robot 1202 has a top surface 1203 on which four wheels 1214 of indoor robot 1210 rest, for example, in grooves, divots, dimples, cut-outs, or other receivers that are formed in top surface 1203. The receivers can be configured to receive, lock, or receive and lock one or more of wheels 1214 to and on top surface 1203. Outdoor robot 1202 comprises a gate 1206 that has a gate surface 1207. Indoor robot 1210 has a front surface 1205. Front surface 1205 can rest against gate surface 1207 while indoor robot 1210 rests on top of outdoor robot 1202, including, for example, during transportation.

As shown in FIG. 12B, upon arriving at the threshold of a home or other building, outdoor robot 1202 can come to rest adjacent, for example, abutting, a step 1220. Similarly, outdoor robot 1202 can come to rest adjacent a curb, a threshold, a wall, or the like. Once at rest, gate 1206 can open and enable indoor robot 1210 to jettison or depart outdoor robot 1202 and roll or move directly into an indoor area, for example, across a threshold 1224 and into a home. Indoor robot 1210 can move from outdoor robot 1202 directly into a home or other dwelling or building, without the need for indoor wheels 1214 of indoor robot 1210 to ever touch an outdoor surface. Indoor wheels 1214 traverse top surface 1203 of outdoor robot 1202 and in indoor surface beginning at the top surface of threshold 1224. As shown, gate 1206 can form a ramp on which wheels 1214 can traverse while exiting outdoor robot 1202, entering a building, exiting a building, loading onto outdoor robot 1202, or a combination thereof. A drive train can be provided to lift and lower the gate and can include sensors, motion sensors, proximity sensors, heat sensors, combinations thereof, and the like, for example, as described herein. The drive train can be configured to provide an emergency reverse drive, for example, to prevent or remove an undesired gate contact.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A delivery robot comprising:
a drive train configured for moving the delivery robot and for transforming the delivery robot into an outdoor configuration and into an indoor configuration;
a control unit configured to control the drive train, at least based on signals received;
a sensor system configured to sense objects and send signals to the control unit;
a supplies holder configured to hold supplies and connected to the drive train for movement with movement of the drive train;
an outdoor motive traction device for traversing an outdoor surface;
an indoor motive traction device for traversing an indoor surface;
an outdoor motive traction device shield; and
an indoor motive traction device shield configured to shield the indoor motive traction device before the indoor motive traction device has been lowered onto an indoor surface,
wherein the drive train is configured to be controlled by the control unit to (1) maintain the indoor motive traction device in a lifted position while the outdoor motive traction device traverses an outdoor surface in the outdoor configuration, (2) transform the delivery robot from the outdoor configuration to the indoor configuration based on the signals received from the sensor system, (3) move the outdoor motive traction device shield into a position to prevent debris from dropping off of the outdoor motive traction device and onto an inside surface, (4) lift the outdoor motive traction device once the indoor motive traction device contacts the indoor surface, and (5) maintain the outdoor motive traction device in the lifted position while the indoor motive traction device traverses an indoor surface in the indoor configuration.

2. The delivery robot of claim 1, wherein delivery robot has a first maximum width in the outdoor configuration and has a second maximum width in the indoor configuration, wherein the first maximum width is greater than the second maximum width.

3. An autonomous delivery robot comprising:
a drive train for moving and transforming the autonomous delivery robot;
a control unit configured to autonomously control the drive train, at least based on signals received;
a sensor system configured to sense objects and send signals to the control unit;
a supplies holder configured to hold supplies and connected to the drive train for movement with movement of the drive train;
an outdoor motive traction device for traversing an outdoor surface;
an indoor motive traction device for traversing an indoor surface;
an outdoor motive traction device shield configured to cover the outdoor motive traction device and prevent debris from dropping off of the outdoor motive traction device and onto an inside surface of a home; and
an indoor motive traction device shield configured to shield the indoor motive traction device before the indoor motive traction device has been lowered onto an indoor surface,
wherein the drive train is configured to be controlled by the control unit to (1) maintain the indoor motive traction device in a lifted position while the outdoor motive traction device traverses an outdoor surface, (2) based on the signals received from the sensor system, unshield the indoor motive traction device at a threshold of a home, which is between the outdoor surface and the indoor surface, so that the indoor motive traction device can be lowered onto and make contact with the indoor surface, (3) based on the signals received from the sensor system, lower the indoor motive traction device into a home at the threshold of the home while the outdoor motive traction device remains in contact with an outdoor surface outside of the threshold, (4) lift the outdoor motive traction device into a lifted position once the indoor motive traction device contacts the indoor surface such that the outdoor motive traction device does not contact the indoor surface, (5) after lifting the outdoor motive traction device, move the an outdoor motive traction device shield into position to prevent debris from dropping off of the outdoor motive traction device and onto the indoor surface, and (6) maintain the outdoor motive traction device in the lifted position while the indoor motive traction device traverses the indoor surface in the indoor configuration.

4. The autonomous delivery robot of claim 3, wherein the control unit is configured to control the drive train to move the outdoor motive traction device shield into a position to shield the outdoor motive traction device before the autonomous delivery robot moves past the threshold and into the home.

5. The autonomous delivery robot of claim 3, further comprising a package of home dialysis supplies, wherein the package of home dialysis supplies is held by the supplies holder.

6. A home dialysis supplies delivery network comprising:
the autonomous delivery robot of claim 5; and
a remote network computer configured to send information, instructions, or both, to the autonomous delivery robot,
wherein the autonomous delivery robot is configured to autonomously react to information, instructions, or both, received from the remote network computer.

7. The home dialysis supplies delivery network of claim 6, further comprising a robot carrier vehicle, wherein the remote network computer is inside or on the robot carrier vehicle, and the robot carrier vehicle comprises a lift to load, unload, or load and unload, the autonomous delivery robot.

8. The home dialysis supplies delivery network of claim 6, wherein:
the remote network computer is configured to send prescription information pertaining to a home dialysis patient living at a home; and
the autonomous delivery robot is configured to receive prescription information from the remote network computer, autonomously react to prescription information received, load itself with prescribed home dialysis supplies based on prescription information received, and deliver the prescribed home dialysis supplies to the home dialysis patient at the home.

9. A home dialysis supplies delivery network comprising:
the autonomous delivery robot of claim 3;
a warehouse comprising a store of home dialysis supplies, a lift, and a programming computer, the programming computer comprising a computer interface; and
a robot carrier vehicle, wherein
the control unit of the autonomous delivery robot comprises a memory,
the autonomous delivery robot comprises a robot interface configured to interface with the computer interface to receive a program of instructions from the programming computer,
the control unit is configured to store a program of instructions received through the robot interface, in the memory, and
the lift is configured to lift the autonomous delivery robot, while the autonomous delivery robot is holding a load of prescribed home dialysis supplies, into the robot carrier vehicle.

10. A system for delivering items, comprising:
one or more autonomous ground vehicles (AGVs) including a first AGV, the first AGV comprising an outdoor motive traction device, an indoor motive traction device, a sensor system configured to sense objects and send signals, an outdoor motive traction device shield, an indoor motive traction device shield, a receptacle configured to retain one or more items therein, and one or more motors, the one or more motors being configured to drive the outdoor motive traction device and the indoor motive traction device, to move the outdoor motive traction device shield, to move the indoor motive traction device shield, and to convert the first AGV between an outdoor configuration and an indoor configuration; and
a computing system associated with the first AGV and configured to receive the signals from the sensor system, the computing system comprising a processor and a memory, wherein the memory stores computer-readable instructions that, upon execution by the processor, configure the computing system to instruct the first AGV to
(1) drive the first AGV in the outdoor configuration to an entrance of a dwelling associated with a delivery of one or more items retained in the receptacle, wherein, in the outdoor configuration, the outdoor motive traction device is deployed from the first AGV such that the outdoor motive traction device is engaged on an outdoor surface while the indoor motive traction device is retracted such that the indoor motive traction device is elevated above the outdoor surface,
(2) move the indoor motive traction device shield to unshield the indoor motive traction device so that the indoor motive traction device can be lowered onto and make contact with an indoor surface,
(3) convert from the outdoor configuration to the indoor configuration at an entrance to the dwelling based on the signals received from the sensor system, wherein, in the indoor configuration, the indoor motive traction device is deployed from the first AGV such that the indoor motive traction device is engaged on a dwelling surface while the outdoor motive traction device is retracted such that the outdoor motive traction device is elevated above the dwelling surface,
(4) move the outdoor motive traction device shield into a position to prevent debris from dropping off of the outdoor motive traction device and onto an inside surface of a home, and
(5) drive the first AGV in the indoor configuration on the dwelling surface inside of the dwelling, to an indoor drop-off location.

11. The system of claim 10, further comprising a delivery vehicle, wherein the computer-readable instructions, upon execution by the processor, configure the computing system to instruct the first AGV to drive from the delivery vehicle to the entrance of the dwelling.

12. The system of claim 11, wherein the computer-readable instructions, upon execution by the processor, configure the computing system to instruct the first AGV to determine when the one or more items are removed from the receptacle, and, upon determining when the one or more items are removed from the receptacle, instruct the first AGV to:
(1) drive, in the indoor configuration, from the indoor drop-off location to the entrance of the dwelling;
(2) convert from the indoor configuration to the outdoor configuration at the entrance of the dwelling; and
(3) drive, in the outdoor configuration, back to the delivery vehicle.

13. The system of claim 10, wherein the first AGV further comprises an identification tag configured to be read by an external reader.

* * * * *